(12) United States Patent
Joshi et al.

(10) Patent No.: US 10,339,056 B2
(45) Date of Patent: *Jul. 2, 2019

(54) SYSTEMS, METHODS AND APPARATUS FOR CACHE TRANSFERS

(71) Applicant: SanDisk Technologies LLC, Plano, TX (US)

(72) Inventors: Vikram Joshi, Los Gatos, CA (US); Yang Luan, San Jose, CA (US); Michael F. Brown, Campbell, CA (US); Bhavesh Mehta, Sunnyvale, CA (US)

(73) Assignee: SANDISK TECHNOLOGIES LLC, Plano, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/687,979

(22) Filed: Nov. 28, 2012

(65) Prior Publication Data

US 2014/0013059 A1 Jan. 9, 2014

Related U.S. Application Data

(63) Continuation-in-part of application No. 13/541,659, filed on Jul. 3, 2012, now Pat. No. 9,612,966.

(51) Int. Cl.
*G06F 12/08* (2016.01)
*G06F 12/0815* (2016.01)
(Continued)

(52) U.S. Cl.
CPC ...... *G06F 12/0815* (2013.01); *G06F 9/45558* (2013.01); *G06F 9/5077* (2013.01);
(Continued)

(58) Field of Classification Search
CPC .. G06F 12/0866; G06F 12/0815; G06F 12/08; G06F 2212/461; G06F 2212/152;
(Continued)

(56) References Cited

U.S. PATENT DOCUMENTS

| 4,571,674 A | 2/1986 | Hartung |
| 5,043,871 A | 8/1991 | Nishigaki et al. |

(Continued)

FOREIGN PATENT DOCUMENTS

| CN | 1771495 | 5/2006 |
| EP | 1100001 | 5/2001 |

(Continued)

OTHER PUBLICATIONS

Hystor: "Making SSDs the Survival of the Fittest in High-Performance Storage Systems," ics10-Paper 102, Feb. 2010.
(Continued)

*Primary Examiner* — Jungwon Chang
(74) *Attorney, Agent, or Firm* — Kunzler Bean & Adamson, PC

(57) ABSTRACT

A virtual machine cache provides for maintaining a working set of the cache during a transfer between virtual machine hosts. In response to a virtual machine transfer, the previous host of the virtual machine is configured to retain cache data of the virtual machine, which may include both cache metadata and data that has been admitted into the cache. The cache data may be transferred to the destination host via a network (or other communication mechanism). The destination host populates a virtual machine cache with the transferred cache data to thereby reconstruct the working state of the cache.

31 Claims, 17 Drawing Sheets

(51) Int. Cl.
*G06F 9/455* (2018.01)
*G06F 12/0842* (2016.01)
*G06F 9/50* (2006.01)
*G06F 16/188* (2019.01)
*G06F 12/0868* (2016.01)
*G06F 12/084* (2016.01)
*G06F 12/0866* (2016.01)

(52) U.S. Cl.
CPC .......... *G06F 12/0842* (2013.01); *G06F 12/08* (2013.01); *G06F 12/084* (2013.01); *G06F 12/0866* (2013.01); *G06F 12/0868* (2013.01); *G06F 16/188* (2019.01); *G06F 2009/45583* (2013.01); *G06F 2212/1016* (2013.01); *G06F 2212/152* (2013.01)

(58) Field of Classification Search
CPC .... G06F 3/0622; G06F 3/0674; G06F 3/0647; G06F 9/4856; G06F 9/45558; G06F 11/1464; G06F 12/0875; G06F 12/0888; G06F 12/084; G06F 12/0842; G06F 12/0868; G06F 9/5077; G06F 2212/1016; G06F 2009/45583; G06F 16/188
USPC ............ 709/214, 226; 711/118, 6, 122, 130; 718/1
See application file for complete search history.

(56) References Cited

U.S. PATENT DOCUMENTS

| | | |
|---|---|---|
| 5,191,184 A | 3/1993 | Belsan et al. |
| 5,261,068 A | 9/1993 | Gaskins et al. |
| 5,291,496 A | 3/1994 | Andaleon et al. |
| 5,307,497 A | 4/1994 | Feigenbaum |
| 5,313,475 A | 5/1994 | Cromer et al. |
| 5,325,509 A | 6/1994 | Lautzenhaiser |
| 5,392,427 A | 2/1995 | Barrett et al. |
| 5,404,485 A | 4/1995 | Ban |
| 5,434,994 A | 7/1995 | Shaheen et al. |
| 5,438,671 A | 8/1995 | Miles |
| 5,469,555 A | 11/1995 | Ghosh et al. |
| 5,499,354 A | 3/1996 | Aschoff et al. |
| 5,504,882 A | 4/1996 | Chai |
| 5,535,399 A | 7/1996 | Blitz et al. |
| 5,551,003 A | 8/1996 | Mattson et al. |
| 5,553,261 A | 9/1996 | Hasbun et al. |
| 5,559,988 A | 9/1996 | Durante et al. |
| 5,586,291 A | 12/1996 | Lasker et al. |
| 5,594,883 A | 1/1997 | Pricer |
| 5,596,736 A | 1/1997 | Kerns |
| 5,598,370 A | 1/1997 | Nijima et al. |
| 5,651,133 A | 7/1997 | Burkes |
| 5,680,579 A | 10/1997 | Young et al. |
| 5,682,497 A | 10/1997 | Robinson |
| 5,682,499 A | 10/1997 | Bakke et al. |
| 5,603,001 A | 11/1997 | Sukegawa et al. |
| 5,701,434 A | 12/1997 | Nakagawa |
| 5,734,861 A | 3/1998 | Cohn et al. |
| 5,740,367 A | 4/1998 | Spilo |
| 5,745,792 A | 4/1998 | Jost |
| 5,754,563 A | 5/1998 | White |
| 5,757,567 A | 5/1998 | Hetzler et al. |
| 5,787,486 A | 7/1998 | Chin et al. |
| 5,802,602 A | 9/1998 | Rahman et al. |
| 5,809,527 A | 9/1998 | Cooper et al. |
| 5,809,543 A | 9/1998 | Byers et al. |
| 5,845,313 A | 12/1998 | Estakhri et al. |
| 5,845,329 A | 12/1998 | Onishi et al. |
| 5,860,083 A | 1/1999 | Sukegawa |
| 5,907,856 A | 5/1999 | Estakhri et al. |
| 5,961,660 A | 5/1999 | Capps, Jr. et al. |
| 5,924,113 A | 7/1999 | Estakhri et al. |
| 5,957,158 A | 9/1999 | Volz et al. |
| 5,960,462 A | 9/1999 | Solomon et al. |
| 5,930,815 A | 10/1999 | Estakhri et al. |
| 6,000,019 A | 12/1999 | Dykstal et al. |
| 6,014,724 A | 1/2000 | Jennett |
| 6,128,695 A | 3/2000 | Estakhri et al. |
| 6,073,232 A | 6/2000 | Kroeker et al. |
| 6,075,938 A | 6/2000 | Bugnion et al. |
| 6,101,601 A | 8/2000 | Matthews et al. |
| 6,115,703 A | 9/2000 | Bireley et al. |
| 6,141,249 A | 11/2000 | Estakhri et al. |
| 6,145,051 A | 11/2000 | Estakhri et al. |
| 6,170,039 B1 | 1/2001 | Kishida |
| 6,170,047 B1 | 1/2001 | Dye |
| 6,172,906 B1 | 1/2001 | Estakhri et al. |
| 6,173,381 B1 | 1/2001 | Dye |
| 6,185,654 B1 | 2/2001 | Van Doren |
| 6,209,088 B1 | 3/2001 | Reneris |
| 6,223,308 B1 | 4/2001 | Estakhri et al. |
| 6,230,234 B1 | 5/2001 | Estakhri et al. |
| 6,236,593 B1 | 5/2001 | Hong et al. |
| 6,240,040 B1 | 5/2001 | Akaogi et al. |
| 6,256,642 B1 | 7/2001 | Krueger et al. |
| 6,266,785 B1 | 7/2001 | McDowell |
| 6,279,069 B1 | 8/2001 | Robinson et al. |
| 6,289,413 B1 | 9/2001 | Rogers et al. |
| 6,330,688 B1 | 12/2001 | Brown |
| 6,336,174 B1 | 1/2002 | Li et al. |
| 6,356,986 B1 | 3/2002 | Solomon et al. |
| 6,370,631 B1 | 4/2002 | Dye |
| 6,385,710 B1 | 5/2002 | Goldman et al. |
| 6,393,513 B2 | 5/2002 | Estakhri et al. |
| 6,404,647 B1 | 6/2002 | Minne |
| 6,412,080 B1 | 6/2002 | Fleming et al. |
| 6,418,478 B1 | 7/2002 | Ignatius et al. |
| 6,507,883 B1 | 1/2003 | Bello et al. |
| 6,507,911 B1 | 1/2003 | Langford |
| 6,516,380 B2 | 2/2003 | Kenchammana-Hoskote et al. |
| 6,523,102 B1 | 2/2003 | Dye et al. |
| 6,564,285 B1 | 5/2003 | Mills et al. |
| 6,567,889 B1 | 5/2003 | DeKoning et al. |
| 6,587,915 B1 | 7/2003 | Kim |
| 6,587,937 B1 | 7/2003 | Jensen et al. |
| 6,601,211 B1 | 7/2003 | Norman |
| 6,625,685 B1 | 9/2003 | Cho et al. |
| 6,629,112 B1 | 9/2003 | Shank |
| 6,658,438 B1 | 12/2003 | Moore et al. |
| 6,671,757 B1 | 12/2003 | Multer et al. |
| 6,675,349 B1 | 1/2004 | Chen |
| 6,715,027 B2 | 3/2004 | Kim et al. |
| 6,715,046 B1 | 3/2004 | Shoham et al. |
| 6,728,851 B1 | 4/2004 | Estakhri et al. |
| 6,742,082 B1 | 5/2004 | Lango et al. |
| 6,751,155 B2 | 6/2004 | Gorobets |
| 6,754,774 B2 | 6/2004 | Gruner et al. |
| 6,757,800 B1 | 6/2004 | Estakhri et al. |
| 6,766,413 B2 | 7/2004 | Newman |
| 6,775,185 B2 | 8/2004 | Fujisawa et al. |
| 6,779,088 B1 | 8/2004 | Benveniste et al. |
| 6,779,094 B2 | 8/2004 | Selkirk et al. |
| 6,785,776 B2 | 8/2004 | Arimilli et al. |
| 6,785,785 B2 | 8/2004 | Piccirillo et al. |
| 6,801,979 B1 | 10/2004 | Estakhri |
| 6,804,755 B2 | 10/2004 | Selkirk et al. |
| 6,877,076 B1 | 4/2005 | Cho et al. |
| 6,880,049 B2 | 4/2005 | Gruner et al. |
| 6,883,069 B2 | 4/2005 | Yoshida |
| 6,883,079 B2 | 4/2005 | Priborsky |
| 6,910,170 B2 | 6/2005 | Choi et al. |
| 6,912,537 B2 | 6/2005 | Selkirk et al. |
| 6,912,618 B2 | 6/2005 | Estakhri et al. |
| 6,925,533 B2 | 8/2005 | Lewis |
| 6,938,133 B2 | 8/2005 | Johnson et al. |
| 6,957,158 B1 | 10/2005 | Hancock et al. |
| 6,959,369 B1 | 10/2005 | Ashton et al. |
| 6,977,599 B2 | 12/2005 | Widmer |
| 6,978,342 B1 | 12/2005 | Estakhri et al. |
| 6,981,070 B1 | 12/2005 | Luk et al. |
| 6,996,676 B2 | 2/2006 | Megiddo |
| 7,010,652 B2 | 3/2006 | Piccirillo et al. |

(56) References Cited

U.S. PATENT DOCUMENTS

| | | | |
|---|---|---|---|
| 7,010,662 B2 | 3/2006 | Aasheim et al. |
| 7,013,376 B2 | 3/2006 | Hooper, III |
| 7,013,379 B1 | 3/2006 | Testardi |
| 7,082,512 B2 | 3/2006 | Aasheim et al. |
| 7,093,101 B2 | 3/2006 | Aasheim et al. |
| 7,035,974 B2 | 4/2006 | Shang |
| 7,036,040 B2 | 4/2006 | Nicholson et al. |
| 7,043,599 B1 | 5/2006 | Ware et al. |
| 7,047,366 B1 | 5/2006 | Ezra |
| 7,050,337 B2 | 5/2006 | Iwase et al. |
| 7,058,769 B1 | 6/2006 | Danilak |
| 7,069,393 B2 | 7/2006 | Miyata et al. |
| 7,073,028 B2 | 7/2006 | Lango et al. |
| 7,076,560 B1 | 7/2006 | Lango et al. |
| 7,076,599 B2 | 7/2006 | Aasheim et al. |
| 7,076,723 B2 | 7/2006 | Saliba |
| 7,082,495 B2 | 7/2006 | DeWhitt et al. |
| 7,085,879 B2 | 8/2006 | Aasheim et al. |
| 7,089,391 B2 | 8/2006 | Geiger et al. |
| 7,096,321 B2 | 8/2006 | Modha |
| 7,130,956 B2 | 10/2006 | Rao |
| 7,130,957 B2 | 10/2006 | Rao |
| 7,143,228 B2 | 11/2006 | Lida et al. |
| 7,149,947 B1 | 12/2006 | MacLellan et al. |
| 7,155,531 B1 | 12/2006 | Lango et al. |
| 7,167,953 B2 | 1/2007 | Megiddo et al. |
| 7,171,536 B2 | 1/2007 | Chang et al. |
| 7,173,852 B2 | 2/2007 | Gorobets et al. |
| 7,178,081 B2 | 2/2007 | Lee et al. |
| 7,181,572 B2 | 2/2007 | Walmsley |
| 7,194,577 B2 | 3/2007 | Johnson et al. |
| 7,194,740 B1 | 3/2007 | Frank et al. |
| 7,203,815 B2 | 4/2007 | Haswell |
| 7,197,657 B1 | 5/2007 | Tobias |
| 7,215,580 B2 | 5/2007 | Gorobets |
| 7,219,238 B2 | 5/2007 | Saito et al. |
| 7,234,082 B2 | 6/2007 | Lai et al. |
| 7,243,203 B2 | 7/2007 | Scheuerlein |
| 7,246,179 B2 | 7/2007 | Camara et al. |
| 7,254,686 B2 | 8/2007 | Islam |
| 7,260,820 B1 | 8/2007 | Waldspurger et al. |
| 7,272,606 B2 | 9/2007 | Borthakur et al. |
| 7,275,135 B2 | 9/2007 | Coulson |
| 7,280,536 B2 | 10/2007 | Testardi |
| 7,293,183 B2 | 11/2007 | Lee et al. |
| 7,305,520 B2 | 12/2007 | Voight et al. |
| 7,337,201 B1 | 2/2008 | Yellin et al. |
| 7,340,558 B2 | 3/2008 | Lee et al. |
| 7,340,566 B2 | 3/2008 | Voth et al. |
| 7,356,651 B2 | 4/2008 | Liu et al. |
| 7,360,015 B2 | 4/2008 | Matthews et al. |
| 7,360,037 B2 | 4/2008 | Higaki et al. |
| 7,366,808 B2 | 4/2008 | Kano et al. |
| 7,392,365 B2 | 6/2008 | Selkirk et al. |
| 7,395,384 B2 | 7/2008 | Sinclair et al. |
| 7,398,348 B2 | 7/2008 | Moore et al. |
| 7,424,593 B2 | 9/2008 | Estakhri et al. |
| 7,437,510 B2 | 10/2008 | Rosenbluth et al. |
| 7,441,090 B2 | 10/2008 | Estakhri et al. |
| 7,447,847 B2 | 11/2008 | Louie et al. |
| 7,450,420 B2 | 11/2008 | Sinclair et al. |
| 7,464,221 B2 | 12/2008 | Nakamura et al. |
| 7,487,235 B2 | 2/2009 | Andrews et al. |
| 7,487,320 B2 | 2/2009 | Bansai et al. |
| 7,500,000 B2 | 3/2009 | Groves et al. |
| 7,516,267 B2 | 4/2009 | Coulson et al. |
| 7,526,614 B2 | 4/2009 | van Riel |
| 7,529,905 B2 | 5/2009 | Sinclair |
| 7,536,491 B2 | 5/2009 | Kano et al. |
| 7,549,022 B2 | 6/2009 | Baker |
| 7,552,271 B2 | 6/2009 | Sinclair et al. |
| 7,580,287 B2 | 8/2009 | Aritome |
| 7,603,532 B2 | 10/2009 | Rajan et al. |
| 7,610,348 B2 | 10/2009 | Kisley et al. |
| 7,617,375 B2 | 11/2009 | Flemming et al. |
| 7,620,773 B2 | 11/2009 | Nicholson et al. |
| 7,640,390 B2 | 12/2009 | Iwamura et al. |
| 7,644,239 B2 | 1/2010 | Ergan et al. |
| 7,664,239 B2 | 1/2010 | Groff et al. |
| 7,660,911 B2 | 2/2010 | McDaniel |
| 7,660,941 B2 | 2/2010 | Lee et al. |
| 7,669,019 B2 | 2/2010 | Fujibayashi et al. |
| 7,673,108 B2 | 3/2010 | Iyengar et al. |
| 7,676,628 B1 | 3/2010 | Compton et al. |
| 7,685,367 B2 | 3/2010 | Ruia et al. |
| 7,694,065 B2 * | 4/2010 | Petev et al. ............... 711/6 |
| 7,702,873 B2 | 4/2010 | Griess et al. |
| 7,721,047 B2 | 5/2010 | Dunshea et al. |
| 7,721,059 B2 | 5/2010 | Mylly et al. |
| 7,725,628 B1 | 5/2010 | Phan et al. |
| 7,761,573 B2 * | 7/2010 | Travostino ............ G06F 9/4856 |
| | | 709/226 |
| 7,711,140 B2 | 9/2010 | Estakhri et al. |
| 7,801,894 B1 | 9/2010 | Bone et al. |
| 7,805,449 B1 | 9/2010 | Bone et al. |
| 7,831,783 B2 | 11/2010 | Pandit et al. |
| 7,831,977 B2 | 11/2010 | Schultz et al. |
| 7,853,772 B2 | 12/2010 | Chang et al. |
| 7,873,782 B2 | 1/2011 | Terry et al. |
| 7,873,803 B2 | 1/2011 | Cheng |
| 7,882,305 B2 | 2/2011 | Moritoki |
| 7,904,647 B2 | 3/2011 | El-Batal et al. |
| 7,913,051 B1 | 3/2011 | Todd et al. |
| 7,917,617 B1 * | 3/2011 | Ponnapur et al. ............ 709/224 |
| 7,917,803 B2 | 3/2011 | Stefanus et al. |
| 7,941,591 B2 | 5/2011 | Aviles |
| 7,984,230 B2 | 7/2011 | Nasu et al. |
| 8,046,526 B2 | 10/2011 | Yeh |
| 8,055,820 B2 | 11/2011 | Sebire |
| 8,060,683 B2 | 11/2011 | Schultz et al. |
| 8,095,764 B1 | 1/2012 | Bauer et al. |
| 8,127,103 B2 | 2/2012 | Kano et al. |
| 8,135,900 B2 | 3/2012 | Kunimatsu et al. |
| 8,135,904 B2 | 3/2012 | Lasser et al. |
| 8,151,077 B1 | 4/2012 | Bauer et al. |
| 8,151,082 B2 | 4/2012 | Flynn et al. |
| 8,171,201 B1 | 5/2012 | Edwards, Sr. |
| 8,171,204 B2 | 5/2012 | Chow et al. |
| 8,195,929 B2 | 6/2012 | Banga et al. |
| 8,214,583 B2 | 7/2012 | Sinclair et al. |
| 8,244,935 B2 | 8/2012 | Leventhal et al. |
| 8,341,352 B2 | 12/2012 | Cain, III et al. |
| 8,453,145 B1 * | 5/2013 | Naik ............. G06F 9/45558 |
| | | 718/1 |
| 8,479,294 B1 * | 7/2013 | Li et al. ............. 726/24 |
| 8,549,222 B1 | 10/2013 | Kleiman et al. |
| 8,613,085 B2 * | 12/2013 | Diab et al. ............. 726/22 |
| 9,612,966 B2 * | 4/2017 | Joshi ............. G06F 12/0875 |
| 2002/0069317 A1 | 6/2002 | Chow et al. |
| 2002/0069318 A1 | 6/2002 | Chow et al. |
| 2002/0103819 A1 | 8/2002 | Duvillier |
| 2002/0161855 A1 | 10/2002 | Manczak et al. |
| 2002/0181134 A1 | 12/2002 | Bunker et al. |
| 2002/0188711 A1 | 12/2002 | Meyer et al. |
| 2002/0194451 A1 | 12/2002 | Mukaida et al. |
| 2003/0061296 A1 | 3/2003 | Craddock et al. |
| 2003/0061550 A1 | 3/2003 | Ng et al. |
| 2003/0093741 A1 | 5/2003 | Argon et al. |
| 2003/0140051 A1 | 7/2003 | Fujiwara et al. |
| 2003/0145230 A1 | 7/2003 | Chiu et al. |
| 2003/0149753 A1 | 8/2003 | Lamb |
| 2003/0198084 A1 | 10/2003 | Fujisawa et al. |
| 2004/0002942 A1 | 1/2004 | Pudipeddi et al. |
| 2004/0003002 A1 | 1/2004 | Adelmann |
| 2004/0049564 A1 | 3/2004 | Ng et al. |
| 2004/0093463 A1 | 5/2004 | Shang |
| 2004/0117586 A1 | 6/2004 | Estakhri et al. |
| 2004/0148360 A1 | 7/2004 | Mehra et al. |
| 2004/0153694 A1 | 8/2004 | Nicholson et al. |
| 2004/0186946 A1 | 9/2004 | Lee |
| 2004/0205177 A1 | 10/2004 | Levy et al. |
| 2004/0225837 A1 | 11/2004 | Lewis |
| 2004/0268359 A1 | 12/2004 | Hanes |
| 2005/0002263 A1 | 1/2005 | Iwase et al. |

(56) References Cited

U.S. PATENT DOCUMENTS

| | | |
|---|---|---|
| 2005/0015539 A1 | 1/2005 | Horii et al. |
| 2005/0027951 A1 | 2/2005 | Piccirillo et al. |
| 2005/0055425 A1 | 3/2005 | Lango et al. |
| 2005/0055497 A1 | 3/2005 | Estakhri et al. |
| 2005/0076107 A1 | 4/2005 | Goud et al. |
| 2005/0120177 A1 | 6/2005 | Black |
| 2005/0132259 A1 | 6/2005 | Emmot et al. |
| 2005/0141313 A1 | 6/2005 | Gorobets et al. |
| 2005/0144361 A1 | 6/2005 | Gonzalez et al. |
| 2005/0144406 A1 | 6/2005 | Chong, Jr. |
| 2005/0149618 A1 | 7/2005 | Cheng |
| 2005/0149683 A1 | 7/2005 | Chong, Jr. et al. |
| 2005/0149819 A1 | 7/2005 | Hwang |
| 2005/0177672 A1 | 8/2005 | Rao |
| 2005/0177687 A1 | 8/2005 | Rao |
| 2005/0193166 A1 | 9/2005 | Johnson et al. |
| 2005/0216653 A1 | 9/2005 | Aasheim et al. |
| 2005/0229090 A1 | 10/2005 | Shen et al. |
| 2005/0240713 A1 | 10/2005 | Wu et al. |
| 2005/0246510 A1 | 11/2005 | Retnamana et al. |
| 2005/0257017 A1 | 11/2005 | Yagi |
| 2005/0257213 A1 | 11/2005 | Chu et al. |
| 2005/0273476 A1 | 12/2005 | Wertheimer et al. |
| 2005/0276092 A1 | 12/2005 | Hansen et al. |
| 2006/0004955 A1 | 1/2006 | Ware et al. |
| 2006/0020744 A1 | 1/2006 | Sinclair et al. |
| 2006/0026339 A1 | 2/2006 | Rostampour |
| 2006/0041731 A1 | 2/2006 | Jochemsen et al. |
| 2006/0053157 A1 | 3/2006 | Pitts |
| 2006/0059326 A1 | 3/2006 | Aasheim et al. |
| 2006/0075057 A1 | 4/2006 | Gildea et al. |
| 2006/0085626 A1 | 4/2006 | Roberson et al. |
| 2006/0090048 A1 | 4/2006 | Okamoto et al. |
| 2006/0106968 A1 | 5/2006 | Wooi Teoh |
| 2006/0117212 A1 | 6/2006 | Meyer et al. |
| 2006/0123197 A1 | 6/2006 | Dunshea et al. |
| 2006/0129778 A1 | 6/2006 | Clark et al. |
| 2006/0136657 A1 | 6/2006 | Rudelic et al. |
| 2006/0136685 A1 | 6/2006 | Griv et al. |
| 2006/0143396 A1 | 6/2006 | Cabot |
| 2006/0149893 A1 | 7/2006 | Barfuss et al. |
| 2006/0152981 A1 | 7/2006 | Ryu |
| 2006/0179263 A1 | 8/2006 | Song et al. |
| 2006/0184722 A1 | 8/2006 | Sinclair |
| 2006/0190552 A1 | 8/2006 | Henze et al. |
| 2006/0224849 A1 | 10/2006 | Islam et al. |
| 2006/0236061 A1 | 10/2006 | Koclanes |
| 2006/0248387 A1 | 11/2006 | Nicholson et al. |
| 2006/0265636 A1 | 11/2006 | Hummler |
| 2006/0271740 A1 | 11/2006 | Mark et al. |
| 2007/0006021 A1 | 1/2007 | Nicholson et al. |
| 2007/0016699 A1 | 1/2007 | Minami |
| 2007/0016754 A1 | 1/2007 | Testardi |
| 2007/0033325 A1 | 2/2007 | Sinclair |
| 2007/0033326 A1 | 2/2007 | Sinclair |
| 2007/0033327 A1 | 2/2007 | Sinclair |
| 2007/0033362 A1 | 2/2007 | Sinclair |
| 2007/0033371 A1 | 2/2007 | Dunshea et al. |
| 2007/0043900 A1 | 2/2007 | Yun |
| 2007/0050548 A1 | 3/2007 | Bali et al. |
| 2007/0050571 A1 | 3/2007 | Nakamura et al. |
| 2007/0061508 A1 | 3/2007 | Zweighaft |
| 2007/0069318 A1 | 3/2007 | Chow et al. |
| 2007/0233455 A1 | 3/2007 | Zimmer et al. |
| 2007/0086260 A1 | 4/2007 | Sinclair |
| 2007/0088666 A1 | 4/2007 | Saito |
| 2007/0118676 A1 | 5/2007 | Kano et al. |
| 2007/0118713 A1 | 5/2007 | Guterman et al. |
| 2007/0124474 A1 | 5/2007 | Margulis |
| 2007/0124540 A1 | 5/2007 | van Riel |
| 2007/0136555 A1 | 6/2007 | Sinclair |
| 2007/0143532 A1 | 6/2007 | Gorobets et al. |
| 2007/0143560 A1 | 6/2007 | Gorobets |
| 2007/0143566 A1 | 6/2007 | Gorobets |
| 2007/0143567 A1 | 6/2007 | Gorobets |
| 2007/0147356 A1 | 6/2007 | Malas et al. |
| 2007/0150689 A1 | 6/2007 | Pandit et al. |
| 2007/0156998 A1 | 7/2007 | Gorobets |
| 2007/0168698 A1 | 7/2007 | Coulson et al. |
| 2007/0198770 A1 | 8/2007 | Horii et al. |
| 2007/0204128 A1 | 8/2007 | Lee et al. |
| 2007/0208790 A1 | 9/2007 | Reuter et al. |
| 2007/0214320 A1 | 9/2007 | Ruia et al. |
| 2007/0233937 A1 | 10/2007 | Coulson et al. |
| 2007/0250660 A1 | 10/2007 | Gill et al. |
| 2007/0260608 A1 | 11/2007 | Hertzberg et al. |
| 2007/0261030 A1 | 11/2007 | Wadhwa |
| 2007/0263514 A1 | 11/2007 | Iwata et al. |
| 2007/0266037 A1 | 11/2007 | Terry et al. |
| 2007/0271468 A1 | 11/2007 | McKenney et al. |
| 2007/0274150 A1 | 11/2007 | Gorobets |
| 2007/0276897 A1 | 11/2007 | Tameshige et al. |
| 2007/0300008 A1 | 12/2007 | Rogers et al. |
| 2008/0005141 A1 | 1/2008 | Zheng et al. |
| 2008/0005748 A1 | 1/2008 | Matthew et al. |
| 2008/0010395 A1 | 1/2008 | Mylly et al. |
| 2008/0043769 A1 | 2/2008 | Hirai |
| 2008/0052377 A1 | 2/2008 | Light |
| 2008/0052477 A1 | 2/2008 | Lee et al. |
| 2008/0059752 A1 | 3/2008 | Serizawa |
| 2008/0091876 A1 | 4/2008 | Fujibayashi et al. |
| 2008/0098159 A1 | 4/2008 | Song |
| 2008/0104321 A1 | 5/2008 | Kamisetty et al. |
| 2008/0120469 A1 | 5/2008 | Kornegay |
| 2008/0126507 A1 | 5/2008 | Wilkinson |
| 2008/0126700 A1 | 5/2008 | El-Batal et al. |
| 2008/0126852 A1 | 5/2008 | Brandyberry et al. |
| 2008/0209090 A1 | 5/2008 | Esmaili et al. |
| 2008/0133963 A1 | 6/2008 | Katano et al. |
| 2008/0137658 A1 | 6/2008 | Wang |
| 2008/0140737 A1 | 6/2008 | Garst et al. |
| 2008/0140819 A1 | 6/2008 | Bailey et al. |
| 2008/0205286 A1 | 8/2008 | Li et al. |
| 2008/0229045 A1 | 9/2008 | Qi |
| 2008/0235443 A1 | 9/2008 | Chow et al. |
| 2008/0243966 A1 | 10/2008 | Croisettier et al. |
| 2008/0263259 A1 | 10/2008 | Sadovsky et al. |
| 2008/0263305 A1 | 10/2008 | Shu et al. |
| 2008/0263569 A1 | 10/2008 | Shu et al. |
| 2008/0271039 A1 | 10/2008 | Rolia et al. |
| 2008/0276040 A1 | 11/2008 | Moritoki |
| 2008/0307414 A1 | 12/2008 | Alpern et al. |
| 2009/0070526 A1 | 3/2009 | Tetrick |
| 2009/0083478 A1 | 3/2009 | Kunimatsu et al. |
| 2009/0083485 A1 | 3/2009 | Cheng |
| 2009/0089485 A1 | 4/2009 | Yeh |
| 2009/0125650 A1 | 5/2009 | Sebire |
| 2009/0125700 A1 | 5/2009 | Kisel |
| 2009/0132621 A1 | 5/2009 | Jensen et al. |
| 2009/0150599 A1 | 6/2009 | Bennett |
| 2009/0150605 A1 | 6/2009 | Flynn et al. |
| 2009/0150641 A1 | 6/2009 | Flynn et al. |
| 2009/0228637 A1 | 9/2009 | Moon |
| 2009/0248763 A1 | 10/2009 | Rajan et al. |
| 2009/0248922 A1 | 10/2009 | Hinohara et al. |
| 2009/0276588 A1 | 11/2009 | Murase |
| 2009/0276654 A1 | 11/2009 | Butterworth |
| 2009/0279556 A1 | 11/2009 | Selitser et al. |
| 2009/0287887 A1 | 11/2009 | Matsuki et al. |
| 2009/0292861 A1 | 11/2009 | Kanevsky et al. |
| 2009/0294847 A1 | 11/2009 | Maruyama et al. |
| 2009/0300277 A1 | 12/2009 | Jeddoloh |
| 2009/0307424 A1 | 12/2009 | Galloway et al. |
| 2009/0313453 A1 | 12/2009 | Stefanus et al. |
| 2009/0327602 A1 | 12/2009 | Moore et al. |
| 2009/0327804 A1 | 12/2009 | Moshayedi |
| 2010/0005072 A1 | 1/2010 | Pitts |
| 2010/0005228 A1 | 1/2010 | Fukutomi et al. |
| 2010/0017556 A1 | 1/2010 | Chin |
| 2010/0017568 A1 | 1/2010 | Wadhawan et al. |
| 2010/0023674 A1 | 1/2010 | Aviles |
| 2010/0023682 A1 | 1/2010 | Lee et al. |
| 2010/0032676 A1 | 1/2010 | Moon |
| 2010/0030946 A1 | 2/2010 | Kano et al. |

(56) References Cited

U.S. PATENT DOCUMENTS

| | | |
|---|---|---|
| 2010/0036840 A1 | 2/2010 | Pitts |
| 2010/0042805 A1 | 2/2010 | Recio et al. |
| 2010/0070701 A1 | 3/2010 | Iyigun et al. |
| 2010/0070715 A1 | 3/2010 | Waltermann et al. |
| 2010/0070725 A1 | 3/2010 | Prahlad et al. |
| 2010/0070747 A1 | 3/2010 | Iyigun et al. |
| 2010/0070982 A1 | 3/2010 | Pitts |
| 2010/0076936 A1 | 3/2010 | Rajan |
| 2010/0077194 A1 | 3/2010 | Zhao et al. |
| 2010/0082774 A1 | 4/2010 | Pitts |
| 2010/0095059 A1 | 4/2010 | Kisley et al. |
| 2010/0169542 A1 | 7/2010 | Sinclair |
| 2010/0199036 A1 | 8/2010 | Siewert et al. |
| 2010/0205231 A1 | 8/2010 | Cousins |
| 2010/0205335 A1 | 8/2010 | Phan et al. |
| 2010/0211737 A1 | 8/2010 | Flynn et al. |
| 2010/0217916 A1 | 8/2010 | Gao et al. |
| 2010/0228903 A1 | 9/2010 | Chandrasekaran et al. |
| 2010/0235597 A1 | 9/2010 | Arakawa |
| 2010/0262738 A1 | 10/2010 | Swing et al. |
| 2010/0262740 A1 | 10/2010 | Borchers et al. |
| 2010/0262757 A1 | 10/2010 | Sprinkle et al. |
| 2010/0262758 A1 | 10/2010 | Swing et al. |
| 2010/0262759 A1 | 10/2010 | Borchers et al. |
| 2010/0262760 A1 | 10/2010 | Swing et al. |
| 2010/0262761 A1 | 10/2010 | Borchers et al. |
| 2010/0262762 A1 | 10/2010 | Borchers et al. |
| 2010/0262766 A1 | 10/2010 | Sprinkle et al. |
| 2010/0262767 A1 | 10/2010 | Borchers et al. |
| 2010/0262773 A1 | 10/2010 | Borchers et al. |
| 2010/0262894 A1 | 10/2010 | Swing et al. |
| 2010/0262979 A1 | 10/2010 | Borchers et al. |
| 2010/0268881 A1 | 10/2010 | Galchev et al. |
| 2011/0022819 A1 | 1/2011 | Post et al. |
| 2011/0107033 A1 | 5/2011 | Grigoriev et al. |
| 2011/0179162 A1 | 7/2011 | Mayo et al. |
| 2011/0225342 A1* | 9/2011 | Sharma .................. G06F 12/08 711/6 |
| 2011/0231857 A1 | 9/2011 | Zaroo et al. |
| 2011/0238546 A1 | 9/2011 | Certain et al. |
| 2011/0265083 A1 | 10/2011 | Davis |
| 2011/0314202 A1 | 12/2011 | Iyigun et al. |
| 2011/0320733 A1 | 12/2011 | Sanford et al. |
| 2012/0017209 A1 | 1/2012 | Ben-Yehuda et al. |
| 2012/0159081 A1 | 6/2012 | Agrawal et al. |
| 2012/0173653 A1* | 7/2012 | Bland .................. G06F 9/4856 709/213 |
| 2012/0173824 A1 | 7/2012 | Iyigun et al. |
| 2012/0210068 A1* | 8/2012 | Joshi .................. G06F 9/45558 711/122 |
| 2012/0254824 A1 | 10/2012 | Bansod |
| 2012/0272240 A1 | 10/2012 | Starks et al. |
| 2012/0278588 A1 | 11/2012 | Adams et al. |
| 2012/0304171 A1* | 11/2012 | Joshi .................. G06F 9/45558 718/1 |
| 2013/0081013 A1* | 3/2013 | Plondke .............. G06F 9/4856 718/1 |
| 2013/0198459 A1* | 8/2013 | Joshi .................. G06F 12/084 711/130 |
| 2013/0232303 A1* | 9/2013 | Quan .................. G06F 12/08 711/118 |
| 2013/0262801 A1 | 10/2013 | Sancheti et al. |
| 2013/0263119 A1 | 10/2013 | Pissay et al. |
| 2013/0318283 A1 | 11/2013 | Small et al. |
| 2013/0339958 A1 | 12/2013 | Droste et al. |
| 2013/0346613 A1* | 12/2013 | Tarasuk-Levin .... G06F 9/45558 709/226 |
| 2014/0136872 A1 | 5/2014 | Cooper et al. |
| 2014/0156910 A1 | 6/2014 | Uttamchandani et al. |
| 2014/0156938 A1 | 6/2014 | Galchev et al. |

FOREIGN PATENT DOCUMENTS

| | | |
|---|---|---|
| EP | 1418502 | 5/2004 |
| EP | 1814039 | 3/2009 |
| GB | 123416 | 9/2001 |
| JP | 4242848 | 8/1992 |
| JP | 8153014 | 6/1996 |
| JP | 200259525 | 9/2000 |
| JP | 2009122850 | 6/2009 |
| WO | WO1994/019746 | 9/1994 |
| WO | WO1995/018407 | 7/1995 |
| WO | WO1996/012225 | 4/1996 |
| WO | WO2002/01365 | 1/2001 |
| WO | WO2001/031512 | 5/2001 |
| WO | WO2004/061645 | 3/2004 |
| WO | WO2004/099989 | 11/2004 |
| WO | WO2005/103878 | 11/2005 |
| WO | WO2006/062511 | 6/2006 |
| WO | WO2006/065626 | 6/2006 |
| WO | WO2008/130799 | 3/2008 |
| WO | WO2008/073421 | 6/2008 |
| WO | WO2011/106394 | 9/2011 |

OTHER PUBLICATIONS

IBM, "Method to Improve Reliability of SSD Arrays," Nov. 2009.
Information Technology, "SCSI Object-Based Storage Device Commands," 2 (OSD-2), Project T10/1729-D, Revision 4, published Jul. 30, 2004, printed Jul. 24, 2008.
Intel, "Non-Volatile Memory Host Controller Interface (NVMHCI) 1.0," Apr. 14, 2008.
Johnson, "An Introduction to Block Device Drivers," Jan. 1, 1995.
Kawaguchi, "A Flash-Memory Based File System," TCON'95 Proceedings of the USENIX 1995 Technical Conference Proceedings, p. 13.
Linn, Craig, "Windows I/O Performance: Cache Manager and File System Considerations," CMGA Proceedings, Sep. 6, 2006.
Lu, Pin, "Virtual Machine Memory Access Tracing with Hypervisor Exclusive Cache," Departmentn of Computer Science, University of Rochester, 2007.
Mesnier, "Object-Based Storage," IEEE Communications Magazine, Aug. 2003, pp. 84-90.
Micron Technology, Inc., "NAND Flash 101: An Introduction to ND Flash and How to Design It in to Your Next Product (TN-29-19)," http://www.micron.com/~/media/Documents/Products/Technical%20Note/ND%20Flash/145tn2919_nd_101.pdf, 2006, visited May 10, 2010.
Micron, "TN-29-08: Technical Note,"Hamming Codes for NAND Flash Memory Devices, Mar. 10, 2010.
Micron, "TN-29-17: NAND Flash Design and Use Considerations," Mar. 10, 2010.
Micron, "TN-29-42: Wear-Leveling Techniques in NAND Flash Devices," Mar. 10, 2010.
Microsoft, Data Set Management Commands Proposal for ATA8-ACS2, published Oct. 5, 2007, Rev. 3.
Microsoft, "File Cache Management, Windows Embedded CE6.0 R3," msdn.microsoft.com/en-us/subscriptions/aa911545.aspx, published Aug. 28, 2008.
Microsoft, "Filter Driver Development Guide," download.microsoft.com/.../FilterDriverDeveloperGuide.doc 2004.
Microsoft, "How NTFS Works," Apr. 9, 2010.
Morgenstern, David, "Is There a Flash Memory RAID in your Future?", http://www.eweek.com—eWeek, Ziff Davis Enterprise Holdings Inc., Nov. 8, 2006, visited Mar. 18, 2010.
Muntz, et al., Multi-level Caching in Distributed File Systems, CITI Technical Report, 91-3, Aug. 16, 1991.
Nevex Virtual Technologies, "CacheWorks Data Sheet," http://www.nevex.com/wp-content/uploads/2010/12/Data-Sheet3.pdf, published Dec. 1, 2010.
Noll, Albert et al., Cell VM: A Homogeneous Virtual Machine Runtime System for a Heterogeneous Single-Chip.
Novell, "File System Primer", http://wiki.novell.com/index.php/File_System_Primer, 2006, visited Oct. 18, 2006.

(56) References Cited

OTHER PUBLICATIONS

Omesh Tickoo et al, Modeling Virtual Machine Performance: Challenges and Approaches, SIGMETRICS Perform. Eval. Rev. 37, 3 (Jan. 2010), 55-60. DOI=10.1145/1710115.1710126 http://doi.acm.org/10.1145/ 1710115.1710126.
Perfectcacheserver, "Automatic Disk Caching," http://www.raxco.com/business/perfectcache_server.aspx, last visited Oct. 31, 2012.
Pivot3, "Pivot3 announces IP-based storage cluster," www.pivot3.com, Jun. 22, 2007.
Plank, "A Tutorial on Reed-Solomon Coding for Fault Tolerance in RAID-like System," Department of Computer Science, University of Tennessee, pp. 995-1012, Sep. 1997.
Porter, "Operating System Transactions," ACM 978-1-60558-752-3/09/10, published Oct. 1, 2009.
Probert, "Windows Kernel Internals Cache Manager," Microsoft Corporation, http://www.i.u-tokyo.ac.jp/edu/ training/ss/lecture/new-documents/ Lectures/15-CacheManager/Cache Manager.pdf, printed May 15, 2010.
Ranaweera, 05-270RO, SAT: Write Same (10) command (41h), T10/05, Jul. 7, 2005, www.t10.org/ftp/t10/document.05/05-270r0.pdf, last visited Apr. 11, 2013.
Rosen, Richard, "IntelliCache, Scalability and consumer SSDs," blogs.citrix.com/2012/01/03/intellicache-scalability-and-consumer-ssds, Jan. 3, 2012, accessed Aug. 3, 2012.
Rosenblum, "The Design and Implementation of a Log-Structured File System," ACM Transactions on Computer Systems, vol. 10 Issue 1, Feb. 1992.
Samsung Electronics, "Introduction to Samsung's Linux Flash File System—RFS Application Note", Version 1.0, Nov. 2006.
Seagate Technology LLC, "The Advantages of Object-Based Storage-Secure, Scalable, Dynamic Storage Devices, Seagate Research Technology Paper, TP-536" Apr. 2005.
Sears, "Stasis: Flexible Transactional Storage," OSDI '06: 7th USENIX Symposium on Operating Systems Design and Implementation, published Nov. 6, 2006.
Seltzer, "File System Performance and Transaction Support", University of California at Berkeley, published Jan. 1, 1992.
Seltzer, "Transaction Support in a Log-Structured File System", Harvard University Division of Applied Sciences, published Jan. 1, 1993 (Chapter 5, pp. 52-69).
Seltzer, "Transaction Support in Read Optimized and Write Optimized File Systems," Proceedings of the 16th VLDB Conference, Brisbane, Australia, published Jan. 1, 1990.
Shimpi, Anand, The SSD Anthology: Understanding SSDs and New Drives from OCZ, Mar. 18, 2009, 69 pgs.
Shu, "Data Set Management Commands Proposals for ATA8-ACS2," Dec. 12, 2007, http://www.t13.org.Documents/UploadedDocuments/docs2008/e07154r6-Data_Set_Management_Proposal_for_ATA-ACS2.pdf, printed Apr. 5, 2010.
Singer, Dan, "Implementing MLC NAND Flash for Cost-Effective, High Capacity Memory," M-Systems, White Paper, 91-SR014-02-8L, Rev. 1.1, Sep. 2003.
Solid Data, Maximizing Performance through Solid State File-Caching, Best Practices Guide, http://soliddata.com/resources/pdf/bp-sybase.pdf, May 2000.
Spansion, "Data Management Software (DMS) for AMD Simultaneous Read/Write Flash Memory Devices", published Jul. 7, 2003.
Spillane, "Enabling Transactional File Access via Lightweight Kernel Extensions", Stony Brook University, IBM T. J. Watson Research Center, published Feb. 25, 2009.
State Intellectual Property Office, Office Action, CN Application No. 200780050970.0, dated Jun. 29, 2011.
State Intellectual Property Office, Office Action, CN Application No. 200780050970.0, dated Oct. 28, 2010.
State Intellectual Property Office, Office Action, CN Application No. 200780051020.X, dated Nov. 11, 2010.
State Intellectual Property Office, Office Action, CN Application No. 200780050983.8, dated May 18, 2011.
State Intellectual Property Office, Office Action, CN Application No. 200780051020.X, dated Jul. 6, 2011.
State Intellectual Property Office, Office Action, CN Application No. 200780051020.X, dated Nov. 7, 2011.
State Intellectual Property Office, Office Action, CN Application No. 200780050970.0, dated Jan. 5, 2012.
Steere, David et al., Efficient User-Level File Cache Management on the Sun Vnode Interface, School of Computer Science, Carnegie Mellon University, Apr. 18, 1990.
Superspeed, "New Super Cache 5 on Servers," http://www. superspeed.com/servers/supercache.php, last visited Oct. 31, 2013.
Tal, "NAND vs. NOR Flash Technology," M-Systems, www2.electronicproducts.com/PrintArticle.aspx?ArticleURL=FEBMSY1.feb2002.html, visited Nov. 22, 2010.
Terry et al., U.S. Appl. No. 60/797,127, "Filesystem-aware Block Storage System, Apparatus, and Method," filed May 3, 2006.
USPTO, Interview Summary for U.S. Appl. No. 10/372,734, dated Feb. 28, 2006.
USPTO, Notice of Allowance for U.S. Appl. No. 12/986,117, dated Apr. 4, 2013.
USPTO, Notice of Allowance for U.S. Appl. No. 12/986,117 dated Jun. 5, 2013.
USPTO, Office Action for U.S. Appl. No. 12/879,004 dated Feb. 25, 2013.
USPTO, Office Action for U.S. Appl. No. 13/607,486 dated Jan. 10, 2013.
USPTO, Office Action for U.S. Appl. No. 10/372,734, dated Sep. 1, 2005.
USPTO, Office Action for U.S. Appl. No. 11/952,113, dated Dec. 15, 2010.
USPTO, Office Action for U.S. Appl. No. 12/711,113, dated Jun. 6, 2012.
USPTO, Office Action for U.S. Appl. No. 12/711,113, dated Nov. 23, 2012.
USPTO, Office Action for U.S. Appl. No. 13,607,486 dated May 2, 2013.
USPTO, Office Action for U.S. Appl. No. 13/118,237 dated Apr. 22, 2013.
USPTO, Office Action, U.S. Appl. No. 11/952,109, dated May 1, 2013.
USPTO, Office Action, U.S. Appl. No. 11/952,109, dated Nov. 29, 2011.
Van Hensbergen, IBM Research Report, "Dynamic Policy Disk Caching for Storage Networking," IBM Research Division, Computer Science, RC24123 (WO611-189), Nov. 28, 2006.
VMware, Introduction to VMware vSphere, http://www.vmware.com/pdf/vsphere4/r40/vsp_40_intro_vs.pdf, 2009, accessed Aug. 1, 2012.
VMware, Virtual Disk API Programming Guide, Virtual Disk Development Kit 1.2, Nov. 2010, accessed Aug. 3, 2012.
Volos, "Mnemosyne: Lightweight Persistent Memory", ACM 978-1-4503-0266-1/11/03, published Mar. 5, 2011.
Wacha, "Improving RAID-Based Storage Systems with Flash Memory," First Annual ISSDM/SRL Research Symposium, Oct. 20-21, 2009.
Walp, "System Integrated Flash Storage," Microsoft Corporation, 2008, http://download.microsoft.com/download/5/E/6/5E66B27B-988B-4F50-AF3A-C2FF1E62180F/COR-T559_WHO8.pptx, Printed Apr. 6, 2010, 8 pgs.
Wang, "OBFS: A File System for Object-based Storage Devices," Apr. 2004.
Wikipedia, "Object Storage Device," http://en.wikipedia.org/wiki/Object-storage-device, last visited Apr. 29, 2010.
Winnett, Brad, "S2A9550 Overview," White Paper, http://www.ddn.com/pdfs/ddn_s2a_9550_white_paper.pdf, Jul. 2006, 27 pgs.
WIPO, International Preliminary Report of Patentability for PCT/US2007/086691, dated Feb. 16, 2009.
WIPO, International Preliminary Report on Patentability for PCT/US2007/086688, dated Mar. 16, 2009.
WIPO, International Preliminary Report on Patentability for PCT/US2007/086701, dated Mar. 16, 2009.
WIPO, International Preliminary Report on Patentability for PCT/US2007/086687, dated Mar. 18, 2009.
WIPO, International Preliminary Report on Patentability for PCT/US2007/025048, dated Jun. 10, 2009.

(56) References Cited

OTHER PUBLICATIONS

WIPO, International Preliminary Report on Patentability for PCT/US2010/048325, dated Mar. 13, 2012.
WIPO, International Search Report and Written Opinion for PCT/US2007/086691, dated May 8, 2008.
WIPO, International Search Report and Written Opinion for PCT/US2007/025049, dated May 14, 2008.
WIPO, International Search Report and Written Opinion for PCT/US2007/025048, dated May 27, 2008.
WIPO, International Search Report and Written Opinion for PCT/US2007/086701, dated Jun. 5, 2008.
WIPO, International Search Report and Written Opinion for PCT/US2007/086687, dated Sep. 5, 2008.
WIPO, International Search Report and Written Opinion for PCT/US2011/65927, dated Aug. 28, 2012.
WIPO, International Search Report and Written Opinion for PCT/US2012/029722, dated Oct. 30, 2012.
WIPO, International Search Report and Written Opinion for PCT/US2012/039189, dated Dec. 27, 2012.
WIPO, International Search Report and Written Opinion PCT/US2010/025885, dated Sep. 28, 2011.
WIPO, International Search Report and Written Opinion PCT/US2012/050194, dated Feb. 26, 2013.
Woodhouse, David, "JFFS: The Journaling Flash File System," Red Hat, Inc., http://sourceware.org/jffs2/jffs2.pdf, visited Jun. 22, 2010.
Wright, "Extending ACID Semantics to the File System", ACM Transactions on Storage, vol. 3, No. 2, published May 1, 2011, pp. 1-40.
Wu, "eNVy: A Non-Volatile, Main Memory Storage System," ACM 0-89791-660-3/94/0010, ASPLOS-VI Proceedings of the sixth international conference on Architectural support for programming languages and operating systems, pp. 86-97, 1994.
Yang, "A DCD Filter Driver for Windows NT 4," Proceedings of the 12th International Conference on Computer Applications in Industry and Engineering (CAINE-99), Atlanta, Georgia, USA, Nov. 4-6, 1999.
Yerrick, "Block Device," http://www.pineight.com/ds/block, last visited Mar. 1, 2010.
Actel, "Actel Fusion FPGAs Supporting Intelligent Peripheral Management Interface (IPMI) Applications," http://www.actel.com/documents/Fusion_IPMI_AN.pdf, Oct. 1, 2006, visited Mar. 11, 2010.
Adabas, Adabas Caching ASSO, Data, Work, http://communities.softw areag.com/web/guest/pwiki/-/wiki/Main/.../pop_up?_36_viewMode=print, Oct. 2008, accessed Aug. 3, 2012.
Adabas, Adabas Caching Configuration and Tuning, http://documentation.softwareag.com/adabas/ada821mfr/addons/acf/config/cfgover.htm, Sep. 2009, accessed Aug. 3, 2012.
Adabas, Adabas Caching Facility, http://www.softwareag.com/es/Images/Adabas_Caching_Facility_tcm24-71167.pdf, 2008, accessed Aug. 3, 2012.
Adabas, File Level Caching, http://documentation.softwareag.com/adabas/ada824mfr/addons/acf/services/file-level-caching.htm, accessed Aug. 3, 2012.
Agigatech, Bulletproof Memory for RAID Servers, Part 1, http://agigatech.com/blog/bulletproof-memory-for-raid-servers-part-1/, last visited Feb. 16, 2010.
Anonymous, "Method for Fault Tolerance in Nonvolatile Storage", http://ip.com, IP.com No. IPCOM000042269D, 2005.
Ari, "Performance Boosting and Workload Isolation in Storage Area Networks with SanCache," Hewlett Packard Laboratories, Proceedings of the 23rd IEEE / 14th SA Goddard Conference on Mass Storage Systems and Technologies (MSST 2006), May 2006, pp. 263-227.
Arpaci-Dusseau, "Removing the Costs of Indirection in Flash-based SSDs with Nameless Writes," Jun. 2010, HotStorage'10, Boston, MA.
Asine, "ASPMC-660 Rugged IDE Flash Drive PMC Module," http://www.asinegroup.com/products/aspmc660.html, copyright 2002, visited Nov. 8, 2009.
Atlantis Computing Technology, Caching, http://atlantiscomputing.com/technology/caching, published 2012, accessed Aug. 1, 2012.
Bandulet "Object-Based Storage Devices," Jul. 2007 http://developers.sun.com/solaris/articles/osd.htme, visited Dec. 1, 2011.
Barrall et al., U.S. Appl. No. 60/625,495, "Dynamically Expandable and Contractible Fault-Tolerant Storage System Permitting Variously Sized Storage Devices and Method," filed Nov. 5, 2004.
Barrall et al., U.S. Appl. No. 60/718,768, "Dynamically Adaptable Fault-Tolerant Storage System," filed Sep. 20, 2005.
BITMICRO, "BiTMICRO Introduces E-Disk PMC Flash Disk Module at Military & aerospace Electronics East 2004," http://www. bitmicro.com/press.sub, published May 18, 2004, visited Mar. 8, 2011.
Bonnet, "Flash Device Support for Database Management," published Jan. 9, 2011.
Brandon, Jr., "Sparse Matrices in CS Education," Journal of Computing Sciences in Colleges, vol. 24 Issue 5, May 2009, pp. 93-98.
Casey, "San Cache: SSD in the San, "Storage Inc., http://www.solidata.com/resourses/pdf/storageing.pdf, 2000, visited May 20, 2011.
Casey, "Solid State File-Caching for Performance and Scalability," SolidData Quarter 1 2000, http://www/storagesearch._com/3dram.html visited May 20, 2011.
Citrix, XenServer-6.0.0 Installation Guide, Mar. 2, 2012, http://support.citrix.com/servlet/KbServlet/download/28750-102-673824/XenServer-6.0.0-installation.pdf. accessed Aug. 3, 2012.
Clustered Storage Solutions: "Products," http://www.clusteredstorage.com/clustered_storage_solutions.HTML, last visited Feb. 16, 2010.
Coburn, "NV-Heaps: Making Persistent Objects Fast and Safe with Next-Generation, Non-Volatile Memories", ACM 978-1-4503-0266-1/11/0, published Mar. 5, 2011.
Data Direct Networks, "White Paper: S2A9550 Overview," www.// datadirectnet. com, 2007.
EEEL-6892, Lecture 18, "Virtual Computers," Mar. 2010.
ELNEC, "NAND Flash Memories and Programming NAND Flash Memories Using ELNEC Device Programmers, Application Note," published Mar. 1, 2007.
Ferber, Christian, "XenDesktop and local storage + IntelliCache," Jun. 22, 2011, blogs.citrix.com/2011/06/22/xendesktop-and-local-storage-intellicache/, accessed Aug. 3, 2012.
Friedman, Mark, et al., "File Cache Performance and Tuning, Windows 2000 Performance Guide, O'Reilly & Associates, Inc., http://msdn.microsoft.com/en-us/ library/ms369863.aspx," published Jan. 2002, visited Aug. 3, 2012.
Gal, "A Transactional Flash File System for Microcontrollers," 2005 USENIX Annual Technical Conference, published Apr. 10, 2009.
Garfinkel, "One Big File Is Not Enough: A Critical Evaluation of the Dominant Free-Space Sanitization Technique," 6th Workshop on Privacy Enhancing Technologies. Cambridge, United Kingdom, published Jun. 1, 2006.
Gill, "WOW: Wise Ordering for Writes—Combining Spatial and Temporal Locality in Non-Volatile Caches," IBM, Fast "05: 4th USENIX Conference on File and Storage Technologies, 2005.
Gutmann, "Secure Deletion of Data from Magnetic and Solid-State Memory", Usenix, 14 pages, San Jose, CA, published Jul. 1, 1996.
Huffman, "Non-Volatile Memory Host Controller Interface," Apr. 14, 2008, 65 pgs.
Hynix Semiconductor, Intel Corporation, Micron Technology, Inc. Phison Electronics Corp., Sony Corporation, Spansion, Stmicroelectronics, "Open NAND Flash Interface Specification," Revision 2.0, Feb. 27, 2008.
Albert Noll et al., CellVM: A Homogeneous Virtual Machine Runtime System for a Heterogeneous Single-Chip Multiprocessor; *Technical Report No. 06-17, Donald Bren School of Information and Computer Science, University of California, Irvine*; Nov. 2006.
NEVEX Virtual Technologies, CacheWorks Data Sheet, http://www.nevex.com/wp-content/uploads/2010/12/Data-Sheet3.pdf, Published Dec. 1, 2010, Visited Aug. 1, 2012.
David C. Steere et al., "Efficient User-Level File Cache Management on the Sun Vnode Interface," School of Computer Science, Carnegie Mellon University, CMU-CS-90-126, Usenix Conference Proceedings, Jun. 1990.

(56) References Cited

OTHER PUBLICATIONS

Pin Lu et al., Virtual machine memory access tracing with hypervisor exclusive cache, Proceedings of the USENIX Annual Technical Conference 2007 (ATC'07), Article No. 3, 15 pages.
Mark Friedman et al., File Cache Performance and Tuning, Windows 2000 Performance Guide, O'Reilly & Associates, Inc., http://msdn.microsoft.com/en-us/library/ms369863.aspx, Published Jan. 2002, Visited Aug. 3, 2012.
Microsoft, Filter Driver Development Guide, http://download.microsoft.com/download/e/b/a/eba1050f-a31d-436b-9281-92cdfeae4b45/FilterDriverDeveloperGuide.doc, 2004, Published 2004, Visited Aug. 3, 2012.
Microsoft, File Cache Management, Windows Embedded CE 6.0 R3, msdn.microsoft.com/en-us/subscriptions/aa911545.aspx, Published Aug. 28, 2008, Visited Aug. 3, 2012.
D. Muntz et al., Multi-level Caching in Distributed File Systems, CITI Technical Report 91-3, Aug. 16, 1991.
Craig Linn, Windows I/O Performance: Cache Manager and File System Considerations, CMGA Proceedings, Sep. 6, 2006.
Adabas, Adabas Caching Configuration and Tuning, http://documentation.softwareag.com/adabas/ada821mfr/addons/acf/config/cfgover.htm, Published Sep. 2009, Visited Aug. 3, 2012.
Adabas, Adabas Caching Facility, http://www.softwareag.com/es/Images/Adabas_Caching_Facility_tcm24-71167.pdf, Published 2008, Visited Aug. 3, 2012.
VMware, Introduction to VMware vSphere, http://www.vmware.com/pdf/vsphere4/r40/vsp_40_intro_vs.pdf, Published 2009, Visited Aug. 1, 2012.
VMware, Virtual Disk API Programming Guide, Virtual Disk Development Kit 1.2, Published Nov. 2010, Visited Aug. 3, 2012.
Richard Rosen, IntelliCache, Scalability and consumer SSDs, blogs.citrix.com/2012/01/03/intellicache-scalability-and-consumer-ssds, Jan. 3, 2012, accessed Aug. 3, 2012.
Christian Ferber, XenDesktop and local storage + IntelliCache, Jun. 22, 2011, blogs.citrix.com/2011/06/22/xendesktop-and-local-storage-intellicache/, accessed Aug. 3, 2012.
Adabas, Adabas Caching ASSO, Data, Work, Aug. 26, 2011, http://communities.softwareag.com/web/guest/pwiki/-/wiki/Main/.../pop_up?_36_viewMode=print, Oct. 2008, accessed Aug. 3, 2012.
USPTO, Office Action for U.S. Appl. No. 14/262,581 dated Jun. 19, 2014.
USPTO, Office Action Interview Summary for U.S. Appl. No. 13/541,659 dated Aug. 26, 2014.
USPTO, Office Action for U.S. Appl. No. 13/192,365 dated Jul. 17, 2014.
USPTO, Office Action for U.S. Appl. No. 13/287,998 dated Jun. 10, 2014.
USPTO, Office Action for U.S. Appl. No. 13/288,005 dated Jul. 8, 2014.
USPTO, Office Action for U.S. Appl. No. 13/750,904 dated Nov. 3, 2014.
USPTO, Office Action for U.S. Appl. No. 13/837,210 dated Feb. 27, 2015.
Final Office Action for U.S. Appl. No. 13/541,659, filed Jul. 3, 2012, and mailed from the USPTO dated Feb. 25, 2016, 15 pgs.
First Action Interview Pilot Program Pre-Interview Communication for U.S. Appl. No. 13/541,659, filed Jul. 3, 2012, and mailed from the USPTO dated Jun. 6, 2014.
Non-Final Office Action for U.S. Appl. No. 13/541,659, filed Jul. 3, 2012, and mailed from the USPTO dated Aug. 13, 2015.
Final Office Action for U.S. Appl. No. 13/541,659, filed Jul. 3, 2012, and mailed from the USPTO dated Mar. 25, 2015.
First Action Interview Office Action Summary for U.S. Appl. No. 13/541,659, filed Jul. 3, 2012, and mailed from the USPTO dated Oct. 31, 2014.
USPTO, office action in U.S. Appl. No. 13/541,659 dated Jul. 29, 2016.

* cited by examiner

| Next Cache Tag Index | State | Clock Hands | Checksum | Valid Unit Map | VMID |
|---|---|---|---|---|---|
| | | | | | |
| | | | | | |

SYSTEMS, METHODS AND APPARATUS FOR CACHE TRANSFERS

CROSS REFERENCE TO RELATED APPLICATIONS

This application is a continuation-in-part of and claims priority to U.S. patent application Ser. No. 13/541,659, entitled "Systems, Methods, and Apparatus for a Virtual Machine Cache, filed on Jul. 3, 2012, and which is hereby incorporated by reference.

TECHNICAL FIELD

The embodiments described herein relate to the management of data input/output (I/O) operations in a computing environment and, in particular, to cache warming.

BRIEF DESCRIPTION OF THE DRAWINGS

This disclosure includes and references the accompanying drawings, which provide a more particular description of the embodiments disclosed herein. The disclosure, however, is not limited to the particular embodiments depicted in the figures. The teachings of the disclosure may be utilized and/or adapted to other embodiments and/or changes may be made to the disclosed embodiments, without departing from the scope of the disclosure.

DETAILED DESCRIPTION

Disclosed herein are systems, apparatus, and methods for efficient I/O using cache storage. The cache storage may comprise various memory devices, such as flash memory devices or RAM (random access memory) that may or may not be block oriented. The systems and methods described herein do not differentiate between Flash memory, RAM or other types of memory, and further envision new types of memory developed in the future that will utilize various embodiments described herein. The described systems and methods may utilize any type of memory device, regardless of the specific type of memory device shown in any figures or described herein. Particular systems and methods described herein may generally be referred to as an "I/O hypervisor" due to its management of I/O operations in a virtualized environment.

The systems and methods described herein relate to the management of data input/output (I/O) operations in a computing environment. Although particular examples disclosed herein relate to virtualized environments, the disclosure is not limited in this regard, and could be applied to any type of computing environment, including non-virtualized, "bare metal" computing environments. In particular implementations, the described systems and methods intercept I/O operations in the virtualized environment to dynamically allocate resources, such as cache resources, across multiple virtual machines in the virtualized environment. This management of data I/O operations improves the performance of the virtual machines and reduces the number of I/O operations handled by the primary storage system. Additionally, the management of I/O operations is transparent to other components in the virtualized environment and can be implemented without modification to existing application software or existing data storage systems. Thus operating systems that currently exist will be oblivious to the operations of the embodiments described herein, which will cooperate with the basic operation characteristics of virtual operating systems and not disrupt them, while better optimizing the operations of virtual machines resident in hosts.

Figure 1A:
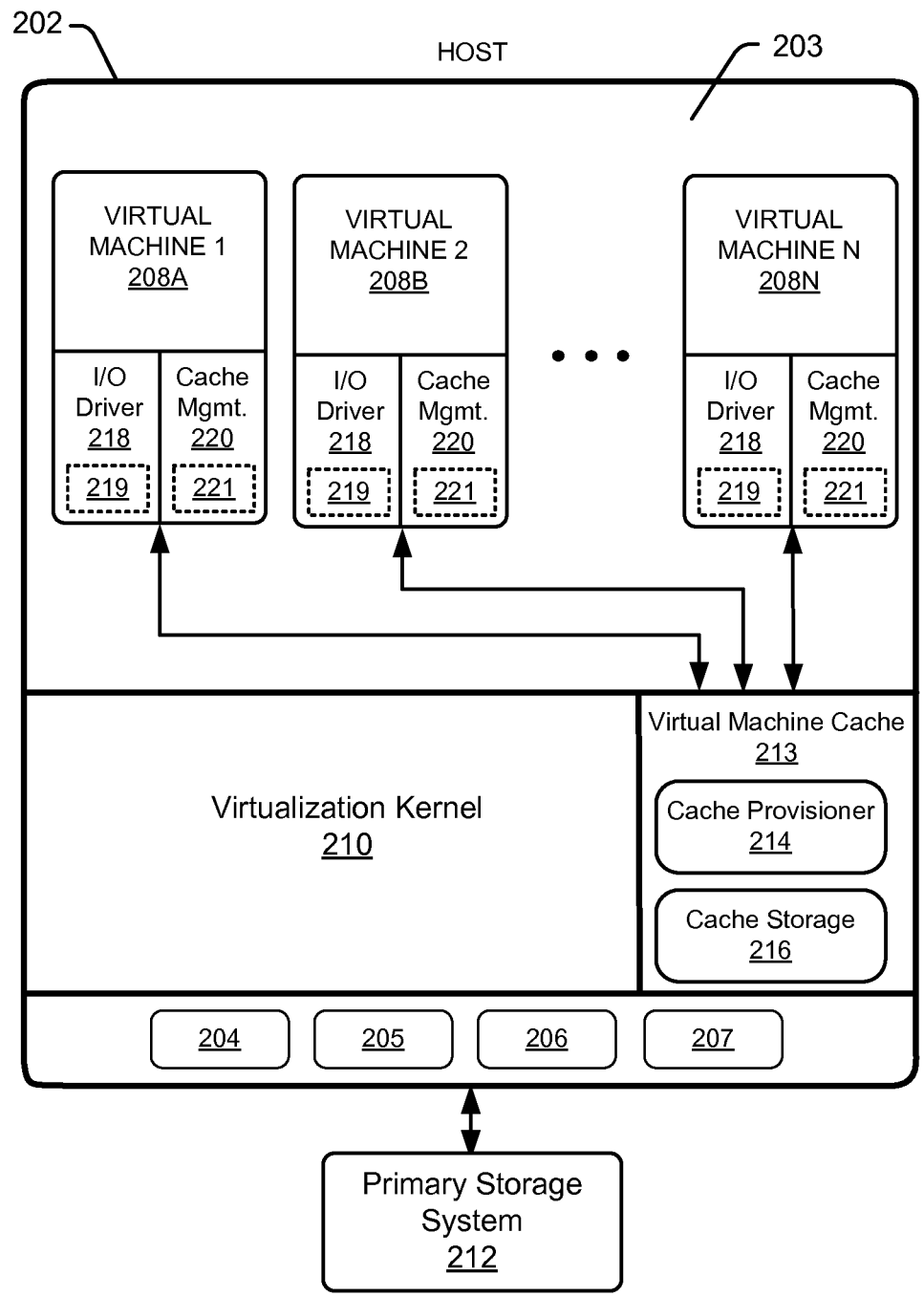
FIG. 1A depicts embodiments of systems and apparatus for caching data in a virtualized environment.

FIG. 1A depicts embodiments of systems and apparatus for caching data in a virtualized environment, including a host 202 comprising a virtualization kernel 210 and user space 203. The user space 203 may comprise multiple virtual machines 208A-N, each of which may comprise a "guest operating system," and/or other virtualized computing resources. Although FIG. 1A depicts one embodiment of a virtualization environment, the disclosure is not limited in this regard, and could operate as a "bare metal" system. As used herein, a "bare metal" system refers to an operating system (e.g., Windows®, Unix®, Linux, or the like) that executes directly on computing device hardware (e.g., without a virtualization layer or hypervisor, such as the virtualization kernel 210). An operating system executing on bare metal may be referred to as a "base operating system." A bare metal computing device, operating system, and/or application may, therefore, not operate within the virtualization kernel 210. As used herein, a "virtual system" or "virtual machine," refers to a computing device, operating system, and/or application operating within a virtualization kernel (e.g., virtualization kernel 210). The terms "virtual machine" and "guest OS" (guest operating system) are used interchangeably herein.

Each virtual machine 208A-N may be configured to implement a different guest operating system. The host 202 may comprise one or more computing devices capable of hosting multiple virtual machines 208A-N and supporting the applications executed by the virtual machines and the functions associated with those applications. The host 202 may comprise, for example, one or more processors 204, memory devices 205, persistent storage devices 206, communication devices 207 (e.g., 110 interfaces, network interfaces, human-machine interfaces, etc.), and so on. Although FIG. 1A depicts three virtual machines 208A-N, the disclosure is not limited in this regard; the virtualized environment could include any number of hosts 202 comprising any number of virtual machines 208A-N.

The virtualization kernel 210 may be configured to manage the operation of the virtual machines 208A-N operating on the host 202 as well as other components and services provided by the host 202. For example, the virtualization kernel 210 may be configured to handle various I/O operations associated with a primary storage system 212 or other I/O devices. The primary storage system 212 may be shared among the multiple virtual machines 208A-N, and may be shared by multiple hosts. The primary storage system 212 may comprise multiple disk drives or other storage devices, such as one or more storage arrays (e.g., RAID, JBOD, or the like).

The host 202 may further comprise a virtual machine cache 213, which may be configured to provide caching services to the virtual machines 208A-N deployed on the host computing device 202. The virtual machine cache 213 may comprise a cache provisioner module 214 and cache storage 216. The cache storage 216 may comprise one or more storage devices, including, but not limited: solid-state memory devices, Random Access Memory ("RAM") devices, volatile memory, battery-backed RAM, or the like. As used herein, a "solid-state memory device," refers to a non-volatile, persistent memory that can be repeatedly erased and reprogrammed. Accordingly, a solid-state memory device may comprise a solid-state storage device and/or solid-state storage drive (SSD) (e.g., a Flash storage device). The cache provisioner module 214 may be configured to provision resources of the cache storage 216 to the virtual machines 208A-N, which may comprise dynamically provisioning cache resources and/or I/O operations ("IOPS") to the virtual machines 208A-N. The cache provisioner module 214 may be configured to provide for sharing resources of the cache storage 216 between multiple virtual machines 208A-N. The cache provisioner module 214 may be further configured to protect and/or secure data stored within the cache storage 216, to prevent more than one virtual machine 208A-N from accessing the same cache data. For example, in some embodiments, the cache provisioner module 214 is configured to associate cached data with a virtual machine identifier (via a map module as described below in conjunction with FIG. 8A), which may be used to control access to data in the cache storage 216. Additional details regarding the operation of cache provisioner module 214 and cache storage 216 as disclosed below.

The virtual machines 208A-N may comprise an I/O driver 218 and a cache management system (CMS) 220. The I/O driver 218 may be configured to intercept I/O operations of the associated virtual machine 208A-N, and to direct the I/O operations to the CMS 220 for processing; selected I/O operations may be serviced using the virtual machine cache 213.

In some embodiments, and as depicted in FIG. 1A, one or more of the virtual machines 208A-N may comprise respective I/O drivers 218; the I/O driver 218 may, therefore, be in "close proximity" to the source of I/O operations of the virtual machines 208A-N (e.g., the I/O driver 218 does not have to access the virtualization kernel 210 and/or cross a virtual machine boundary to access information pertaining to virtual machine 208A-N I/O operations).

In some embodiments, the I/O driver 218 may comprise and/or be implemented as a "device driver" (e.g., a device driver of respective guest operating systems of the virtual machines 208A-N). The I/O driver 218 may comprise a generic component that forms part of an operating system and a device-specific component. The I/O driver 218 may leverage I/O Application Programming Interfaces (APIs) published by the guest operating system (e.g., may be in the I/O "path" of the virtual machines 208A-N). Accordingly, in some embodiments, the I/O driver 218 may comprise a "filter driver" configured to operate above standard device drivers in an I/O stack of a virtual machine 208A-N.

In some embodiments, the virtual machines 208A-N may be configured to be transferred and/or relocated between hosts 202. The systems, apparatus, and methods disclosed herein may provide for transferring a "cache operating state" between hosts 202. As used herein, "cache operating state" or "cache state" refers to a current working state of a cache, which may include, but is not limited to: cache metadata, such as cache admission information (e.g., cache tags 221), access metrics, and so on; cache data (e.g., the contents of a cache storage 216); and the like. Transferring a cache operating state may, therefore, comprise transferring cache metadata and/or cache data.

The virtualization kernel 210 (or other virtualization layer) may be configured to prevent virtual machines that reference local resources of the host 202, such as local disk storage or the like, from being transferred. Accordingly, virtual machines 208A-N may be configured to access the virtual machine cache 213 as if the virtual machine cache 213 were a shared storage resource and/or in a way that does not prevent the virtual machines 208A-N from being transferred between hosts 202.

Figure 1B:
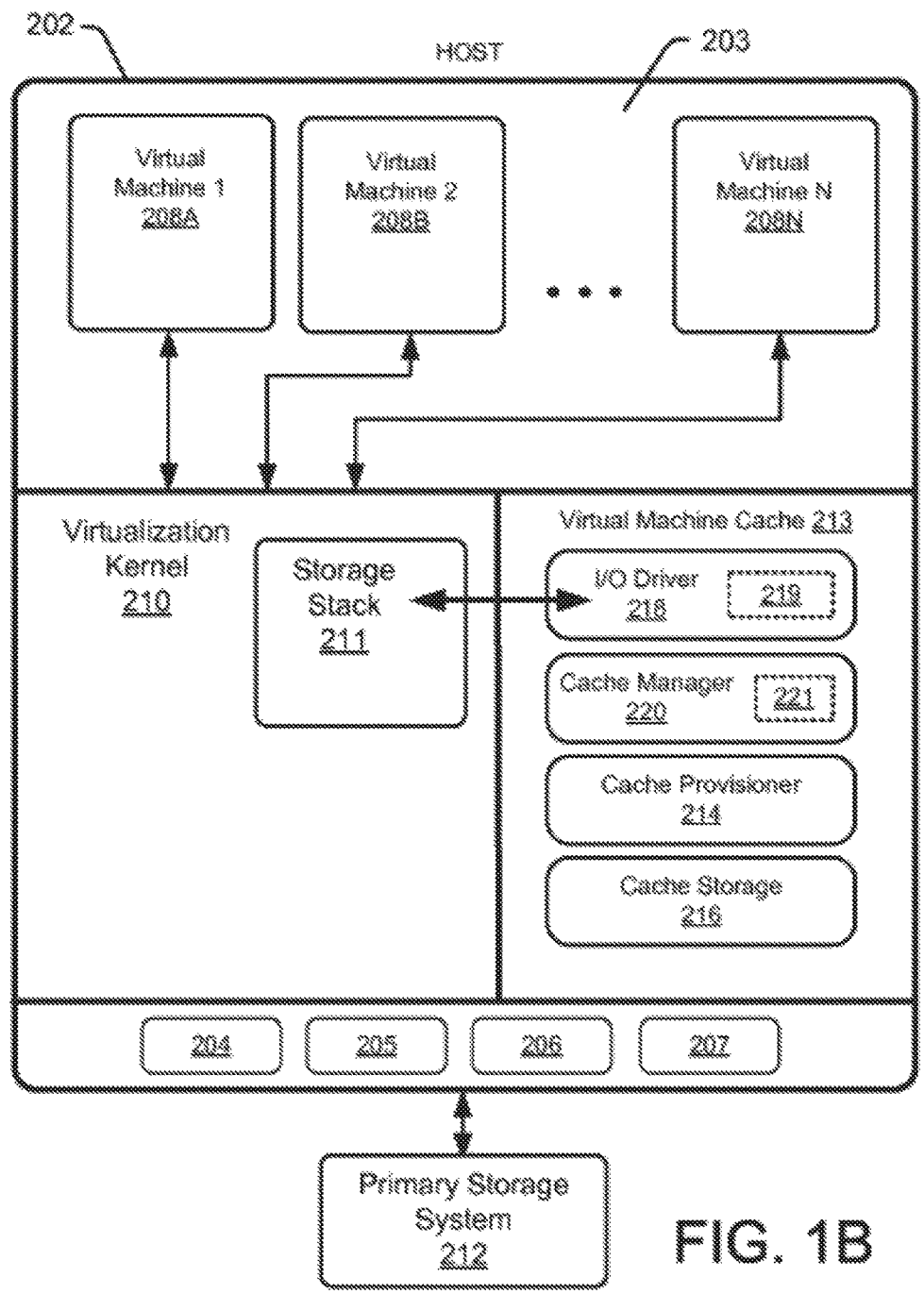
FIG. 1B depicts embodiments of systems and apparatus for caching data in a virtualized environment.

One or more of the virtual machines 208A-N may comprise a CMS 220, which may be configured to manage cache resources provisioned to the virtual machine 208A-N. The CMS 220 may be configured to maintain cache metadata, such as cache tags 221 to represent data that has been admitted into the virtual machine cache 213. The cache tags 221 may be maintained within memory resources of the virtual machine 208A-N, such that the cache tags 221 are transferred with the virtual machine between hosts (208A-N). In other embodiments, and as depicted in FIG. 1B, the CMS 220 and/or cache tags 221 may be maintained within the virtualization kernel 210 (e.g., within the virtual machine cache 213).

The cache provisioner module 214 may be configured to dynamically provision cache resources to the virtual machines 208A-N. Cache allocation information associated with a particular virtual machine (e.g., virtual machine 1 208A) may be communicated to the corresponding virtual-machine CMS 220 (via the I/O driver 218 and/or using another communication mechanism). Additional details regarding the operation of the I/O driver 218 and the cache provisioner module 214 are provided below.

In some embodiments, the CMS 220 is configured to request cache storage from the cache provisioner module 214. The request may be transmitted in response to a CMS 220 initialization operation (e.g., cache "warm up"). As used herein, cache initialization refers to one or more operations to prepare the CMS 220 for operation. The CMS 220 may be configured to perform one or more initialization operations in response to the virtual machine 208A-N being powered on, restarted, transferred a different host 202 (e.g., in a VMotion™ operation), or the like.

A cache initialization operation may comprise a handshake protocol with the virtual machine cache 213, which may comprise identifying the virtual machine 208A-N, assigning a virtual machine identifier (VMID) to the virtual machine 208A-N, allocating cache storage to the virtual machine 208A-N, and so on. The handshake protocol and/or cache initialization may further comprise the cache provisioner module 214 allocating cache storage capacity to the virtual machine 208A-N, as described above. The virtual machine cache 213 may maintain list, or other data structure, that identifies the virtual machines 208A-N deployed on the host 202. The virtual machines 208A-N may be identified by VMID or other identifier(s). The virtual machine cache 213 may identify a transferred virtual machine 208A-N based, at least in part, on the VMID of the virtual machine 208A-N. For example, the virtual machine cache 213 may determine that the virtual machine 208A-N was transferred from another host 202 in response to the VMID not appearing in the list of deployed virtual machines, and may determine that the virtual machine 208A-N was transferred to the host 202 based upon a host identifier of the VMID (and/or a separate host identifier maintained by the virtual machine 208A-N).

Alternatively, or in addition, the virtual machine cache 213 may be configured to actively identify a transferred virtual machine 208A-N. For example, the virtual machine cache 213 may be configured to periodically query the virtual machines 208A-N for a VMID and/or current host id, which, as discussed above, may be used to determine whether the virtual machine 208 was transferred in from a remote host 202. In another example, the CMS 220 of a virtual machine 208 may be configured to periodically interrogate the virtual machine cache 213, which may initiate a handshake protocol (as discussed above) before the virtual machine 208 performs any I/O requests.

Figure 8A:
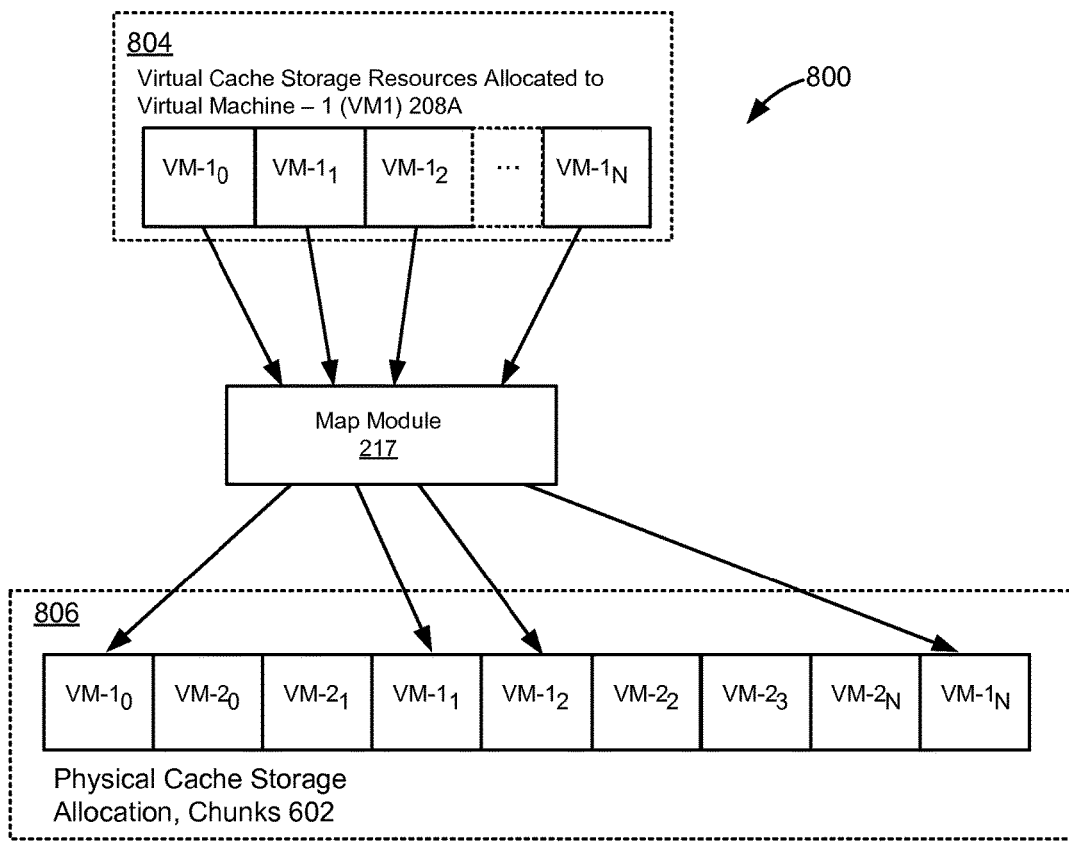
FIG. 8A depicts embodiments of virtual cache resource mappings.

In some embodiments, the cache provisioner module 214 is configured to maintain mappings between the virtual machines 208A-N and respective cache storage locations allocated virtual machines 208A-N (e.g., as depicted in FIG. 8A). The mappings may be used to secure cache data of the virtual machines 208A-N (e.g., by limiting access to the virtual machine 208A-N mapped to the cached data) and/or to provide for retaining and/or transferring cache data of one or more virtual machines 208A-N transferred from the host 202 to other, remote hosts, as disclosed herein.

The CMS 220 may be configured to maintain cache metadata, which may comprise cache tags 221 in accordance with the cache storage that has been allocated to the virtual machine 208A-N. As used herein, a "cache tag" refers to an association between an identifier and a cache resource (e.g., a page or other cache storage location in the cache storage 216). Accordingly, the cache tags 221 may represent cache resources that have been allocated to a particular virtual machine 208A-N by the cache provisioner module 214. As used herein, an "identifier" of a cache tag 221 refers to an identifier used by the virtual machine 208A-N to reference data that has been (or will be) stored in the cache storage 216. A cache tag identifier may include, but is not limited to: an address (e.g., a memory address, physical storage address, logical block address, etc., such as an address on the primary storage system 212), a name (e.g., file name, directory name, volume name, etc.), a logical identifier, a reference, or the like.

The cache tags 221 may be stored within the respective virtual machine 208A-N (e.g., in volatile memory allocated to the virtual machine 208A-N by the host 202). In some embodiments, the cache tags 221 may represent a "working set" of cache data of the virtual machine 208A-N. As used herein, a "working set" of cache tags 221 refers to a set of cache that that has been admitted and/or retained in the cache storage 216 by the CMS 220 through, inter alia, the application of one or more cache policies, such as cache admission policies, cache retention and/or eviction policies (e.g., cache aging metadata, cache steal metadata, least recently used (LRU), "hotness" and/or "coldness," and so on), cache profiling information, file- and/or application-level knowledge, and the like. Accordingly, the working set of cache tags 221 may represent the set of cache data that provides optimal I/O performance for the virtual machine 208A-N under certain operating conditions.

In some embodiments, the CMS 220 may be configured to preserve a "snapshot" of the cache, which may comprise persisting the cache tags 221 in a non-volatile storage medium, such as the primary storage system 212, persistent cache storage device (e.g., cache storage 216), or the like. As used herein, a "snapshot" refers to a "working set" of the cache at a particular time. A snapshot may comprise all or a subset of the cache metadata of the CMS 220, including the cache tags 221 and/or other related cache metadata, such as access metrics, and so on. In some embodiments, a snapshot may further comprise "pinning" data in the cache storage 216, which may cause data referenced by the one or more cache tags 221 to be retained in the cache storage 216. Alternatively, the snapshot may reference only the data identifiers (e.g., cache tags), and may allow the underlying data to be removed and/or evicted from the cache storage 216. The CMS 220 may be configured to load a snapshot from persistent storage, and to use the snapshot to populate the cache tags 221. A snapshot may be loaded as part of an initialization operation (e.g., cache warm up) and/or in response to configuration and/or user preference. For example, the CMS 220 may be configured to load different snapshots that are optimized for particular application(s) and/or service(s). Loading a snapshot may further comprise requesting cache storage from the cache provisioner module 214, as described above. In some embodiments, the cache management service 220 may load a subset of a snapshot if the virtual machine 208A-N cannot allocate sufficient cache space for the full snapshot.

The CMS 220 may be further configured to retain the cache tags 221 in response to relocating and/or transferring the virtual machine 208A-N to another host 202 (e.g., in a VMotion™ operation, as described below). Retaining the cache tags 221 may comprise maintaining the cache tags 221 in the memory of the virtual machine 208A-N and/or not invalidating the cache tags 221. Retaining the cache tags 221 may further comprise requesting cache storage from the cache provisioner module 214 of the destination host 202 in accordance with the retained cache tags 221, and/or selectively adding and/or removing cache tags 221 in response to being allocated more or less cache storage on the new host 202. In some embodiments, the CMS 220 may retain the cache tags 221 despite the fact that the cache data referenced by the cache tags 221 does not exist in the cache storage 216 of the new host. As described below, the virtual machine cache 213 may be configured to populate the cache storage 216 with cache data from a previous host 202 of the virtual machine 208A-N (e.g., via a network transfer), and/or from a shared, primary storage 212 system.

FIG. 1B depicts embodiments of systems and apparatus for caching data in a virtualized environment. In the FIG. 1B embodiment, the CMS 220 is implemented within the virtualization kernel 210 (e.g., outside of the virtual machines 208A-N). The virtual machines 208A-N may be "standard virtual machines" that do not comprise a separate CMS 220 or other cache-specific modules, components, and/or configuration (other than cache functionality provide as part of a standardized virtual machine and/or guest operating system). The virtual machines 208A-N may, therefore, access cache resources through normal I/O operations performed through the virtualization kernel 210 (e.g., by use of a CMS 220 operating within the virtualization kernel 210).

The virtual machine cache 213 may be configured to provide caching services for the virtual machines 208A-N for the virtual machines 208A-N, which may comprise maintaining cache tags 221 for the virtual machines 208A-N, admitting data of the virtual machines 208A-N into the cache storage 216, servicing I/O requests of the virtual machines 208A-N from the cache storage 216, and so on. The cache manger 220 may be configured to maintain cache tags 221 for each of the virtual machines 208A-N in accordance with cache resources allocated to the virtual machines 208A-N by the cache provisioner 214. Alternatively, the virtual machine cache 213 may comprise a plurality of different sets of cache tags 221 (and/or separate instances of the CMS 220) for the respective virtual machines 208A-N.

I/O requests of the virtual machines 208A-N may be handled within a storage stack 211. The storage stack 211 may comprise an I/O framework of the host operating system and/or virtualization kernel 210. The storage stack 211 may define a storage architecture in which storage services, such as file system drivers, volume drivers, disk drivers, and the like, are deployed. Storage services may be configured to interoperate by issuing and/or consuming I/O requests within various layers of the storage stack 211.

The I/O driver 218B of the virtual machine cache 213 may be configured to monitor I/O requests within the storage stack 211 and to identify I/O requests of the virtual machines 208A-N. The I/O requests may be directed to the primary storage system 212, or other I/O devices and/or systems within the virtualization environment 201. In some embodiments, the I/O driver 218B comprises a filter driver 219B configured to monitor I/O request packets (IRP) of a Microsoft Windows® operating system. This disclosure is not limited in this regard, however, and may be applied to any suitable I/O framework of any operating system (e.g., Unix®, LINUX, OSX®, Solaris®, or the like). The filter driver 219B may be configured to monitor I/O requests at a SCSI and/or disk layer of the storage stack 211.

The virtual machine cache 213 may be configured to selectively service I/O requests, which may comprise provisioning cache storage to the virtual machines 208A-N by use of the cache provisioner 214, maintaining cache tags 220 for the virtual machines 208A-N by use of the CMS 220, selectively admitting data of the I/O requests into the cache storage 216, and/or servicing I/O requests from the cache storage 216.

In some embodiments, one or more of the virtual machines 208A-N may comprise a virtual desktop, such as a desktop environment associated with a particular user or group of users. One or more users may accesses the desktop environment via a terminal or other system or device. This type of virtual desktop environment is commonly referred to as Virtual Desktop Infrastructure ("VDI"). Thus, a single host 202 can replace many individual desktop computing systems. Alternatively, or in addition, one or more of the virtual machines 208A-N may provide one or more server-side applications. Accordingly, a single host 202 can replace a number of individual software or application servers.

Figures 2, 3:
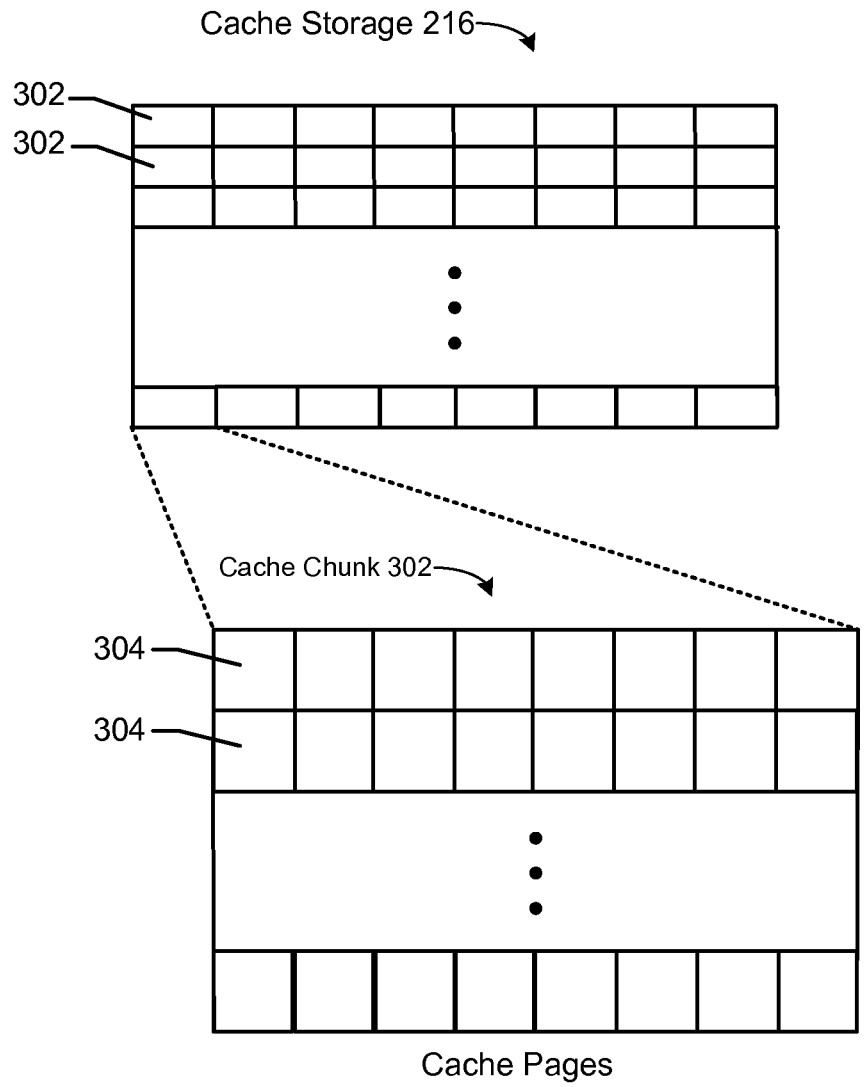
FIG. 2 depicts one embodiment of cache storage.
FIG. 3 depicts one embodiment of a cache tag data structure.

As disclosed above, the cache storage 216 may comprise non-volatile storage resources, such as a solid-state storage device and/or a portion thereof. The cache storage 216 may be broken into multiple chunks 302. As used herein a "chunk" refers to an arbitrarily sized portion of cache storage capacity; the cache storage 216 may be divided into any number of chunks 302 having any size. Each cache chunk 302 may comprise a plurality of pages 304, each of which may comprise one or more storage units (e.g., sectors). In a particular embodiment, each chunk 302 may comprise 256 MB (megabytes) of storage capacity. In this embodiment, the number of chunks 302 may be determined by the available storage capacity of the cache storage 216. For example, a 1 TB (terabyte) cache storage 216 divided into 256 MB chunks 302 contains 4192 chunks. As shown in FIG. 2, each chunk 302 is divided into multiple cache pages 304.

The cache storage 216 may be shared between a plurality of virtual machines 208A-N operating on the host 202. A cache chunk 302 may be assigned or allocated to a particular one of the virtual machines 208A-N based upon, inter alia, the cache needs of the virtual machine 208A-N, availability of cache resources, and so on. The number of chunks 302 allocated to a particular virtual machine 208A-N may change over time as the cache needs of the virtual machine(s) 208A-N change. The number of chunks 302 assigned to a specific virtual machine 208A-N may determine the cache capacity of that virtual machine 208A-N. For example, if two 256 MB chunks are assigned to a specific virtual machine, that virtual machine's cache capacity is 512 MB. The assignment of chunks 302 to particular virtual machines 208A-N may be managed by the cache provisioner module 214.

Cache tags 221 are used in mapping storage I/O addresses in a virtual machine to cache pages 304 (e.g., physical addresses) in the cache storage 216. The cache tags 221 can cache data associated with any storage device assigned to a virtual machine 208A-N. The cache tags 221 may, therefore, be used to perform translations between identifiers in the cache tags 221 (e.g., address of blocks on a primary storage system 212) and a cache address. In some embodiments, cache tags 221 may be organized linearly in RAM or other memory. This allows the address of the cache tag 221 to be used to locate a physical cache page 304 because of the algorithmic assumption that each cache tag has a linear 1:1 correspondence with a physical cache page 304. Alternatively, or in addition, cache tags 221 may be organized into another data structure, such as a hashtable, index, tree, or the like.

As shown in FIG. 1A, the cache tags 221 associated with a particular virtual machine 208A-N may be stored within that virtual machine 208A-N (e.g., in the memory space of the virtual machine 208A-N). The cache tags 221 contain metadata that associates storage I/O addresses to specific cache pages 304 in the cache storage 216. In a particular embodiment, each cache tag 221 is associated with a particular page 304 in the cache storage 216.

Referring back to FIG. 2, in some embodiments, cache storage is allocated using a "thin provisioning" approach. A thin provisioning approach may be used where the virtual machines 208A-N are configured to operate with fixed-size storage resources and/or changes to the reported size of a storage resource would result create error condition(s) within the virtual machines 208A-N. In this embodiment, each virtual machine 208A-N is allocated a particular number of cache chunks 302. However, the entire cache capacity is "published" to each of the virtual machines 208A-N (through a virtual disk or other I/O interface). For example, if the total cache size is 2 TB, each virtual machine 208A-N reports that it has access to the entire 2 TB. The actual allocation of cache chunks 302, however, may be considerably smaller (e.g., 256 MB or 512 MB), based on the current needs of the virtual machine 208A-N. The allocated cache chunks 302 correspond to a specific range of cache addresses available within the cache storage 216. The cache provisioner module 214 dynamically changes these cache chunk allocations in accordance with changing I/O conditions. Regardless of the number of cache chunks 302 actually allocated to a particular virtual machine 208A-N, the cache storage interface may appear to have a constant, fixed size (e.g., 2 TB), which may allow for dynamic cache reallocation without generating error conditions within the virtual machines 208A-N.

The cache storage 216 may support multiple page sizes 302, which may be adapted in accordance with the requirements and/or preferences of different virtual machines 208A-N and/or applications operating thereon. For instance, some applications may be configured to perform 32K data I/O operations. It may be desirable to use a large cache page size, such as 16K or 32K, to minimize the number of data I/O operations necessary to handle the 32K of data; if the cache page size is 4K and the application performs a 32K data I/O operation, eight cache pages must be accessed to read or write the 32K of data. It may be more efficient to use a cache page size of 16K, such that only two I/O operations are required to process the 32K of data. Thus, the larger cache page size reduces I/O operations and the corresponding burden on system resources.

Using larger cache page sizes also reduces the number of cache tags 221, thereby reducing memory overhead. For example, in a one terabyte cache having 4K cache pages, 256M cache tags 221 are necessary to provide a single cache tag 221 for each cache page. In the same system using 16K cache pages, 64M cache tags 221 are needed. Thus, the larger cache page size reduces the number of cache tags 221 and the memory resources needed to store the cache tags 221.

Although larger cache page sizes can reduce I/O operations and reduce the number of cache tags 221, in certain situations a larger cache page size can result in underutilized cache resources. For example, if a system is using a 32K cache page size and an application performs a 4K I/O operation, only a small fraction of the 32K page is used (28K of the page is not needed). This situation results in significant unused cache resources. Therefore, the systems and methods described herein support multiple cache page sizes to improve utilization of system resources, such as I/O resources and cache storage resources.

Different applications have different data storage characteristics. Applications can be characterized as having "sparse address spaces" or "dense address spaces". Sparse address spaces tend to have scattered data with significant gaps between different groupings of data. In contrast, dense address spaces tend to have data that is more compact with fewer (or smaller) gaps between different groupings of data. When selecting cache page sizes for a particular virtual environment, it is important to consider the data storage characteristics (e.g., sparse or dense address spaces) associated with applications executing in the virtual environment. There can be exceptions where a sparse address space may comprise groups of contiguous data where the groups are sparsely located. In such cases one can use large pages even though the address space is sparse.

In a particular embodiment, I/O operations of applications can be analyzed prior to implementing the systems, apparatus, and methods disclosed herein. This prior analysis allows the system to be "tuned" based on typical application data. After the systems and methods are implemented, the dynamic nature of the system allows for adjustments to cache page sizes, cache allocations, system resources, and other parameters based on changes in the operation of the application.

In a particular implementation, a cache is divided into multiple sections such that each section supports different cache page sizes. Because application I/O workloads can vary, a particular cache page size for one application may be more efficient than for another application. One objective in using different cache page sizes is to minimize the number of I/O requests that cross cache page boundaries. For example, a cache may be divided into four sections, two of which support 4K cache pages, one that supports 16K cache pages, and one that supports 32K cache pages. The cache pages 304 in these different sections are allocated to different virtual machines 208A-N and/or applications based, for example, on the data storage characteristics of the applications.

In one embodiment, a different hash table is used for each different cache page size. Each hash table has its own associated hash function that identifies a particular hash slot in the table based on an address provided to the hash function. When using multiple hash tables, such as a 4K hash table and a 16K hash table, the systems and methods perform a lookup operation for each hash table. Performing a lookup in both hash tables is necessary because a 4K address could be contained within a 16K entry in the 16K hash table. To enhance the lookup process, the systems and methods described herein apply one or more algorithms based on a percentage of cache hits associated with different cache page sizes, a success rate associated with different hash tables, and other factors to weight the lookup between the different hash tables and thereby improve the lookup efficiency.

In a particular implementation, an algorithm uses both the percentage of cache hits associated with cache page sizes and the success rate associated with different hash tables to search for data in a cache. In other embodiments, the systems and methods use a single hash table associated with the smallest cache page size, such as 4K, and still presents the feature of a virtual machine 208A-N using multiple different page sizes. Although the cache supports multiple cache page sizes, the hash table uses a 4K page size exclusively. This approach eliminates the need to perform a lookup in multiple hash tables associated with different cache page sizes. In this scheme a 16K page I/O would require four hash table lookups in the single hash table and groups of cache tags 221 are managed as one.

As disclosed above, the CMS 220 may be configured to manage cache resources provisioned to a virtual machine 208A-N using cache tags 221. Each cache tag 221 may represent a respective cache storage resource (e.g., a chunk, page 304, sector, or the like). FIG. 3 depicts one embodiment of a cache tag 221 data structure 321. The size of fields comprising the cache tag data structure 321 may be dynamic and, as such, the size of the cache tag data structure 321 may be dynamic.

The cache tag data structure 321 may comprise a next cache tag index field configured to link cache tags 221 in a hash table or other relational data structure. As disclosed above, the cache tag data structure 321 may be configured for storage in contiguous memory, such that a particular cache tag 221 may be identified (looked up) based upon an offset within the memory. Accordingly, in some embodiments, the next cache tag index field may be fixed in size. The next cache tag index may be converted to a memory address to find the next cache tag linked to the current cache tag.

A cache tag 221 may comprise a translation and/or mapping between an identifier (e.g., a storage I/O address, logical identifier, LBA, or the like) used by a virtual machine to reference data and a physical address of the data in the cache storage 216. As disclosed above, in some embodiments, the cache tags 221 are configured to have a linear 1:1 correspondence with physical cache pages 304. Accordingly, the offset and/or memory location of a cache tag data structure 321 may correspond to the physical address and/or location of the corresponding physical cache page 304. Alternatively, in some embodiments, the cache tag data structure 321 may comprise a physical address field configured to indicate the physical cache page 304 associated with the cache tag 221.

The cache tag data structure 321 may further comprise a state field configured to identify a current state of the cache tag 221. The clock hands field of the data structure 321 may comprise access characteristics of the cache tag 221; in some embodiments the clock hands field indicates a last access time of the cache tag 221 (e.g., the number of clock hands or time intervals since the cache tag 221 was accessed). The checksum field may be used to ensure data integrity; the checksum field may comprise a checksum of the cache data that corresponds to the cache tag 221. The size of the checksum field may vary based on the size of the cache page 304 and the level of integrity desired by the user (e.g., a user can obtain a higher level of integrity for the checksum by increasing the size of the checksum field). In a particular embodiment, a checksum is calculated for each cache page 304. When calculating the checksum, the system only performs the calculation on the valid data, based on a valid unit map (e.g., the valid data sectors).

The cache tag data structure 321 may also include a valid unit map field, which may identify which portions of a cache page 304 comprise valid cache data. For example, a cache page 304 may comprise a plurality of sectors, and the valid unit may indicate which sectors comprise valid cache data and which correspond to invalid and/or non-cached data. The valid unit map identifies the status of all units associated with a particular cache page 304 to prevent accessing data in units that are not valid.

In some embodiments, the cache tag data structure 321 may further comprise a VMID field, which may be configured to identify the virtual machine 208A-N to which the cache tag 221 is allocated. Alternatively, ownership of the cache tag 221 may be determined without the VMID field. As depicted in FIG. 1A, the cache tag data structure 321 may be maintained by a CMS 220 within the memory space of a particular virtual machine 208A-N. Referring to FIG. 1B, the CMS 220 may be configured to maintain cache tags 221 of different virtual machines 208A-N in different data structures (e.g., different sets or groups of cache tag data structures 321), may associate ranges and/or groups of cache tag data structures 321 with a particular virtual machine 208A-N, or the like.

A cache tag 221 may be in one of a plurality of different states (as indicated by the cache tag state field of the cache tag data structure 321), which may include, but are not limited to: a free state, an invalid state, a valid state, a read pending state, a write pending state, and a depleted state. A cache tag 221 may be initialized to a free state, which indicates that the cache tag 221 is not currently in use. The cache tag 221 transitions from a free state to a write pending state in response to a cache write and/or cache read update operation (a write to the cache caused by a read miss or the like). The cache tag 221 transitions to a valid state in response to completion of the cache write. The cache tag 221 may revert to the write pending state in response to a subsequent write and/or modify operation. The cache tag 221 transitions to a read pending state in response to a request to read data of the cache tag, and reverts to the valid state in response to completion of the read. The cache tag 221 may transition to the invalid state in response to an attempt to perform a write operation while the cache tag 221 is in the read pending or write pending state. The cache tag 221 transitions from the invalid state to the free state in response to completing the write or read update. A cache tag transitions to the depleted state in response to failure of a read or write operation (e.g., from the read pending or write pending state).

In some embodiments, a cache tag 221 may further comprise a pinned state indicator. Cache tags 221 that are pinned may be protected from being evicted from the cache storage 216, allocated to another virtual machine 208A-N, or the like. Pinning cache tags 221 may also be used to lock a range of cache addresses. In certain situations, a portion of data associated with a read operation is available in the cache storage 216, but a portion is not available (or not valid), resulting in a partial cache hit. The CMS 220 may determine whether to retrieve all of the data from the primary storage system 212 or retrieve a portion from the cache and the remainder from the primary storage system 212, which may involve more than one I/O to the primary storage system 212.

In certain embodiments, the CMS 220 is configured to manage a partial cache miss to minimize the number of I/O requests forwarded on to the primary storage system 212. In addition to managing partial cache miss I/O requests, the CMS 220 mitigates the amount of fragmentation of I/Os to primary storage based on I/O characteristics of the I/O requests. Fragmentation of I/Os (also known as I/O splitting) refers to an I/O request that crosses a cache page boundary or is divided between data that resides in the cache and data that resides on the primary storage. The I/O characteristics may include whether the I/O is contiguous, the size of the I/O request, the relationship of the I/O request size to the cache page size, and the like. In effectively managing partial cache hits and fragmentation of I/O requests, the CMS 220 may coalesce I/O requests for non-contiguous address ranges and/or generate additional I/O requests to either the cache or the primary storage.

As discussed above, the CMS 220 may be configured to snapshot a group of cache tags 221, which may comprise storing the cache tags 221 (e.g., the cache tag data structures 321) to persistent storage. The cache tags 221 may be retrieved from the persistent storage when the virtual machine 208A-N "warms up" (e.g., reboots, power cycles, etc.). The cache data associated with the cache tags 221 may have been pinned within the cache storage 216, and as such, may be immediately available. Alternatively, the cache storage 216 may be populated from the primary storage system 212 (or other data source), to thereby recreate the working set. As described in additional detail below, the working set of cache tags 221 may be retained when a virtual machine 208A-N is transferred to a different host 202.

Figure 4:
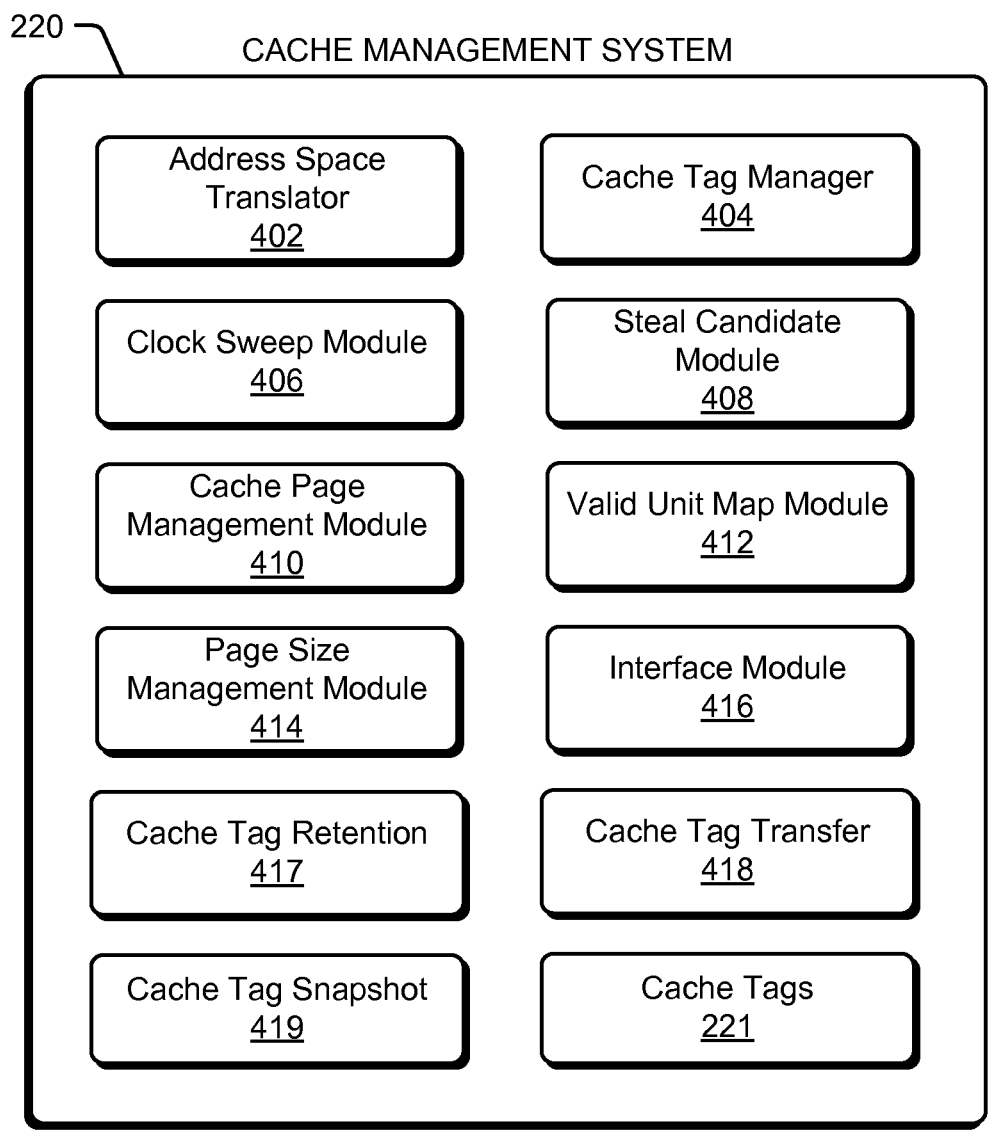
FIG. 4 depicts one embodiment of a cache management system.

FIG. 4 is a block diagram depicting one embodiment of a CMS 220. The CMS 220 may be configured to operate within a virtual machine 208A-N and/or within a virtual machine cache 213 (e.g., within the virtualization kernel 210 of the host 202). The CMS 220 may comprise one or more modules, including an address space translator 402, a cache tag manager 404, a clock sweep module 406, a steal candidate module 408, a cache page management module 410, a valid unit map module 412, a page size management module 414, an interface module 416, a cache tag retention module 417, and a cache tag snapshot module 419.

In some embodiments, the address space translator 402 is configured to correlate cache tag identifiers of a virtual machine 208 with cache storage locations (e.g., cache addresses, cache pages, etc.). In embodiments in which the CMS 220 is implemented within a virtual machine 208A-N (as depicted in FIG. 1A), the cache tag identifier may comprise a logical addresses and/or identifier of the data (e.g., the address of the data in the primary storage system 212). In embodiments in which the CMS 220 is implemented within the virtualization kernel 210 (as depicted in FIG. 1B), the cache tag identifier may comprise a block address associated with the data and/or a storage address as identified within the storage stack 211 of the virtualization kernel 210.

The cache tag manager 404 may be configured to manage the cache tags 221 allocated to one or more virtual machines 208A-N, which may comprise maintaining associations between virtual machine identifiers (e.g., logical identifiers, address, etc.) and data in the cache storage 216. The cache tag manager 404 may be configured to dynamically add and/or remove cache tags 221 in response to allocation changes made by the cache provisioner module 214. In some embodiments, the cache tag manager 404 is configured to manage cache tags 221 of a plurality of different virtual machines 208A-N. The different sets of cache tags 221 may be maintained separately (e.g., within separate data structures and/or in different sets of cache tags 221) and/or in a single data structure.

The clock sweep module 406 may be configured to determine and/or maintain cache aging metadata using, inter alia, one or more clock hand sweep timers, or the like. The steal candidate module 408 may be configured to identify cache data and/or cache tags that are candidates for eviction based on clock sweep metadata, or other cache policy (e.g., least recently used, staleness, sequentiality, etc.), or the like.

The cache page management module 410 may be configured to manage cache resources (e.g., cache page data) and related operations. The valid unit map module 412 may be configured to identify valid data stored in cache storage 216 and/or a primary storage system 212. The page size management module 414 may be configured to perform various page size analysis and adjustment operations to enhance cache performance, as described herein. The interface module 416 may be configured to provide one or more interfaces to allow other components, devices, and/or systems to interact with the CMS 220, which may include, but is not limited to: modifying the number and/or extent of cache tags 221 allocated to a virtual machine 208A-N, querying and/or setting one or more configuration parameters of the CMS 220, accessing cache tags 221 (e.g., for a snapshot, checkpoint, or other operation), or the like.

The cache tag retention module 417 may be configured to retain the cache tags 221 of a virtual machine 208A-N in response to transferring the virtual machine 208A-N to a different host. As described above, the cache tags 221 may represent a "working set" of the cache of a particular virtual machine 208A-N, which may be developed through the use of one or more cache admission and/or eviction policies (e.g., the clock sweep module 406 and/or steal candidate module 408, and so on), in response to the I/O characteristics of the virtual machine 208, and/or the applications running on the virtual machine 208A-N. The cache tag retention module 417 may operate in conjunction with the retention module 1128A, disclosed below.

As illustrated in FIG. 1A, the CMS 220 may be configured to operate within the virtual machines 208A-N (each virtual machine 208A-N may comprise a separate CMS 220). In such embodiments, the cache tags 221 of a virtual machines 208A-N may be maintained within the local memory space the virtual machines 208A-N. Accordingly, the cache tags 221 of a virtual machine 208A-N may be automatically transferred with the virtual machine 208A-N when the virtual machine 208A-N is migrated between hosts 202. The cache tag retention module 417 may be configured to retain the cache tags 221 within the memory space of the virtual machine 208A-N, after the virtual machine 208A-N has been transferred (e.g., in a VMotion™ operation or similar VM migration operation). The cache tags 221 may be retained despite the fact that the underlying cache data to which the cache tags 221 refer may not be available on the cache storage 216 of the destination host 202. As disclosed in further detail below, the virtual machine cache 213 may be configured to populate the cache storage 216 at the destination host 202, such that the CMS 220 can continue to use the working set of cache tags 221 (and/or a subset thereof).

As illustrated in FIG. 1B, in some embodiments, the CMS 220 may be configured to operate within the virtualization kernel 210, and may be shared between a plurality of virtual machines 208A-N. In such embodiments, the cache tags 221A-N may be stored outside of the memory space of the virtual machines 208A-N. Therefore, the cache tags 221 of a virtual machine 208A-N may not be automatically transferred with the virtual machine 208A-N as part of the virtual machine's 208A-N memory image. The cache tag retention module 417 may be configured to retain the cache tags 221 of a virtual machine 208A-N within the CMS 220 (e.g., within the virtualization kernel 210 of the host 202, or other storage location) after the virtual machine 208A-N is transferred from the host 202.

When a virtual machine 208A-N is transferred from the host 202, data of the virtual machine 208A-N that is stored in the cache storage 216 (e.g., by a retention module 1128A, disclosed in additional detail below). The data may include retained cache data, which may include data of the virtual machine 208A-N that has been stored in the cache storage 216 of the virtual machine cache 213 (and to which cache tags 221 of the virtual machine 208A-N refer). The data may also include cache metadata, such as cache tags 221 of the virtual machine 208A-N, and so on. The retained cache data may be transferred between hosts 202 (and/or from the primary storage system 212, or other data source). The cache data may be transferred via a demand paging model, which may comprise populating the cache "on demand," as the cache data of various retained cache tags 221 is requested by the transferred virtual machine 208A-N. Alternatively, or in addition, cache data may be prefetched and/or transferred in a "bulk transfer" operation, which may comprise transferring cache data independent of requests for the cache tag data. In some embodiments, data may be selectively prefetched based upon a cache transfer policy, which may be based, at least in part, on the cache aging metadata of the clock sweep module 406 and/or steal candidate module 408 and/or other cache policy metadata (e.g., hotness, coldness, least recently used, etc.).

Other cache data, such as the cache tags 221 of a virtual machine 208A-N may be transferred between hosts 202. In some embodiments, the CMS 220 comprises a cache tag transfer module 418 that is configured to request cache tags 221 of a virtual machine 208A-N in response to the virtual machine 208A-N being transferred to the host 202 from a remote host 202. Alternatively, or in addition, the cache tag transfer module 418 may be configured to push cache tags 221 of a virtual machine 208A-N to a remote host 202 in response to the virtual machine 208A-N being transferred to the remote host 202. Cache tags 221 may be transferred between hosts 202 in one or more of a bulk transfer, by demand paging (e.g., in response to provisioning cache storage capacity to the virtual machine 208A-N at the new host 202), or the like.

The cache tag snapshot module 419 may be configured to maintain one or more "snapshots" of the working set of the cache of a virtual machine 208A-N (e.g., the cache tags 221 of a particular virtual machine 208A-N). As described above, a snapshot refers to a set of cache tags 221 and/or related metadata at a particular time. The snapshot module 419 may be configured to store a snapshot of the cache tags 221 on a persistent storage medium and/or load a stored snapshot into the CMS 220.

Figure 5:
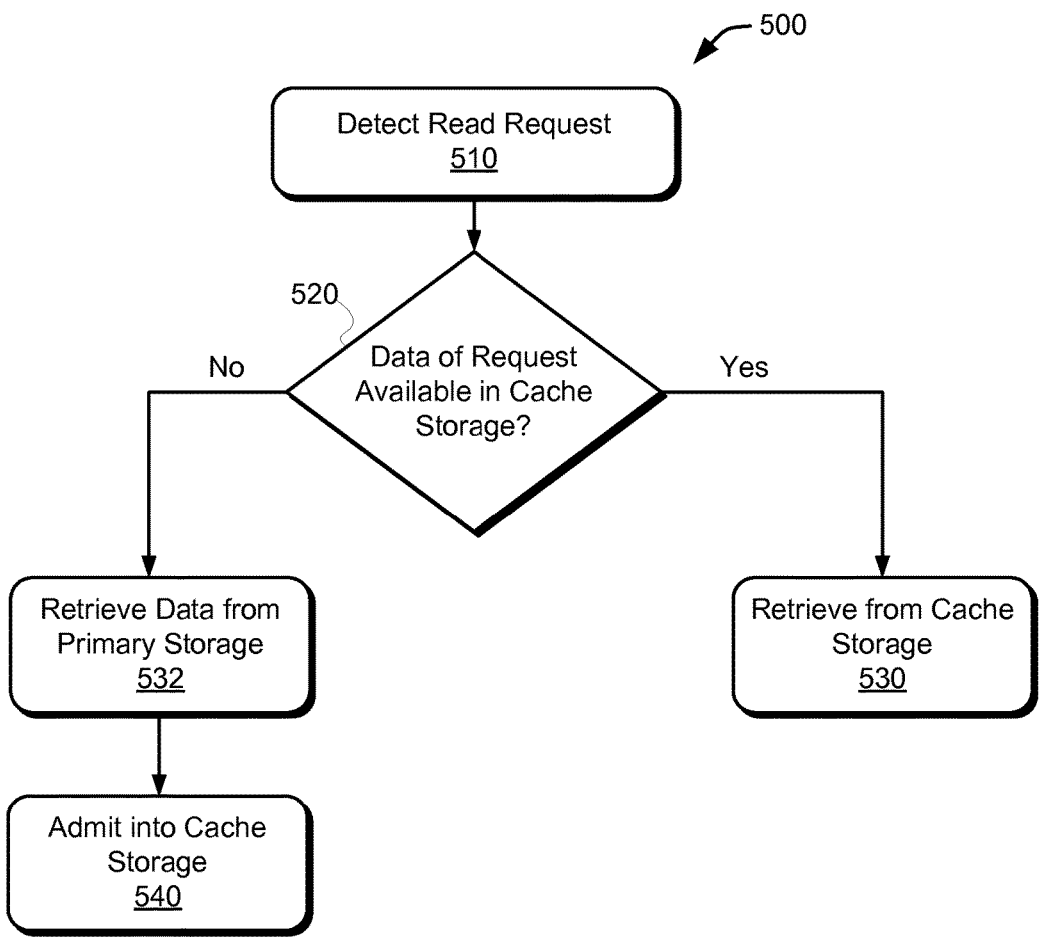
FIG. 5 is a flow diagram of one embodiment of a method for caching data in a virtualized environment.

FIG. 5 is a flow diagram of one embodiment of a method 500 for caching data in a virtualized environment. One or more of the steps of the method 500, and/or the other methods and/or processes described herein, may be embodied as computer-readable instructions stored on a storage medium. The instructions may be configured to cause a computing device to perform one or more of the steps of the method 500.

Step 510 may comprise detecting a request to perform a data read operation within by a virtual machine 208A-N. Step 510 may comprise detecting the request within an I/O driver 218 and/or filter driver 219 operating within the virtual machine 208A-N (as illustrated in FIG. 1A). Alternatively, or in addition, step 510 may comprise detecting the request within an I/O driver 918 and/or filter driver 919 operating within the virtualization kernel 210 (as illustrated in FIG. 1B). Step 510 may further comprise communicating the request to the CMS 220, which, as disclosed above, may be configured to operate within the virtual machine 208A-N or within the virtualization kernel 210.

Step 520 may comprise determining whether data of the read operation is available in the cache storage 216. In some embodiments, step 520 comprises identifying a cache tag 221 that corresponds to the read request (e.g., identifying a cache tag 221 having an identifier that matches an identifier or address associated with the read request). If a cache tag 221 is available, and the cache tag is valid and readable (e.g., in the valid state), the flow may continue at step 530; otherwise, the flow may continue at step 532.

Step 530 may comprise retrieving data of the read request from cache storage 216. Step 530 may, therefore, comprise servicing the read request by the CMS 220. Step 530 may further comprise updating cache metadata, such as clock hands data, access metrics, or the like. Retrieving the data may comprise determining a physical address of the data within the cache storage 216 using the cache tag 221 identified at step 520. Step 530 may further comprise mapping and/or translating physical address information, by use of a map module as described in further detail below.

Step 532 may comprise retrieving the cache data from primary storage (e.g., from the primary storage system 212). Step 532 may further comprise determining whether the data should be admitted into the cache. This determination may be based on cache availability, admission policy, eviction policy, or the like. The CMS 220 may determine whether admitting the data would improve I/O performance and, if so, may admit the data into the cache storage 216. Admitting the data may comprise allocating one or more cache tags 221, storing the data in the cache storage 216, and/or associating the physical storage location of the data with an identifier of the data by use of the allocated cache tags 221.

The CMS 220 may develop and/or maintain a working set for the cache using inter alia a file system model. As described above, the working set of the cache may be embodied as the set of cache tags 221 maintained by the CMS 220. The cache storage 216 may comprise one or more solid-state storage devices, which may provide fast read operations, but relatively slow write and/or erase operations. These slow write operations can result in significant delay when initially developing the working set for the cache. Additionally, the solid-state storage devices comprising the cache storage 216 may have a limited lifetime (a limited number of write/erase cycles). After reaching the "write lifetime" of a solid-state storage device, portions of the device become unusable. These characteristics may be taken into consideration by the CMS 220 in making cache admission and/or eviction decisions.

Figure 6:
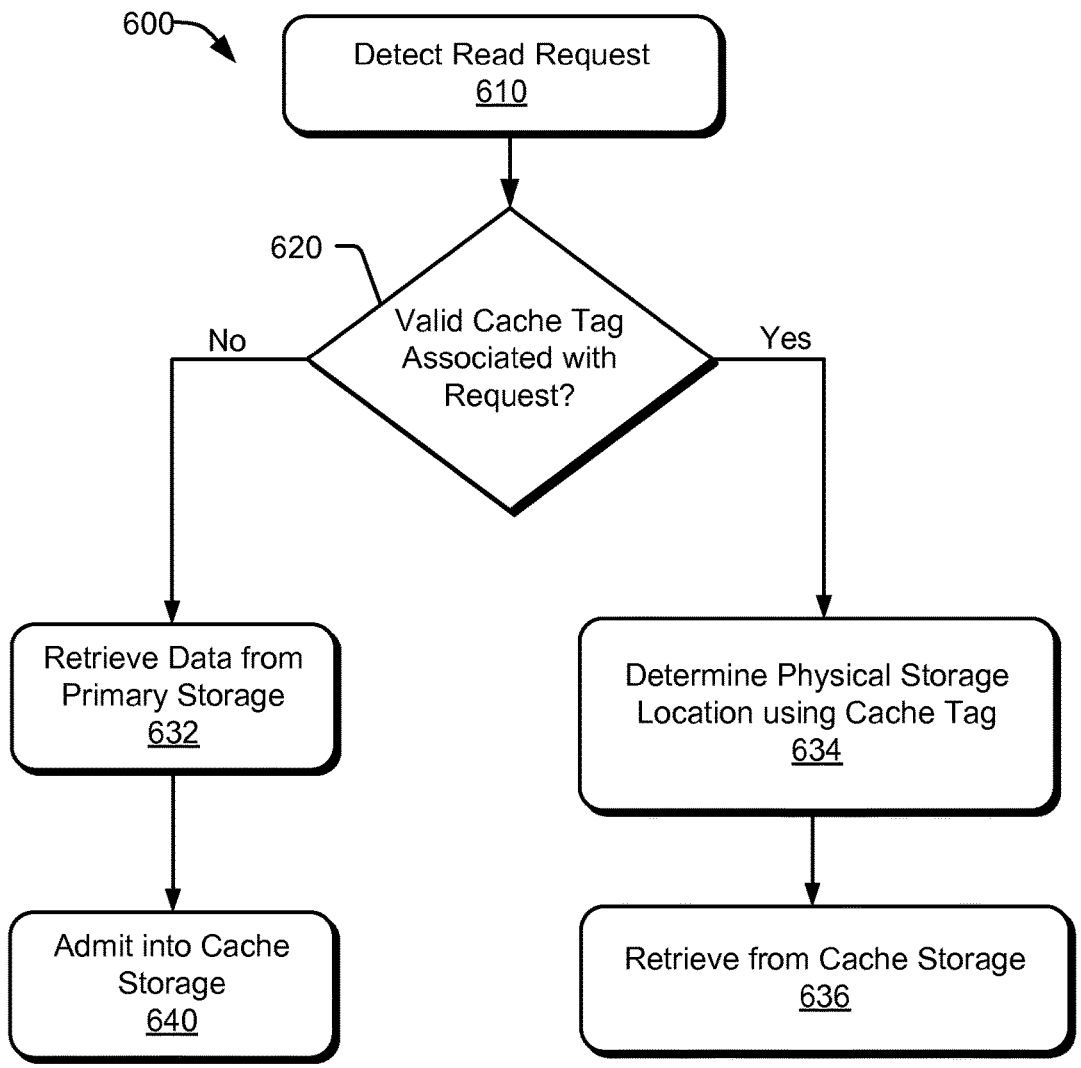
FIG. 6 is a flow diagram of another embodiment of a method for caching data in a virtualized environment.

FIG. 6 is a flow diagram depicting another embodiment of a method 600 for caching data in a virtualized environment. Step 610 may comprise detecting a read request. As described above, step 610 may comprise detecting a read request by use of an I/O driver 218 and/or filter driver 219 operating within a virtual machine 208A-N and/or by use of an I/O driver 918 and/or filter driver 919 operating within a virtualization kernel 210 and/or base operating system of the host 202. Step 620 may comprise determining whether the CMS 220 comprises a cache tag 221 associated with the read request, as described above. If no valid cache tag 221 exists in the CMS 220, the flow may continue to steps 632 and 640, which may comprise retrieving data of the request from the primary storage system 212 at step 632 and selectively admitting the data into the cache at step 640, as described above. If a cache tag 221 is identified at step 620, the flow continues to step 634, which may comprise determining a physical cache address of the data by use of the identified cache tag 221. Step 636 may comprise retrieving data at the determined physical storage location within the cache storage 216.

Figure 7:
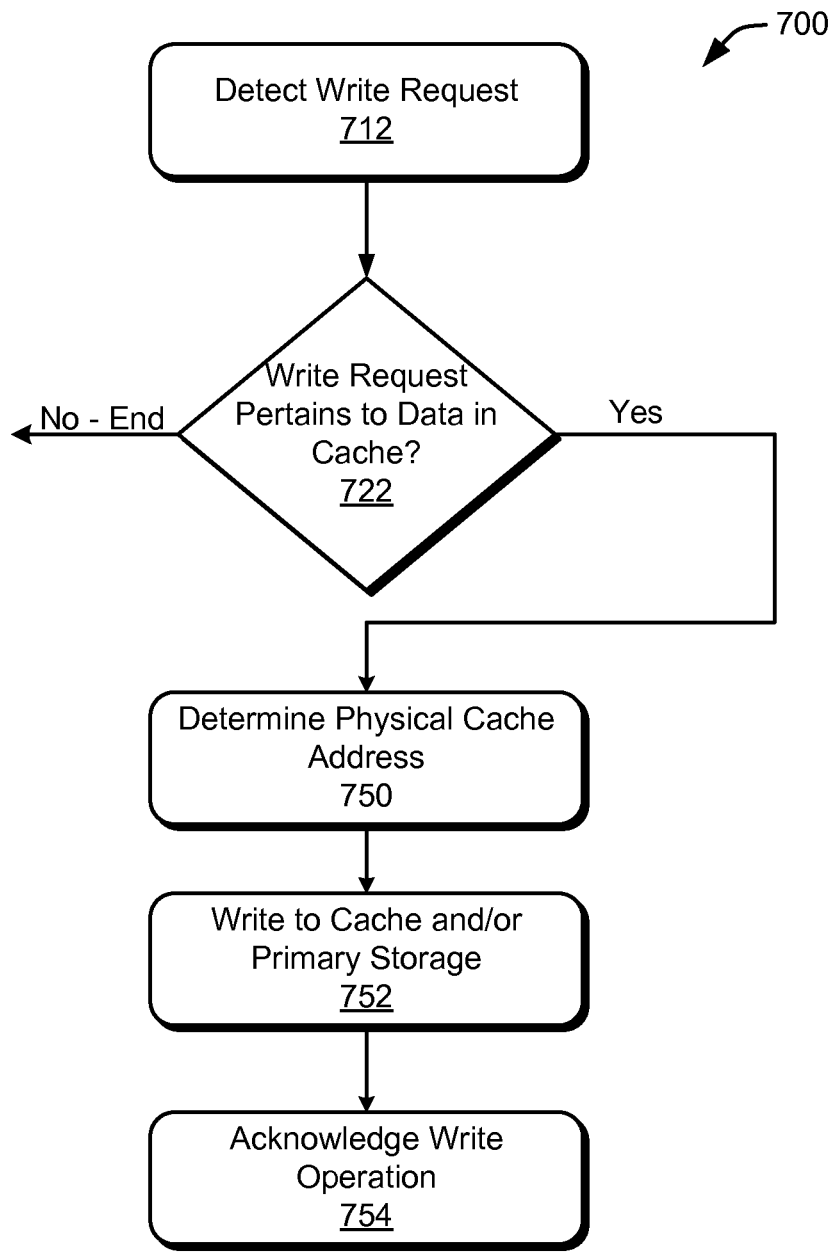
FIG. 7 is a flow diagram of another embodiment of a method for caching data in a virtualized environment.

FIG. 7 is a flow diagram of another embodiment of a method 700 for caching data in a virtualized environment. Step 712 comprises detecting a request to write data by a virtual machine 208A-N. The request of step 712 may be detected by use of an I/O driver 218 and/or filter 219 operating within the virtual machine 208A-N or within the virtualization kernel 210. The write request may be directed to a storage I/O address (e.g., an address and/or identifier of the primary storage system 212). As discussed herein, the storage I/O address is translated to a physical address using the cache tags 221 of the CMS 220.

Step 722 may comprise determining whether the write request pertains to data in the cache, which may comprise identifying a cache tag 221 associated with the storage I/O address (or other identifier). If a cache tag 221 is identified at step 722, the flow continues to step 750, which may comprise determining a physical address of the data within the cache storage 216 using, inter alia, the identified cache tag 221. Step 752 may comprise writing data of the write request to the identified physical storage location(s). Step 752 may further comprise writing the data to primary storage system 212 (in a write-through operation). In some embodiments, data is written to the cache storage 216 and the primary storage system 212 simultaneously in a "write-through" operation. Writing data to the primary storage system 212 may comprise allowing storage services of the virtualization layer 210 (and/or host 202) to write the data to the primary storage system 212. Step 754 may comprise acknowledging completion of the write request in response to writing the data to the primary storage system 212.

As disclosed above, cache may be cached in a write-through cache mode, in which data is written and/or modified on both the primary storage system 212 and the cache storage 216. A write completion is acknowledged after the write operation to the primary storage system 212 is completed, regardless of whether a corresponding write operation to the cache storage 216 has completed. In specific embodiments, cache write operations can be queued and completed as the cache speed allows. Thus, a cache storage 216 with a slow write speed (or a queue of pending write operations) does not degrade overall I/O performance. Cache tags 221 associated with incomplete or queued write operations are identified as "pending," (e.g., are set to a "write pending" state as disclosed above). After the write operation completes, the associated cache tag 221 transitions to a valid state. In some embodiments, attempts to read data of a cache tag 221 that is in a "pending" state results in a cache miss, causing retrieval of the requested data from the pending memory buffer associated with the I/O, or from the primary storage system 212, as described above.

Although a write-through cache mode is described herein, the disclosure is not limited in this regard and could be adapted to operate in any suitable cache mode including, but not limited to: write-back cache mode, read-through, write-behind, refresh-ahead, or the like. The embodiments disclosed herein may be further configured to cache data in a "write-never" cache mode, as disclosed in U.S. Provisional Patent Application No. 61/696,126, filed Aug. 31, 2012, and entitled, "Systems, Methods, and Interfaces for Adaptive Persistence," which is hereby incorporated by reference.

Referring back to FIG. 1A, in some embodiments, the CMS 220 is configured to operate within the virtual machines 208A-N, and cache tags 221 and/or other cache metadata are maintained within the memory space of the respective virtual machines 208A-N. Storing the cache tags 221 (and other cache metadata) within the associated virtual machine 208A-N may allow the virtual machine 208A-N to easily determine whether data is available in the virtual machine cache 213 without having to access a different system or process (e.g., access the virtualization kernel 210). In such embodiments, the CMS 220 may manage cache operations using locally stored cache tags 221, which may increase the speed and efficiency of I/O operations. Additionally, the virtual machine 208A-N typically has available more detailed information regarding access characteristics than other, external processes and/or systems, and, as such, may be in a better position to make cache management decisions. For example, the virtual machine 208A-N may have access to contextual information pertaining to I/O requests, such as application- and/or file-level knowledge, which may be used to develop an effective working set of cache tags 221. Other systems that are external to the virtual machine 208A-N (e.g., operating within the virtualization kernel 210) may only have access to low-level I/O information. Thus, having the cache tags 221 stored locally in the virtual machine 208A-N may improve cache and/or I/O performance.

In some embodiments, as depicted in FIG. 1B, a plurality of virtual machines 208A-N may share a CMS 220, which may maintain cache metadata of the virtual machines 208A-N within the virtualization kernel 210 and/or host operating system (e.g., in user space 230, kennel space, or the like). The CMS 220 may have limited contextual information pertaining to the I/O operations performed by the virtual machines 208A-N; in some embodiments, the CMS 220 may only have access to physical storage addresses and/or other generalized storage address information, as opposed to application- and/or file-level knowledge. The embodiments of FIG. 1B, however, may be deployed without customization of the virtual machines 208A-N (e.g., without deploying specialized cache components within the virtual machines 208A-N, such as a CMS 220).

As disclosed above, the cache provisioner 214 may be configured to provision cache storage resources to the virtual machines 208A-N. The cache provisions 214 may be configured to dynamically reprovision and/or reallocate cache resources in accordance with user preferences, configuration, and/or I/O requirements of the virtual machines 208A-N. The virtual machines 208A-N may have different I/O requirements, which may change over time due to, inter alia, changes in operating conditions, usage characteristics and/or patterns, application behavior, and the like. The cache resources available to the virtual machines 208A-N may vary as well due to, inter alia, virtual machines 208A-N being migrated to and/or from the host 202, virtual machines 208A-N coming on-line, virtual machines 208A-N becoming inactive (e.g., shut down, suspended, etc.), or the like. The cache provisioner 214 may, therefore, be configured to adjust the allocation of cache resources in response to I/O requirements of particular virtual machines 208A-N and/or the I/O characteristics and/or I/O load on the host 202 (due to other virtual machines 208A-N, other processes and/or services running on the host 202, and so on).

The cache provisioner module 214 may be configured to maintain mappings between virtual machines and the cache resources allocated to the virtual machines (e.g., cache chunks 302 and/or pages 304). Referring to FIG. 8A, in some embodiments, the cache provisioner module 214 may be configured to allocate "virtual cache storage resources" to the virtual machines 208A-N. As used herein, a "virtual cache resource" refers to an indirect, logical, or virtual reference to a physical storage resource within the cache storage 216, such as particular cache chunks 302 and/or pages 304. Virtual cache resources may be mapped to actual, physical cache storage locations by a map module 217, which may comprise mappings and/or associations between dynamically allocated virtual cache resources (e.g., virtual cache addresses) and physical storage locations within the cache storage 216. The map module 217 may enable the cache provisioner 214 to allocate contiguous ranges of virtual cache resources to virtual machines 208A-N, despite the fact that the underlying physical storage resources are discontiguous within the physical address space of the cache storage 216.

In the FIG. 8A embodiment, virtual cache storage 804 is allocated to virtual machine 1 208A (VM-1). The virtual cache storage 804 may comprise a contiguous range of cache addresses or identifiers. As depicted in FIG. 8A, the virtual cache storage 804 comprises a contiguous range of cache chunks 302, including VM-1$_0$, VM-1$_1$, VM-1$_2$, through VM-1$_N$. The physical cache storage resources actually allocated to VM-1 208A may not be contiguous and/or may be interleaved with cache resources that are allocated to other virtual machines 208B-N. As illustrated in FIG. 8A, the actual physical cache chunks 302 allocated to VM-1 208A comprise a discontiguous set of chunks VM-1$_0$, VM-1$_1$, VM-1$_2$, VM-1$_N$ within the physical address space 806 of the cache storage 216. The virtual address space of the virtual cache storage 804 may be independent of the underlying physical address space 806 of the cache storage 216. The chunks 302 in the physical address space 806 may be discontiguous and/or interleaved with chunks 302 that are allocated to other virtual machines 208B-N. Although FIG. 8A shows some of the different locations in a physical order, the cache chunks 302 allocated to the VM-1 208A may be located in a random order, in accordance with the availability of physical cache resources (e.g., available chunks 302).

The map module 217 may be configured to map virtual cache resources (e.g., virtual cache addresses) 804 to physical cache resources in the physical address space 806 of the cache storage 216. In some embodiments, the map module 217 may comprise an "any-to-any" index of mappings between virtual cache addresses allocated to the virtual machines 208A-N and the physical cache addresses within the cache storage 216.

The map module 217 may be leveraged to secure data in the cache storage 216. In some embodiments, the virtual machine cache 213 may restrict access to data in the cache storage 216 to particular virtual machines 208A-N and/or may prevent read-before-write conditions. The cache provisioner module 214 may be configured to restrict access to physical cache chunks 302 to the virtual machine 208A-N to which the chunk 302 is allocated. For example, the cache chunk labeled VM-1$_0$ may only be accessible to the virtual machine 208A based on, inter alia, the mapping between VM-1 208A and the cache chunk VM-1$_0$ in the map module 217. Moreover, the indirect addressing of the map module 217 may prevent virtual machines 208A-N from directly referencing and/or addressing physical cache chunks 302 allocated to other virtual machines 208A-N.

The map module 217 may be configured to map virtual cache storage using the VMID of the corresponding virtual machine 208A-N. Accordingly, when a virtual machine 208A-N is transferred between hosts 202, the associations maintained by the map module 217 may remain valid to reference data of the virtual machine 208A-N (e.g., the retained cache data of the corresponding virtual machine 208A-N may be identified and accessed by use of the VMID). Therefore, in some embodiments, the map module 217 may be configured to determine the physical cache address of cache data of a virtual machine 208A-N using the VMID of the virtual machine 208A-N.

Figure 9A:
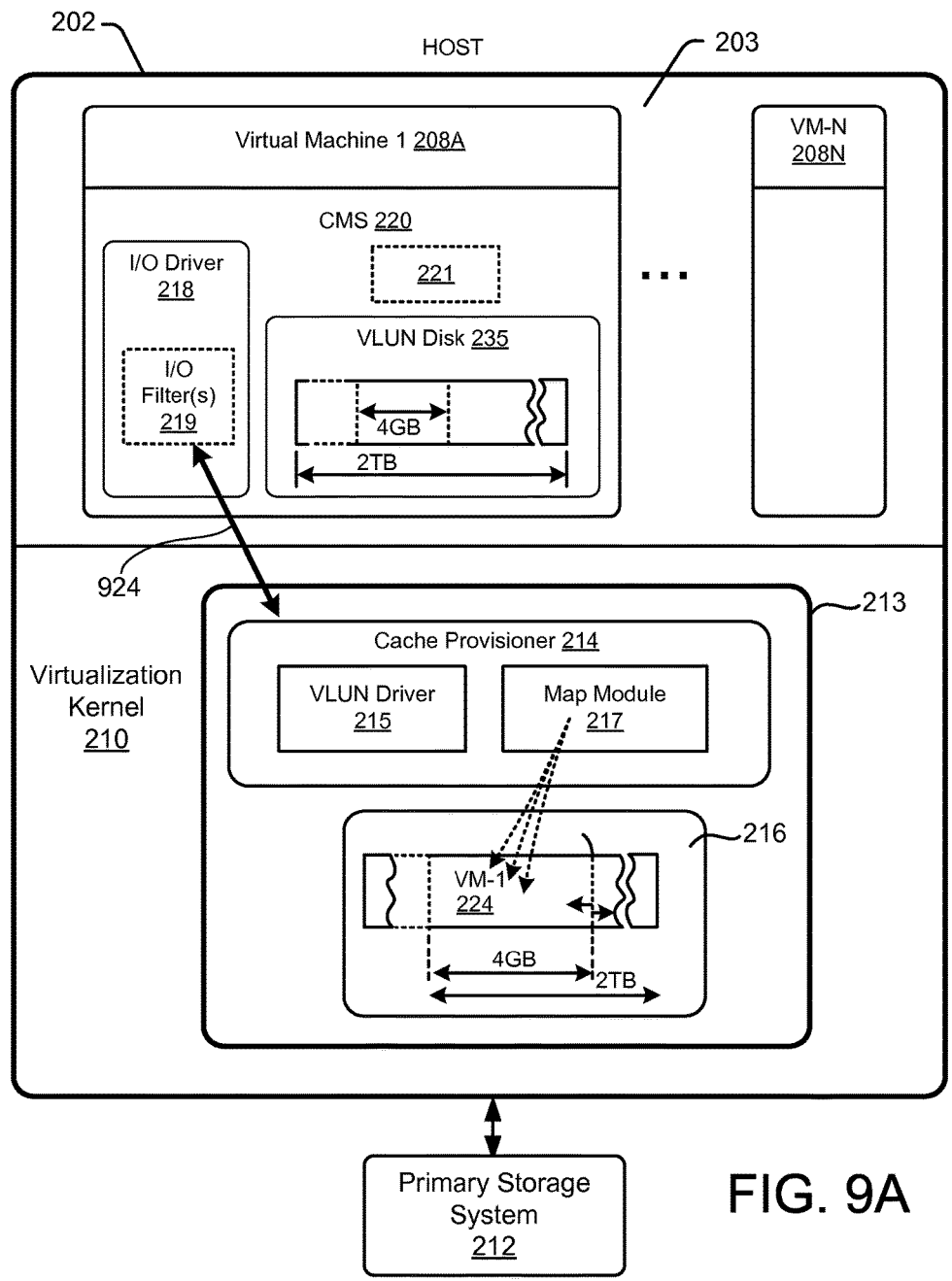
FIG. 9A depicts embodiments of systems and apparatus for caching data in a virtualized environment.

FIG. 9A depicts embodiments of systems and apparatus for caching data in a virtualized environment. In FIG. 9A, certain modules of the virtual machine cache 213 are omitted to avoid obscuring details of the described embodiments. The cache provisioner module 214 may be configured to dynamically provision cache resources within the cache storage 216. Accordingly, the amount of cache resources allocated to the virtual machines 208A-N may change over time. The virtual machines 208A-N, however, may operate more efficiently with constant, fixed-sized storage resources. The virtual machine cache 213 may, therefore, be configured to represent dynamically provisioned cache resources as virtual storage resources that appear to have a constant, fixed size. In some embodiments, the virtual machine cache 213 may comprise a Virtual Logical Unit Number (VLUN) driver 215 that is configured to represent dynamically allocated cache resources as a fixed-size, contiguous virtual storage resource. The VLUN driver 215 may be used to represent corresponding VLUN disks 235 within the virtual machines 208A-N. The VLUN disk 235 of a virtual machine 208A-N may appear to have a constant fixed size, regardless of the dynamic cache resource allocations made by the cache provisioner 214.

In the FIG. 9A embodiment, the cache storage 216 may comprise two terabytes (2 TB) of storage capacity. The cache provisioner 214 may allocate four gigabytes (4 GB) to the virtual machine 208A-N. As disclosed above, other virtual machines 208B-N on the hosts 202 may be allocated different amounts of cache resources, in accordance with the I/O requirements of the virtual machines 208B-N and/or the availability of cache resources. The VLUN driver 215 and VLUN disk 235 may be configured to represent the entire capacity of the cache device 216 to the virtual machine 208A. The VLUN disk 235 may appear to remain a constant size within the virtual machine 208A (e.g., 2 TB) despite dynamic changes to the actual cache capacity allocated between the virtual machines 208A-N. In addition, and as described above, the physical cache resources 224 allocated to the virtual machine 208A may be discontiguous within the physical address space of the cache storage 216. The translation layer implemented by map module 217, however, may present the cache resources allocated to the virtual machine 208A as a contiguous range of virtual cache addresses.

The CMS 220 of the virtual machine 208A may comprise an I/O driver 218, configured to manage data transfers between the virtual machine 208A and various storage devices (e.g., primary storage system 212). The I/O driver 218 may comprise a Windows Driver, or other storage driver adapted for use with other operating systems and/or operating environments. The CMS 220 may further comprise an I/O filter 219 configured to monitor and/or service I/O requests directed towards the primary storage 212; I/O requests directed to the primary storage system 212 may be serviced directly at the primary storage system 212 (non-cached) or may be serviced using the virtual machine cache 213, as described above.

The I/O filter 219 may comprise a SCSI filter configured to manage data transfers between physical and virtual entities (e.g., primary storage system 212, VLUN disk 235, and/or the virtual machine cache 213). Within the virtual machine 208A, the I/O filter 219 is configured to identify the VLUN disk 235, and to manage capacity changes implemented by, inter alia, the cache provisioning module 214 (and/or VLUN driver 215). As disclosed above, the VLUN disk 235 may be a virtual disk configured to represent dynamically allocated cache resources within the virtual machine 208A as a constant, fixed-size storage resource. The VLUN disk 235 may be configured to report a larger, fixed storage capacity than the actual physical cache capacity allocated to the virtual machine 208A, such that the cache provisioner 214 can dynamically provision cache storage to/from the virtual machine 208A (through the VLUN disk 235) without adversely affecting the virtual machine 208A. Alternatively, the I/O filter 219 may be configured to manage the actual physical capacity of the VLUN disk 235, which may be hidden from other applications and/or operating systems of the virtual machine host 208A. In some embodiments, the VLUN disk 235 is presented to the virtual machine 208A as a read-only storage resource. Consequently, the guest operating system of the virtual machine 208A prevents other applications from attempting to write data to the VLUN disk 235.

The cache provisioner module 214 may report the actual physical cache storage allocated to the virtual machine 208A via a communication link 924. The communication link 924 may operate separately from I/O data traffic between the VLUN driver 215 and the I/O filter 219 (SCSI I/O filter). Thus, asynchronous, out-of-band messages may be sent between the VLUN driver 215 and the I/O filter 219 to inform the CMS 220 of changes to the actual cache space allocated to the virtual machine 208A and/or communicate other configuration and/or cache metadata. The I/O driver 218 may report the allocation information to the CMS 220, which may use the allocation information to determine the number of cache tags 221 available to the virtual machine 208A. The cache provisioner module 214 may use the communication path 924 to dynamically re-provision and/or reallocate cache resources between the virtual machines 208A-N (e.g., inform the virtual machines 208A-N of changes to cache resource allocations).

Figure 10:
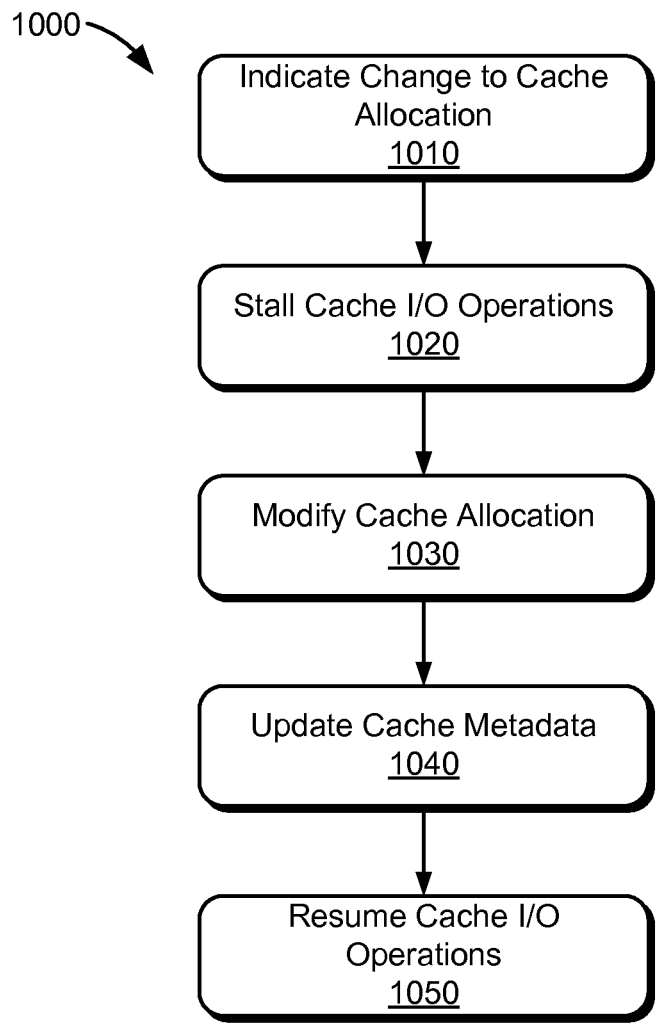
FIG. 10 depicts another embodiment of a method for caching data in a virtualized environment.

FIG. 10 is a flow diagram of another embodiment of a method 1000 for caching data in a virtualized environment. In particular, the method 1000 illustrates one embodiment of a method for dynamically provisioning cache resources to one or more virtual machines 208A-N.

Step 1010 may comprise the cache provisioner module 214 indicating to the virtual machine 208A that the cache storage space allocated thereto is to be modified (e.g., dynamically increased or decreased). Step 1010 may be performed in response to the cache provisioner module 214 receiving a request for additional cache resources from the virtual machine 208A (e.g., through the communication link 924), balancing cache resources between different virtual machines 208A-N, determining that the virtual machine 208A requires additional or fewer cache resources, and/or other cache allocation policies.

Step 1020 may comprise stalling cache I/O operations, which may comprise stopping I/O traffic between the virtual machine 208A and the virtual machine cache 213. Step 1020 may comprise the VLUN driver 215 issuing a message to the CMS 220 (through the communication link 924) to stop sending I/O data traffic pertaining to the cache while the cache allocation is modified. In some embodiments, step 1020 comprises stalling the CMS 220, which allows applications operating on the virtual machine 208A to continue to perform I/O operations independently of the virtual machine cache 213 (e.g., operate directly with the primary storage system 212 and/or other storage resources). The CMS 220 may be configured to invalidate cache tags 221 in response to write operations that occur while the CMS 220 is stalled. Step 1020 may further comprise flushing any outstanding I/O requests directed to the virtual machine cache 213 before halting cache operations (e.g., waiting for any outstanding I/O data traffic to and from the virtual machine cache 213 to complete) and/or notifying the cache provisioner module 214 that the cache traffic has been halted.

Step 1030 may comprise modifying the cache resources allocated to the virtual machine 208A (by the VLUN driver 215 and/or mapping module 217). Step 1030 may comprise allocating additional physical cache storage space to the virtual machine 208A in the cache device 216, associating physical cache resources with corresponding virtual cache addresses and/or resource identifiers (by use of the map module 217), removing associations between the virtual machine 208A and physical cache resources (e.g., if the cache allocation is being decreased), and so on. Step 1030 may further comprise instructing the CMS 220 that the cache has been resized, which may comprise providing an indication of the cache resources that have been allocated to the virtual machine 208A, identifiers of the resources (e.g., a set of one or more virtual cache addresses, address range(s), or the like), and so on.

Step 1040 may comprise updating cache metadata of the CMS 220 in accordance with the modifications of step 1030. Step 1040 may comprise modifying the cache tags 221 of the CMS 220 in accordance with the modifications of step 1030; step 1040 may comprise allocating additional cache tags 221 in response to the virtual machine 208A being allocated additional cache resources; and/or removing cache tags 221 in response to the virtual machine 208A being allocated fewer cache resources. As described above, additional cache tags 221 may be allocated contiguously within the virtual cache address space of the virtual machine 208A (by use of the translation layer implemented by the map module 217). Therefore, additional cache tags 221 may be appended to the existing, contiguous range of cache tags 221, thereby preserving the existing working set of the virtual machine 208A during the resizing operation. Cache tags may be removed in contiguous ranges, which may allow the working set of the remaining cache tags 221 to be preserved.

Step 1050 may comprise resuming cache I/O operations, which may comprise indicating that the modification(s) of steps 1030 and/or 1040 are complete (through the communication link 924), and instructing the CMS 220 to resume cache I/O operations. Step 1050 may, therefore, comprise selectively servicing I/O operations using the virtual machine cache 213, as described herein.

Figure 9B:
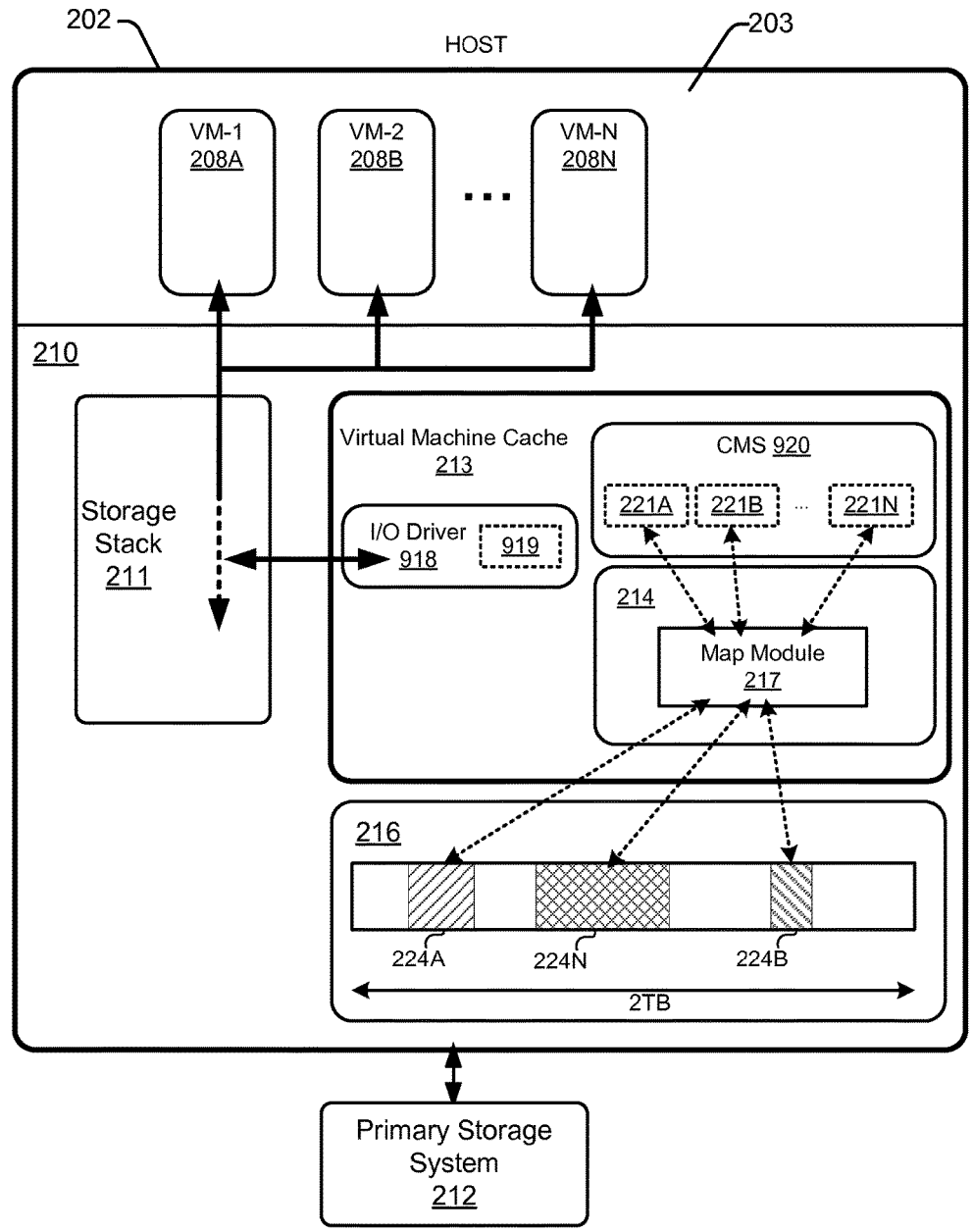
FIG. 9B depicts embodiments of systems and apparatus for caching data in a virtualized environment.

FIG. 9B depicts embodiments of systems and apparatus for caching data in a virtualized environment. The CMS 920 of the FIG. 9B embodiment is configured to manage cache operations for a plurality of virtual machines 208A-N. The virtual machines 208A-N may be standard virtual machines 208A-N that do not include a separate CMS 220 or other cache-specific modules and/or configuration (other than cache functionality provide as part of a standardized virtual machine and/or guest operating system). I/O operations performed by the virtual machines 208A-N may be serviced within a storage stack 211 (or other storage infrastructure) of the virtualization kernel 210 and/or host 202. The virtual machine cache 213 may comprise an I/O driver 918 and/or I/O filter 919 configured to identify I/O requests and/or operations of the virtual machines 208A-N within the storage stack 211. The virtual machine cache 213 may be configured to selectively service the I/O requests, as described above.

The virtual machine cache 213 may comprise a CMS 920 that is configured to manage cache operations for the virtual machines 208A-N. In the FIG. 9B embodiment, the CMS 920 manages separate sets of cache tags 221A-N for each of the virtual machines 208A-N. Each set of cache tags 221A-N may correspond to cache resources allocated to the virtual machine 208A-N within the cache storage 216. The cache tags 221A-N may, therefore, represent mappings and/or associations between storage identifiers of the virtual machines 208A-N and corresponding cache resources and/or or cache data in the cache storage 216.

The virtual machine cache 213 may further comprise a cache provisioner module 214 configured to dynamically provision cache resources to the virtual machines 208A-N, as described above. The cache provisioner module 214 may be configured to report cache allocation information to the CMS 920, which may modify the cache tags 221A-N of the virtual machines 208A-N accordingly (e.g., add and/or remove cache tags 221A-N in accordance with the cache capacity allocated to the virtual machines 208A-N, as described above). The map module 217 may be configured to map virtual cache addresses of the cache tags 221A-N to physical cache resources within the cache storage 216 (e.g., particular cache chunks 302 and/or pages 304). The translation layer implemented by the map module 217 may allow the cache tags 221A-N to operate within a contiguous virtual address space despite the fact that the underlying physical allocations 224A may be non-contiguous within the cache storage 216. Alternatively, in some embodiments, the mapping module 217 may be omitted, and the CMS 920 may be configured to directly manage physical cache addresses within the cache storage 216.

Changes to cache resource allocations may occur transparently to the virtual machines 208A-N. Dynamically modifying cache allocations may comprise the cache provisioning module 214 informing the CMS 920 of the new cache allocations of the virtual machines 208A-N, and the CMS 920 updating the cache tags 221A-N in accordance with the new cache allocations (e.g., adding and/or removing cache tags 221A-N). In some embodiments, the CMS 920 may stall cache operations while the dynamic reallocation occurs, which may comprise allowing I/O operations of the virtual machines 208A-N identified by the I/O driver 918 to be serviced by the storage infrastructure of the virtualization kernel 210 (e.g., within the storage stack 211). After the reallocation is complete, and the cache tags 221A-N are updated in accordance with the reallocation, the CMS 920 may resume selectively servicing I/O operations, as described above.

Figure 9C:
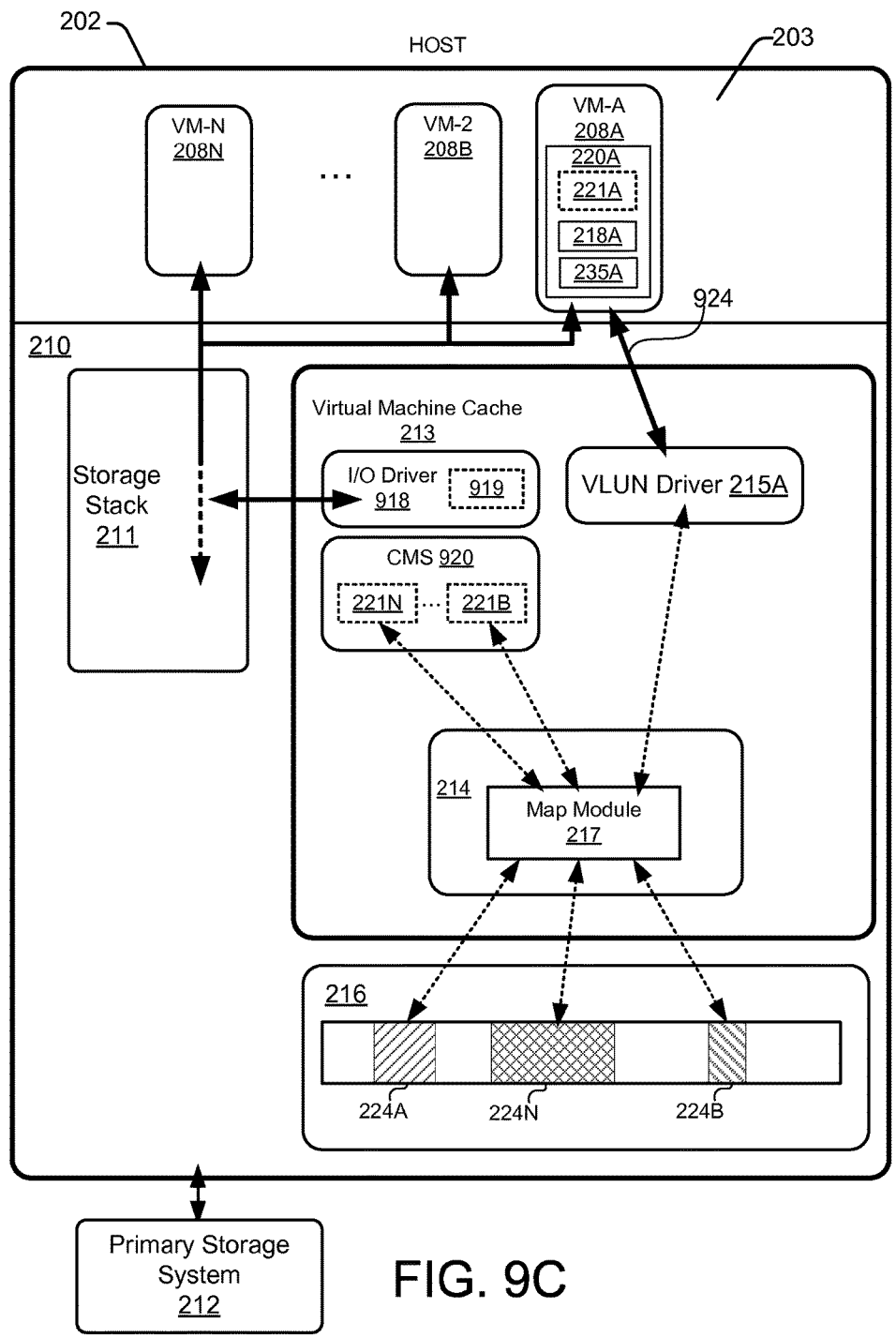
FIG. 9C depicts embodiments of systems and apparatus for caching data in a virtualized environment.

FIG. 9C depicts embodiments of systems and apparatus for caching data in a virtualized environment. In the FIG. 9C embodiment, the virtual machines 208B-N may be standard virtual machines (as in FIGS. 1. 1B and/or 9B). Accordingly, the virtual machine cache 213 may comprise an I/O driver 918 and/or filter 919 configured to monitor and/or selectively service I/O requests of the virtual machines 208B-N in the cache storage 216. The virtual machine cache 213 may be configured to ignore I/O requests of certain virtual machines 208B-N, such that data of the virtual machines 208B-N are not serviced using the cache storage 216.

The virtual machine 208A, however, may operate differently. The virtual machine cache 213 may comprise a VLUN driver 215A configured to represent dynamically allocated cache resources as a read-only, fixed-sized VLUN disk 235A within the virtual machine 208A, as described above in conjunction with FIGS. 1A and 9A. The virtual machine 208A may comprise a separate CMS 220A configured to manage cache operations of the virtual machine 208A as described herein, which may include, but is not limited to: monitoring I/O operations within the virtual machine 208A (by use of the I/O driver and/or filter 218A), maintaining cache tags 221A, and/or selectively directing I/O requests to the virtual machine cache 213 via a communication link 924 and/or I/O driver 218.

The cache provisioner module 214 may be configured to maintain cache allocations between the virtual machines 208A-N, as described herein. The translation layer maintained by the map module 217 may comprise mappings between virtual cache addresses allocated to the virtual machines 208A-N and physical cache resources 224A-N, regardless of whether the CMS 220 of the virtual machine 208A-N operates within a virtual machine (e.g., within 208A) or the CMS 920 operates within the virtualization kernel 210. Although FIG. 9C depicts a single virtual machine 208A operating with a separate, internal CMS 220A, the disclosure is not limited in this regard and could include any hybrid combination of "standard" virtual machines 208B-N (without cache-specific modules and/or configuration), and any number of virtual machines 208A comprising separate, cache-specific components. In some embodiments, I/O operations of the virtual machine 208A may be serviced using both the CMS 220A operating within the virtual machine 208A and the CMS 920 operating within the virtualization kernel 210. The CMS 220A may be configured to service a particular range and/or type of I/O request using the CMS 220A, whereas other ranges and/or types of I/O are serviced by the CMS 920 (e.g., monitored by the I/O driver 918 and/or filter 919, and serviced using the CMS 920, as described above).

The I/O driver 918 and/or filter 919 may be configured to distinguish I/O requests of the virtual machines 208B-N from the I/O requests of 208A based on VMID, by querying the virtualization kernel 210, or the like. I/O requests of the virtual machine 208A monitored within the storage stack 211 may be ignored, since cache operations of the virtual machine 208A are being handled by the CMS 220A and are communicated to the virtual machine cache 213 via the VLUN disk 235A (and/or communication link 924).

Figure 9D:
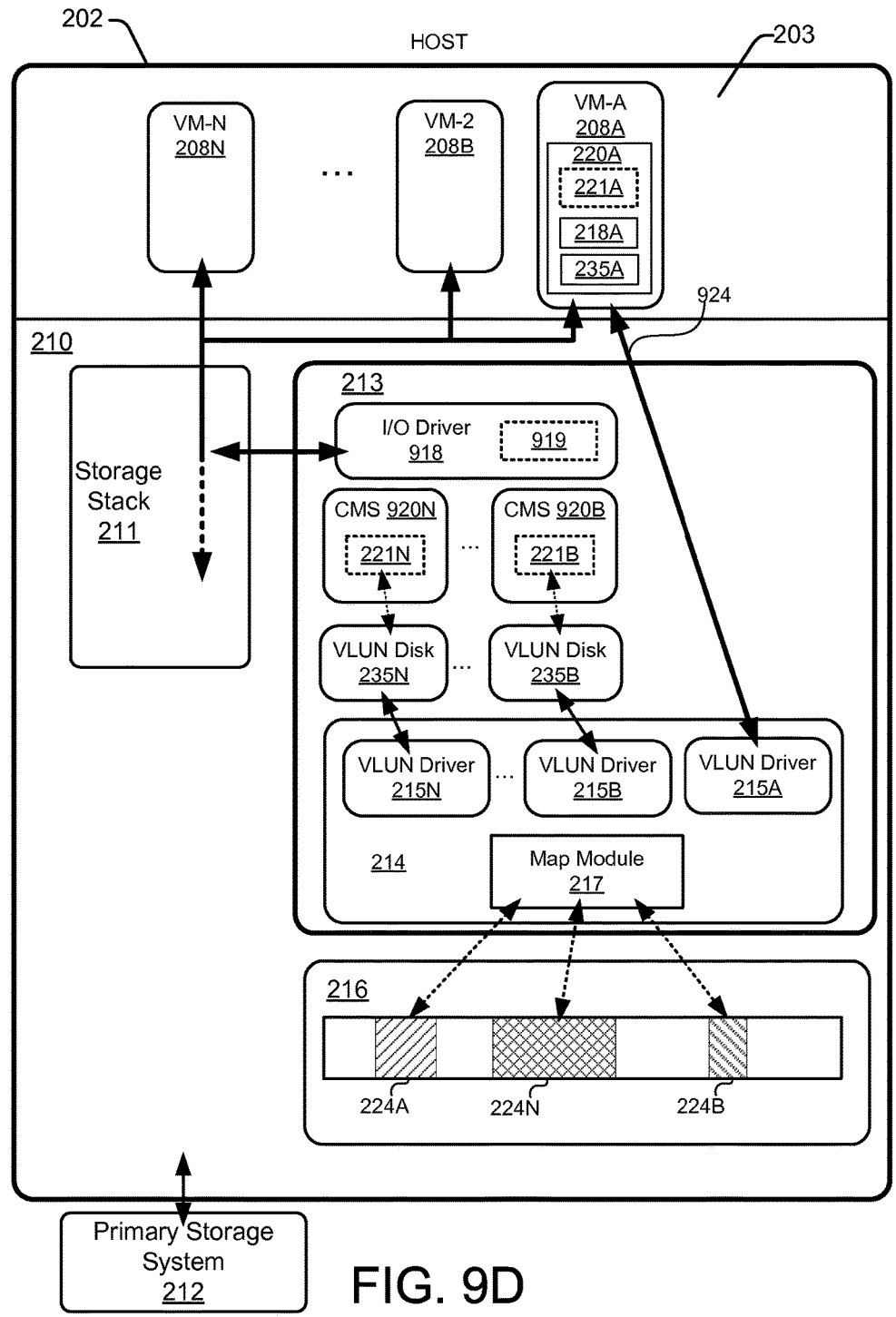
FIG. 9D depicts embodiments of systems and apparatus for caching data in a virtualized environment.

FIG. 9D depicts embodiments of systems and apparatus for caching data in a virtualized environment. As in the FIG. 9C embodiment, the virtual machine 208A may comprise a CMS 220A configured to manage cache operations therein. The CMS 220A may comprise cache tags 221A, an I/O driver and/or filter 218, and a VLUN disk 235A, as described above.

Cache operations of the standard virtual machines 208B-N may be managed by one or more CMSes 920B-N operating within the virtualization layer 210. Alternatively, the virtual machine cache 213 may comprise a single CMS 920 to manage cache operations for the virtual machines 208B-N, as described above.

The cache provisioner module 214 may be configured to dynamically allocate cache resources between the virtual machines 208A-N. The dynamic cache resources may be represented by respective, fixed-sized VLUN disks 235A-N. The VLUN disk 235A may correspond to the VLUN driver 215A, the VLUN disk 235B may correspond to the VLUN driver 215B, the VLUN disk 235N may correspond to the VLUN driver 235N, and so on. Although FIG. 9C depicts separate VLUN drivers 215A-N, in some embodiments, the VLUN disks 235A-N may be backed by a single, consolidated VLUN driver. The VLUN drivers 215A-N may be configured to indicate the actual physical cache resources allocated to the respective virtual machines. In addition, the VLUN drivers 215A-N may issue updates pertaining to changes to cache resource allocations. The VLUN driver 215A may be configured to indicate changes to the cache allocation to virtual machine 208A via the communication link 924 (and/or in accordance with method 1000 of FIG. 10). The VLUN drivers 215B-N may indicate allocation changes to the CMS 920B-N directly, within the virtual machine cache 213. The mapping module 217 may be configured to maintain mappings between virtual cache storage resources represented through the VLUN disks 235A-N and physical cache resources of the cache storage 216 (e.g., physical cache chunks 302 and/or pages 304 within allocations 224A-N to the virtual machines 208A-N).

As disclosed above, the virtual machine cache 213 may be configured to secure data stored within the cache storage 216. The virtual machine cache 213 may secure cache data by use of the translation layer of the map module 213. Since the virtual machines 208A-N are not provided with the actual, physical address of cache data on the cache storage 216, and, as such, must reference the cache data through the virtual machine cache 213 (and the cache provisioner and/or mapping modules 214 and 217), the virtual machines 208A-N may be incapable of directly referencing the data of other virtual machines 208A-N. The cache provisioner module 214 may be further configured to allocate different, incompatible virtual cache addresses to different virtual machines 208A-N, such as virtual cache addresses in different, non-contiguous address ranges and/or address spaces. The use of different, incompatible ranges may prevent the virtual machines 208A-N from inadvertently (or intentionally) referencing virtual and/or physical cache resources of other virtual machines 208A-N.

Securing data may comprise preventing read-before-write conditions that may occur during dynamic cache resource provisioning. For example, a first virtual machine 208A may cache sensitive data within a cache chunk 302 that is dynamically reallocated to another virtual machine 208B. The virtual machine cache 213 may be configured to prevent the virtual machine 208B from reading data from the chunk 302 that were not written by the virtual machine 208B. In some embodiments, the cache provisioner 213 may be configured to erase cache chunks 302 in response to reassigning the chunks 302 to a different virtual machine 208A-N (or removing the association between a virtual machine 208A-N and the cache chunk 302). Erasure may not be efficient, however, due to the characteristics of the cache storage 216; erasing solid-state storage may take longer than other storage operations (100 to 1000 times longer than read and/or write operations), and may increase the wear on the storage medium. Accordingly, the virtual machine cache 213 may be configured to prevent read-before-write conditions in other ways. In some embodiments, for example, the virtual machine cache 213 may be configured to TRIM reallocated chunks 302 (e.g., logically invalidate the data stored on the chunks 302). Cache chunks 302 that are erased and/or invalidated prior to be reallocated may be referred to as "unused chunks." By contrast, a chunk 302 comprising data of another virtual machine 208A-N (and was not erased or TRIMed) is referred to as a "used" or "dirty chunk," which may be monitored to prevent read-before-write security hazards.

Figure 8B:
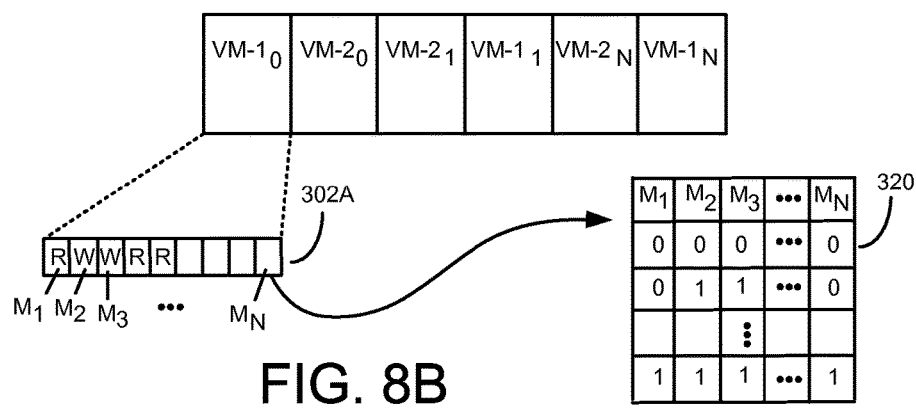
FIG. 8B depicts embodiments of monitoring metadata.

Referring to FIG. 8B, the virtual machine cache 213 may be configured to maintain monitoring state metadata pertaining the cache chunks 302. The monitoring state metadata 320 may be persisted for use after a power cycle event. The monitoring state metadata 320 may comprise a bitmask. In some embodiments, each 4 kb sub-portion of a used chunk 302 is monitored to determine whether there has been a corresponding write. Monitoring metadata 320 may generated in response to reallocating a used or dirty chunk 302 between virtual machines 208A-N. After reallocation, each sub-portion of the chunk 302 may be tested prior to read operations to ensure that the used chunk 302 has been written by the virtual machine 208A-N attempting to perform the read.

In the FIG. 8B embodiment, a chunk 302A is reallocated. The sub-portions of the chunk 302A are represented by references $m_1$ through $m_N$. An indication of a write operation may be reflected by a "1" in the monitoring metadata 320. The virtual machine cache 213 may be configured to prevent read operations on sub-portions that have not been written (e.g., are not marked with a "1").

As disclosed above, virtual machines 208A-N may be transferred between hosts 202, without powering down and/or resetting the virtual machine 208A-N. Such transfer operations may be simplified when the virtual machines 208A-N reference resources that are shared between the hosts 202, since the virtual machines 208A-N will be able to access the same resources when transferred to the new host 202. However, virtual machines 208A-N that reference "local" resources (e.g., resources only available on the particular host), may be prevented from being transferred.

In the FIG. 1A embodiment, the CMS 220 may be configured to access the virtual machine cache 213 through a "virtual disk" (e.g., VLUN disk 235) that the virtualization kernel 210 treats as a "shared device" (and/or a device that does not prevent virtual machines 208A-N from being transferred between hosts 202). The virtual disk may be provided in a "Virtual Machine Disk Format" (VMDK) supported by the host 202 and/or virtualization kernel 210. As described above in conjunction with FIG. 9A, the I/O driver 218 may comprise an I/O filter 219 that is configured to monitor I/O operations of the virtual machine 208A-N, intercept I/O operations directed to the virtual disk (e.g., the VLUN disk, described below), and to forward the I/O operations (and other, related data) to the virtual machine cache 213. The I/O filter 219 may operate "above" a SCSI and/or vSCSI level within the storage stack of the virtual machine 208A-N. The I/O filter 219 may provide for passing I/O requests (and responses) between the CMS 220 of the virtual machines 208A-N and the virtual machine cache 213. The I/O filter may further provide for communicating other data, such as configuration, command, and/or control data (e.g., performing a handshake protocol with the virtual machine cache 213). The virtual disk may be represented as a VLUN disk 235 implemented according to the VMDK format of the host 202 and/or virtualization kernel 210. The virtual disk may be relatively small (e.g., a few megabytes), since the virtual disk is not used for storage, but as a conduit for communication between the virtual machine 208 and the virtual machine cache 213 in the virtualization kernel 210.

The virtual machines 208A-N may be configured to emulate shared storage in other ways. For example, in some embodiments, the virtual machines 208A-N may be configured to replicate one or more "shared" VLUN disks across a plurality of hosts 202, such that, to the hosts, the VLUN disks appear to be shared devices. For instance, the VLUN disks may share the same serial number or other identifier. The host 202 and/or the virtualization kernel 210 may, therefore, treat the VLUN disks as shared devices, and allow virtual machines 208A-N to be transferred to/from the host 202. The VDMK approach described above may provide advantages over this approach, however, since a smaller number of "shared" disks need to be created, which may prevent exhaustion of limited storage references (e.g., a virtual machine may be limited to referencing 256 storage devices).

In some embodiments, the virtual machines 208A-N may not be required to emulate shared storage. For example, the virtual machines 208A-N of FIGS. 1B and 9B (as well as virtual machines 208B-N of FIGS. 9C-9D) may not directly reference a VLUN disk 235 and/or any other resources that are local to the host 202.

Referring back to FIG. 1A, shared storage may be emulated by use of an I/O filter 219 operating within the virtual machines 208A-N. The I/O filter 219 may be configured to monitor I/O operations directed to particular virtual machine disks (VMDKs). The virtualization kernel 210 may treat VMDKs as shared storage; therefore, any virtual machine 208A-N that maps to a VMDK may be available for to be transferred (e.g., in a VMotion™ operation).

The CMS 220 may be configured to maintain cache tags 221, which may represent an optimal working set of the cache per the application of one or more cache policies, such as cache admission policies, cache retention and/or eviction policies (e.g., cache aging metadata, cache steal metadata, LRU, "hotness" and/or "coldness," and so on), cache profiling information, file- and/or application-level knowledge, and the like. Accordingly, the working set may represent the set of cache data that provides optimal I/O performance for the virtual machine 208A-N under certain operating conditions. The working set may take considerable time to develop and/or refine. The CMS 220 may be configured to retain the cache tags 221 of a virtual machine 208A-N in response to relocating, transferring, and/or migrating the virtual machine 208A-N to another host 202 (e.g., in a VMotion™ operation). Retaining the cache tags 221 may comprise maintaining the cache tags 221 in the memory of the virtual machine 208A-N and/or not invalidating the cache tags 221 during reallocation. Alternatively, or in addition, retaining the cache tags 221 may comprise retaining cache tags 221 of the virtual machine CMS 220 operating within the virtualization kernel 210 (e.g., as disclosed above in conjunction with FIGS. 1B, and 9B-9D), which may comprise generating a snapshot of the cache tags 221, storing the cache tags 221 in memory of the host 202, transferring and/or pushing the cache tags 202 to another host 202, or the like.

Retaining the cache tags 221 may further comprise requesting cache storage from the cache provisioner module 214 of the new host 202 and/or selectively adding and/or removing cache tags 221 in response to being allocated a different amount of cache storage on the destination host 202. In some embodiments, the CMS 220 operating within the virtual machine 208A-N may retain the cache tags 221 despite the fact that the cache data referenced by the cache tags 221 does not exist in the cache storage 216 of the destination host 202 of the virtual machine 208A-N. The virtual machine cache 213 may be configured to populate the cache storage 216 with cache data from a previous host 202 of the virtual machine 208A-N (e.g., via a network transfer) and/or from the primary storage system 212 (or other storage resource). Certain cache data, however, such as write-through cache data, write-never cache data, and/or cache metadata stored outside of the memory space of the virtual machine 208A-N may only be available from the previous host 202.

Figure 11A:
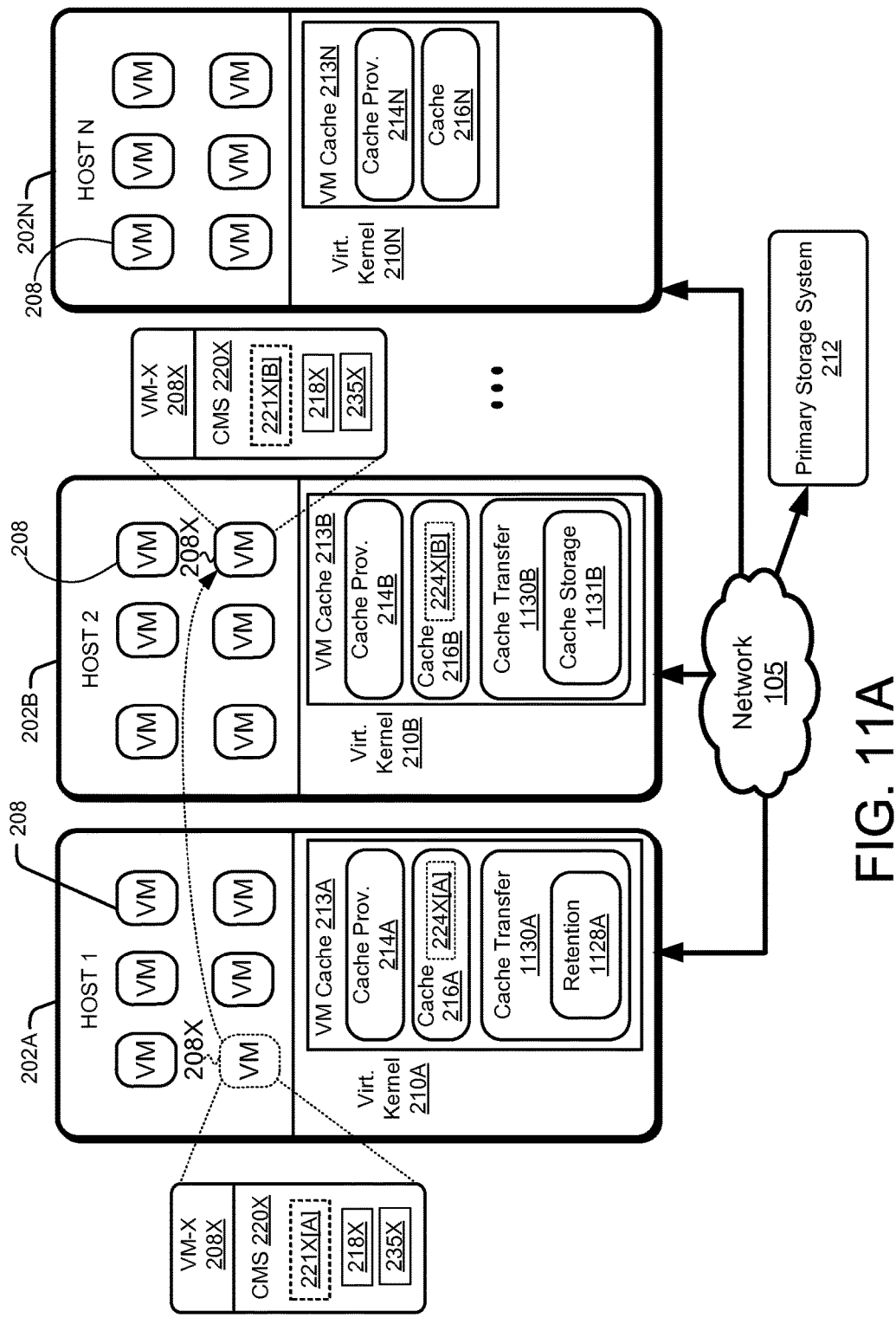
FIG. 11A depicts embodiments of a systems and apparatus for caching data in a virtualized environment.

FIG. 11A is a block diagram of embodiments of systems and apparatus for caching in a virtualized environment 1100. The virtual computing environment 1100 includes multiple hosts 202A-N, each of which may comprise a respective virtualization kernel 210 supporting one or more virtual machines 208. One or more of the hosts 202A-N may further comprise a respective virtual machine cache 213A-N, comprising a cache provisioner module 214 and cache storage 216. Although FIG. 11A depicts three host systems 202A-N, the disclosure is not limited in this regard and could include any number of hosts 202A-N.

As disclosed above, each virtual machine 208 may be assigned a respective VMID. The VMID may be assigned when the virtual machine 208 is instantiated on a host 202A-N (e.g., during an initialization and/or handshake protocol). The VMID may comprise a process identifier, thread identifier, or any other suitable identifier. In some embodiments, the VMID may uniquely identify the virtual machine 208 on a particular host 202A-N and/or within a within a group of hosts 202A-N. For example, the hosts 202A-N may operate within the same namespace, such as a cluster, and the VMID of each virtual machine 208 may be unique within the namespace of the cluster (unique across the virtual machines 208A-N deployed on hosts 202A-N in the cluster). In some embodiments, the VMID may comprise a host identifier, such as a Media Access Control (MAC) address, network address, distinguished name, or the like. The VMID may comprise an identifier assigned by the virtualization kernel 210, hypervisor, host 202A-N, or the like. Accordingly, in some embodiments, a VMID may uniquely identify a virtual machine 208 in a particular namespace, and may identify the host 202A-N upon which the virtual machine 208 is currently deployed (or was previously deployed). Alternatively, or in addition, each virtual machine 208 may be configured to maintain a current host identifier and a previous host identifier.

In some embodiments, one or more of the virtual machines 208A-N may be capable of being relocated and/or transferred between the hosts 202A-N. For example, a virtual machine 208X may be migrated from the host 202A to the host 202B (e.g., in a VMotion™ or similar operation). The systems, apparatus, and methods disclosed herein may provide for migrating the cache state of the virtual machine 208X from the host 202A to the host 202B. Migrating the cache state of the virtual machine 208X may comprise migrating cache metadata (e.g., cache tags 221X[A]) to the host 202B, migrating data of the virtual machine 208X that has been admitted into the cache storage 216A on the host 202A (cache data 224X[A]), and the like. Accordingly, transferring the virtual machine 208X from host 202A to host 202B may comprise retaining cache state of the virtual machine 208X in response to the virtual machine 208X being transferred from the host 202A and/or transferring portions of the cache state to the destination host 202B. Retaining and/or transferring the cache state of the virtual machine 208X may comprise retaining and/or transferring cache metadata (cache tags 221X[A]) and/or cache data 224X[A] of the virtual machine 208X.

In the FIG. 11A embodiment, the virtual machine 208X comprises a CMS 220X which, as disclosed herein, may be configured to selectively service I/O operations of the virtual machine 208X by use of the virtual machine cache 213A of the host 202A and/or in accordance with cache resources dynamically allocated to the virtual machine 208X on the host 202A (e.g., cache storage 224X[A]). The CMS 220X may comprise an I/O driver and/or filter 218X, which may be configured to monitor I/O operations within the virtual machine 208X and/or provide a communication link (not shown) between the CMS 220X and the virtual machine cache 213. The CMS 220X may be configured to maintain cache metadata (including the cache tags 221X[A]) in accordance with the cache resources allocated to the virtual machine 208X by the cache provisioner module 214A. As depicted in FIG. 11A, the cache tags 221X[A] may be maintained within the virtual machine 208X (e.g., within the local memory space of the virtual machine 208X).

The cache tags 221X[A] may correspond to cache data 224X[A] stored in physical storage locations of the cache storage 216A (e.g., cache chunks 302 and/or pages 304). The cache data 224X[A] may be associated with identifiers of the cache tags 221X[A] and/or the VMID of the virtual machine 208X by a map module 217, as disclosed above.

The virtual machine 208X may be transferred from the host 202A to the host 202B. Transferring the virtual machine 208X may comprise transferring a current operating state of the virtual machine 208X, including a current memory image or state of the virtual machine 208X (e.g., stack, heap, virtual memory contents, and so on). Accordingly, in the FIG. 11A embodiment, the cache tags 221X[A] may be automatically transferred to the host 202B with the virtual machine 208X (denoted 221X[B] on host 202B). Transferring the cache tags 221X[A] to host 202B may comprise incorporating the cache tags 221X[B] in accordance with cache resources allocated to the virtual machine 208X on the host 202B, which may comprise adding and/or removing portions of the cache tags 221X[B] on the host 202B, as disclosed above.

As disclosed above, transferring the cache state of the virtual machine 208X may further comprise transferring the cache data 224X[A] to which the cache tags 221X[B] refer. Transferring the cache data 224X[A] may comprise retaining the cache data 224X[A] on the host 202A in response to the virtual machine 208X being transferred therefrom; requesting portions of the retained cache data 224X[A] from the host 202A; and/or transferring portions of the cache data 224X[A] between the hosts 202A and 202B.

In some embodiments, see FIG. 11A, the virtual machine cache 213B at the host 202B may be configured to transfer portions of the cache state of the virtual machine 208X in response to determining that the virtual machine 208X was transferred to the host 202B from another host 202A. The virtual machine cache 213B may be configured to identify the transferred virtual machine 208X and/or determine that the virtual machine 208X is being transferred to the host 202B before the virtual machine 208X arrives thereon. In some embodiments, the virtual machine cache 213B identifies that the virtual machine 208X was transferred to the host 202B in response to receiving a cache request from the virtual machine 208X (e.g., via the VLUN driver 215 and/or communication link 924). After being transferred to the host 202B, the CMS 220X may continue to attempt to service I/O operations using, which may comprise monitoring I/O within the virtual machine 208X (using, inter alia, the I/O driver 218X) and/or directing selected I/O requests to the virtual machine cache 213B via the VLUN disk 235X. The requests, however, may reference cache resources and/or cache data 224X[A] within the cache storage 216A of the host 202A that do not exist on the host 202B. The requests may further comprise the VMID of the transferred virtual machine 208X.

The virtual machine cache 213B at the host 202B may determine that the virtual machine 208X was transferred to the host 202B in response to receiving cache requests from the CMS 220X of the virtual machine 208X; the virtual machine cache 213B may determine no cache space has been allocated to a virtual machine 208X comprising the provided VMID, the cache provisioner module 214B has not allocated cache storage 224X[B] for the virtual machine 208X, and so on. In some embodiments, the virtual machine cache 213B may determine that the virtual machine 208X was transferred to the host 208B based on a host identifier of the VMID. The host identifier may reference the host 202A, whereas the host identifier of a newly powered-on virtual machine 208 on the host 202B may comprise a host identifier of the host 202B (or may be blank). Alternatively, or in addition, the virtual machine 208X may comprise a separate host identifier, which may reference host 202A, and may be accessed in the handshake protocol with the virtual machine cache 213B.

In some embodiments, the virtual machine cache 213B may be notified that the virtual machine 208X is being migrated to the host 202B. The notification may be generated by the previous host 202A, the virtual machine cache 202A, the virtualization kernel 210A or 210B, a management process or entity, or the like. The notification may comprise the VMID of the virtual machine 208X, cache requirements of the virtual machine 208X, and so on.

In response to identifying the transferred virtual machine 208X, the virtual machine cache 213B may initiate a handshake protocol. The handshake protocol may comprise allocating cache storage resources to the virtual machine 208X (e.g., cache space 224X[B]) by the cache provisioner module 214B. The amount of cache storage to allocate to the virtual machine 208X may be based on the size of the cache storage allocated to the virtual machine 208X on the host 202A (cache storage 224X[A]), the size of the working set of the virtual machine 208X (e.g., the number of cache tags 221X[B]), available cache resources, and so on. The cache provisioner module 214B may attempt to allocate sufficient cache storage 224X[B] to support the retained cache tags 221X[A]. If sufficient cache storage cannot be allocated, the CMS 220X may be configured to modify the retained cache tags 221X[B] in accordance with the new cache storage allocation 224X[B]. If excess cache resources are available, the CMS 220X may be configured to add new tags to the retained cache tags 221X[B]. The allocation may be communicated through a virtual disk 235X and/or I/O driver 218X (e.g., SCSI filter driver), as described above.

Transferring the cache state of the virtual machine 208X may comprise transferring portions of the cache data stored within the cache storage 216A of the host 202A (cache data 224X[A]) to the host 202B. In some embodiments, the virtual machine cache 213A may comprise a retention module 1128A, which may be configured to retain cache data 224X[A] of the virtual machine 208X after the virtual machine 208X is transferred from the host 202A. The cache data 224X[A] may be retained for a retention period and/or until the virtual machine cache 213A determines that the retained cache data 224X[A] is no longer needed. The retention module 1128A may determine whether to retain the cache data 224X[A] (and/or determine the cache data retention period) based upon various retention policy considerations, including, but not limited to, availability of cache storage 216A, availability of cache storage 216B, relative importance of the retained cache data 224X[A] (as compared to cache requirements of other virtual machines 208), whether the cache data 224X[A] is available in the primary storage system 212 (or other backing store), a cache mode and/or persistence level of the cache data 224X[A], and so on. For example, cache data stored in a write-never cache mode (cache data that has not been written-through to the primary storage system 212) may only be available on the original virtual machine cache 213A. The cache retention module 1128A may be configured to prioritize retention of write-never cache data until the write-never cache data is transferred to the new host 202B. By contrast, cache data stored in different cache modes (e.g., write-through and/or write-back cache mode) may have a lower retention priority, since this data will also be available from the primary storage system 212. In some embodiments, the retention policy comprises a transfer threshold; the retained cache data 224X[A] may be retained until a threshold amount of the retained cache data 224X[A] has been transferred. Alternatively, or in addition, the retained cache data 224X[A] may be removed as it is transferred to the host 202B (e.g., portions transferred to the host 202B may be immediately removed from the cache storage 216A of host 202A).

As disclosed above, the CMS 220X of the virtual machine 208X may be configured to retain cache metadata (the cache tags 221X[B] at the host 202B) despite the fact that the cache storage 216B does not comprise the cache data to which the cache tags 221X[B] refer. Although the virtual machine 208X may have been allocated cache resources 224X[B] at the host 202B, the newly allocated resources may not be populated with cache data 224X[A] of the virtual machine 208X. As described in further detail herein, the virtual machine cache 213B may be configured to populate the cache storage 224X[B] with cache data 224X[A] transferred from the cache storage 216A and/or from the primary storage system 212, to reconstruct the working set of the virtual machine 208X at the host 202B.

The virtual machine cache 213B may comprise a cache transfer module 1130B, which may be configured to access cache data 224X[A] of the virtual machine 208X at the previous host 202A. The cache transfer module 1130B may be configured to identify the previous host 202A by use of the VMID (e.g., accessing a previous host identifier maintained by the virtual machine 208X), by interrogating the virtual machine 208X, querying the virtualization kernel 210B (or other entity), or the like. The cache transfer module 1130B may use the host identifier and/or host addressing information request portions of the retained cache data 224X[A] from the host 202A via the network 105. In some embodiments, the cache transfer module 1130B is configured to determine and/or derive a network address and/or network identifier (network name or reference) of the host 202A from the host identifier.

The virtual machine cache 213A may comprise a cache transfer module 1130A that is configured to selectively provide access to retained cache data 224X[A] of the virtual machine 208X. In some embodiments, the cache transfer module 1130A is configured to secure the retained cache data 224X[A]. For example, the cache transfer module 1130A may be configured to verify that the requesting entity (e.g., the virtual machine cache 213B) is authorized to access the retained cache data 224X[A], which may comprise verifying that the virtual machine 208X has been deployed on the host 202B and/or verifying that requests for the retained cache data 224X[A] are authorized by the virtual machine 208X (or other authorizing entity). For example, the cache transfer module 1130A may request a credential associated with the transferred virtual machine 208X, such as the VMID, or the like. Alternatively, or in addition, the cache transfer module 1130A may implement a cryptographic verification, which may comprise verifying a signature generated by the transferred virtual machine 208X, or the like.

The cache data 224X[A] may be transferred between the hosts 202A and 202B using various mechanisms, including, but not limited to: push transfers, demand paging transfers, prefetch transfers, bulk transfers, or the like.

A push transfer may comprise the cache transfer module 1130A pushing cache data 224X[A] of the virtual machine 208X to the host 202B without receiving a request for the cache data 224X[A] (e.g., before the host 202B requests the cache data 224X[A]). The cache transfer module 1130A may be configured to push cache data 224X[A] of the virtual machine 208X in response to determining that the virtual machine 208X is to be transferred to the host 202B. The cache data 224X[A] may be pushed to the new host 202B before the transfer actually takes place, before the transfer is complete, and/or before the virtual machine 208X initiates a handshake protocol at the new host 202B. Pushing the cache data 224X[A] may serve to notify the virtual machine cache 213B that the virtual machine 208B is being transferred thereto. In response, the virtual machine cache 213B may preemptively allocate cache resources 224X[B] for the virtual machine 208X and/or begin populating the cache with the cache data 224X[A] pushed from the host 202A.

A demand paging transfer may comprise transferring retained cache data 224X[A] in response to I/O requests generated by the virtual machine 208X after deployment on the host 202B (e.g., on demand). The transferred cache data 224X[A] may be used to service the I/O requests. In addition, the transferred cache data 224X[A] may be admitted into the cache storage 216B of the new host 202B. Alternatively, the transferred cache data 224X[A] may be admitted at a later time (or not at all), in accordance with cache policy and/or cache resource allocations at the host 202B.

A prefetch transfer may comprise transferring cache data 224X[A] according to a prefetch cache policy (e.g., by proximity or the like). The amount and/or extent of cache data 224X[A] to prefetch from the host 202A may be determined by, inter alia, cache metadata of the CMS 220X (e.g., cache aging metadata, "hotness," and so on). Accordingly, in some embodiments, the cache transfer module 1130B may be configured to query the CMS 220X to identify cache data 224X[A] for prefetch (if any) and/or prioritize prefetch operations.

A bulk transfer may comprise transferring cache data 224X[A] in bulk, independent of I/O operations of the virtual machine 208X. A bulk transfer may comprise populating the entire cache storage 224X[B] allocated to the virtual machine 208X at host 202B. Alternatively, a bulk transfer may comprise populating a subset of the cache storage 224X[B], which, as discussed above, may be selected based upon cache metadata of the virtual machine CMS 220X and/or determined by differences in cache resources allocated to the virtual machine 208X at the hosts 202A and 202B.

The cache transfer module 1130B may be further configured to prioritize cache transfers (e.g., prefetch and/or bulk transfers) in accordance with the cache mode and/or state of the cache data 224X[A]. For example, data that is cached in a write-never cache mode or write-back cache mode (and is not yet backed in primary storage) may only be available from the previous host 202A, and as such, may be prioritized over data that may be available from alternative sources (e.g., primary storage system 212). Therefore, the cache transfer module 1130B may be configured to prefetch and/or bulk transfer certain portions of the cache data 224X[A] rather than waiting for on-demand paging or the like.

The cache storage module 1131B may be configured to selectively admit cache data 224X[A] into the cache 224X[B]. The cache storage module 1131B may be further configured to populate the cache data 224X[B] from other sources, such as the primary storage system 212, other hosts 202N, or the like. The cache storage module 1131B may be configured to associate the cache data 224X[B] with the identifiers of the retained cache tags 221X[B], such that the references in the retained cache tags 221X[B] remain valid per the mappings implemented by the map module 217, as described above.

In response to requests for cache data 224X[A] of the virtual machine 208X, the cache transfer module 1130A may be configured to identify the requested cache data using, inter alia, the VMID of the transferred virtual machine 208X (by use of the map module 217). The cache transfer module 1130A may transfer the requested cache data 224X[A] (if available) to the cache transfer module 1130B via the network 105.

The cache transfer module 1130B may be configured to populate the cache data 224X[B] from various other sources, such as the primary storage system 212 or other shared storage resources. The cache transfer module 1130B may select the source of the cache data based upon various policy considerations (e.g., a cache transfer policy), which may include a network policy, bandwidth policy, host resource policy, primary storage resource policy, and the like. For example, in response to determining that the network 105 is highly congested, the cache transfer module 1130B may be configured to reduce the amount of data to transfer (defer a bulk transfer) and/or transfer the cache data from another source that is independent of the network 105. Similarly, the cache transfer module 1130B may direct requests to the host 202A (as opposed to the primary storage system 212) in response to determining that the primary storage system 212 is heavily loaded and/or has limited available bandwidth. Certain types of data, however, may only be available from the host 202A. For instance, write-never and/or write-back cache data that has not yet been written-through to the primary storage system 212, may only be available from the host 202A. The cache transfer module 1130B may be configured to identify such data, and to prioritize such data transfers to reduce the chance of data loss.

The retained cache data 224X[A] may represent cache resources that cannot be used by the other virtual machines 208A-N operating on the host 202A. As such, the cache retention module 1128A may be configured to selectively remove the retained cache data 224X[A] when it is no longer needed and/or according to a retention policy. The retention policy may be determined based upon the retention policy factors, described above. In some embodiments, the cache transfer module 1130B is configured to inform the host 202A of cache data that has been transferred to the host 202B from other sources so that the cache retention module 1128A can remove the corresponding retained cache data 224X[A] from the cache storage 216A. The cache transfer module 1130B may be further configured to inform the host 202A of other conditions in which the cache data 224X[A] no longer needs to be retained, such as when the data is modified, overwritten, deleted (e.g., TRIMed), and/or evicted from the cache storage 216B at the host 202B. For example, upon being transferred to the host 202B, the virtual machine 208X may perform a storage operation to delete or TRIM data corresponding to cache data 224X[A] retained at host 202A. In response, the cache transfer module 1130B may inform the host 202A that the corresponding cache data 224X[A] no longer needs to be retained within the cache storage 216A.

As disclosed above, in some embodiments, the cache transfer module 1130A may be configured to "push" cache data 224X[A] to the host 202B. Pushing cache data may comprise transferring retained cache data 224X[A] to the cache transfer module 1130B (and/or cache storage module 1131B) without receiving a request (independent of requests for the cache data 224X[A]). The cache transfer module 1130A may determine the host identifier of the new host 202B through user configuration; the verification process, described above; active polling by the cache transfer module 1130A; a call-back implemented by the transferred virtual machine 208X; or the like. In some embodiments, the virtual machine cache 213B of the host 202B may identify that the virtual machine 208X was transferred from the host 202A in response to receiving cache data pushed from the host 202A, as described above. The cache transfer module 1130A may be configured to selectively push high-priority cache data, such as write-never cache data to prevent data loss.

Figure 11B:
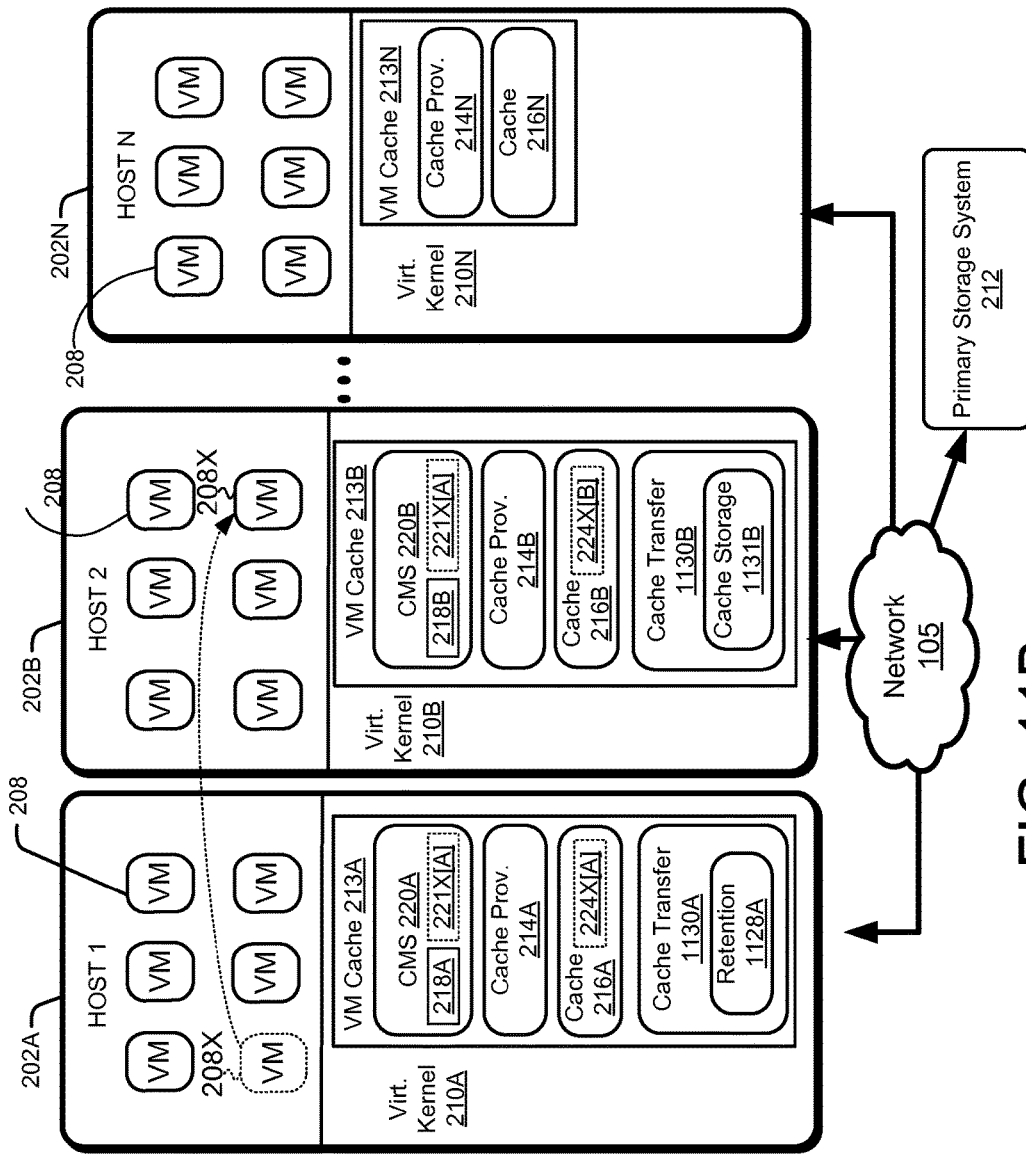
FIG. 11B depicts embodiments of systems and apparatus for caching data in a virtualized environment.

FIG. 11B depicts embodiments of systems and apparatus for caching data in a virtualized environment. In the FIG. 11B embodiment, the virtual machine 208X is a standard virtual machine that does not include a CMS 220X and/or other cache-specific modules, components, and/or configuration. Cache operations for the virtual machine 208X on the host 202A may, therefore, be managed by a CMS 220A operating within the virtualization kernel 210A. The CMS 220A may be configured to monitor I/O requests of the virtual machine 208X within a storage stack of the virtualization kernel 210A (and/or host operating system) by use of an I/O driver and/or filter 218, and to selectively service identified I/O requests from the cache storage 216A, as described above.

As disclosed above, the virtual machine cache 213A may be configured to retain and/or transfer cache data of the virtual machine 208X in response to the virtual machine 208X being migrated to another host 202B. As illustrated in FIG. 11B, the cache tags 221X[A] of the virtual machine 208X may be stored outside of the memory space of the virtual machine 208X. Accordingly, the cache tags 208X may not be automatically transferred with the virtual machine 208X to the host 202B; the cache tags 221X[A] are not part of the memory image and/or "operating state" of the virtual machine 208X (e.g., are not stored in the memory space of the virtual machine 208X). Accordingly, retaining and/or transferring the cache state of the virtual machine 208X may comprise retaining and/or transferring the cache tags 221X[A] maintained by the CMS 220A within the virtualization kernel 210 and/or the cache data 224X[A] of the virtual machine 208X within the cache storage 216A.

As disclosed above, the virtual machine cache 213A may comprise a retention module 1128A that is configured to retain cache data 224X[A] of the virtual machine 208X in response to the virtual machine being transferred from the host 202A. The cache retention module 1128A may be further configured to retain the cache tags 221X[A] of the virtual machine 208X. The cache tags 221X[A] may be retained since, as disclosed above, the cache tags 221X[A] may not be automatically transferred with the virtual machine 208X to the host 202B. The cache tags 221X[A] may be retained in memory of the CMS 220A (e.g., within volatile memory of the virtualization kernel 210A and/or host 202A). Alternatively, or in addition, the virtual machine cache 213A may be configured to create a snapshot of the cache tags 221X[A], which may comprise storing the cache tags 221X[A] in a persistent storage, such as cache storage 216A and/or primary storage system 212. In some embodiments, the cache tags 221X[A] may be retained by use of a cache tag retention module 417 of the CMS 220A, as described above.

The virtual machine cache 213B may be configured to detect arrival of the virtual machine 208X at the host 202B. The virtual machine cache 213B may comprise an I/O driver and/or filter 218B configured to monitor I/O requests of the virtual machines 208 deployed on the host 202B. The virtual machine cache 213B may identify the transferred virtual machine 208X in response to detecting an I/O request from the virtual machine 208X. The I/O request may comprise a VMID of the virtual machine 208X and/or may comprise information from which the VMID may be derived. The virtual machine cache 213B may identify the transferred virtual machine 208X by use of the VMID, as described above. Alternatively, or in addition, the virtual machine cache 213B may identify the transferred virtual machine 208X by use of the virtualization kernel 210B (e.g., through a query, push notification, or the like), and/or the host 202A (or other entity), as described above. For example, the virtual machine cache 208A may be configured to notify the host 202B that the virtual machine 208X is being transferred thereto, which may comprise pushing data of the virtual machine 208X to the host 202B (e.g., cache data 224X[A] and/or cache metadata, such as the cache tags 221X[A]).

In response to identifying the transferred virtual machine 208X, the virtual machine cache 213B may be configured to provision cache storage resources to the virtual machine 208X (by use of the cache provisioner module 214B), which, as disclosed above, may comprise dynamically allocating cache storage space 224X[B] for the virtual machine 208X. In addition, the cache storage module 1131B may be configured to populate cache tags 221X[B] with the retained cache tags 221X[A] (and/or a subset thereof), populate cache storage 224X[B] with cache data 224A[X] acquired from the host 202A (via the cache transfer module 1130A) or other data sources, and so on, as disclosed above. The retained cache tags 221X[B] and/or cache data 224X[A] may be transferred using one or more of: push transfers, demand transfers, pre-fetch, and/or bulk transfers.

The cache transfer module 1130B may be configured to acquire cache metadata from the host 202A, including the retained cache tags 221X[A]. The retained cache tags 221X[A] may be transferred between the hosts 202A and 202B as described above (e.g., by push, demand, pre-fetch, and/or bulk transfers). Transfer of the retained cache tags 221X[A] may be prioritized over other transfer operations due, inter alia, to the fact that the cache tags 221X[A] may only be available on the host 202A. In some embodiments, the cache tags 221X[A] are transferred before other cache data 224X[A] is transferred. The cache tags 221X[A] may be transferred first to allow the cache provisioner module 214B to know how much cache storage 224X[B] to allocate for the virtual machine 208X (e.g., based on the size and/or number of cache tags 221X[A]) and/or to provide the cache storage module 1131B cache storage information (e.g., the identifier (s) with which the transferred cache data 224X[A] should be associated in the cache storage 224X[B]).

Although, for clarity, the disclosure employs separate FIGS. 11A and 11B to describe the transfer of a virtual machine 208X comprising an internal CMS 220X and a standard virtual machine 208X, the disclosure is not limited in this regard; the embodiments disclosed herein could be adapted to transfer both types of virtual machines 208 (e.g. in a hybrid configuration as depicted in FIGS. 9C and 9D).

Figure 12A:
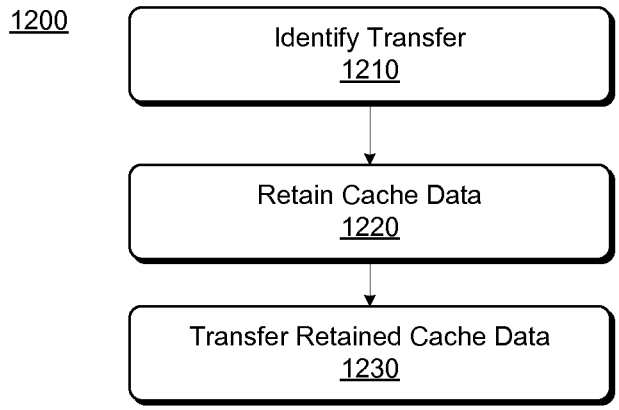
FIG. 12A is a flow diagram of one embodiment of a method for transferring cache state.

FIG. 12 is a flow diagram of one embodiment of a method 1200 for transferring a cache state. Step 1210 may comprise identifying a transfer. Step 1210 may comprise determining that the virtual machine 208X is being (or is to be) transferred, migrated, and/or relocated from the host 202A. The determination of step 1210 may comprise receiving an indication of the migration operation from the host 202A, the virtualization kernel 210A, a destination host 202B, or another entity (e.g., an administration process). The indication may be received in response to the virtual machine 208X deallocating resources and/or otherwise being prepared for the migration operation. The indication may comprise a signal, call-back, message, or other suitable mechanism.

Step 1220 may comprise retaining cache state in response to identifying the transfer. The cache state may include, but is not limited to: cache metadata, cache data, and the like. Accordingly, step 1220 may comprise retaining cache tags 221X[A] of the virtual machine 208X and/or retaining cache data 224X[A] of the virtual machine 208X. Retaining the cache tags 221X[A] may comprise retaining the cache tags 221X[A] in a memory space of the virtual machine 208X (as disclosed above in conjunction with FIG. 11A) and/or retaining the cache tags 221X[A] within the CMS 220X after determining that the virtual machine 208X is no longer on the host 202A (and/or determining that the retained cache tags 221X[B] do not correspond to valid cache data and/or cache resources on the destination host 202B). Alternatively, or in addition, step 1220 may comprise retaining cache tags 221X[A] of the virtual machine 208X at the host 202A (e.g., within a CMS 220A of the host 202A as disclosed above in conjunction with FIG. 11B). Step 1220 may further comprise creating a snapshot of the cache tags 221X[A], persisting the snapshot on a storage medium, or the like.

Step 1230 may comprise transferring at least a portion of the retained cache data. Step 1230 may comprise transferring cache tags 221X[A] and/or cache data 224X[A] from the host 202A to the host 202B. Step 1230 may comprise transferring cache tags 221X[A] retained at the host 202A (by the retention module 1128A). Alternatively, the cache tags 221X[B] may have been transferred with the virtual machine 221X (as illustrated in FIG. 11A). The cache tags 221X[A] may be transferred before other retained cache data 224X[A]. Step 1230 may further comprise transferring retained cache data 224X[A] from the host 202A. Transferring the retained cache data 224X[A] may comprise one or more: push transfers, on-demand transfers, pre-fetch transfers, bulk transfers, or the like, as disclosed above.

Figure 12B:
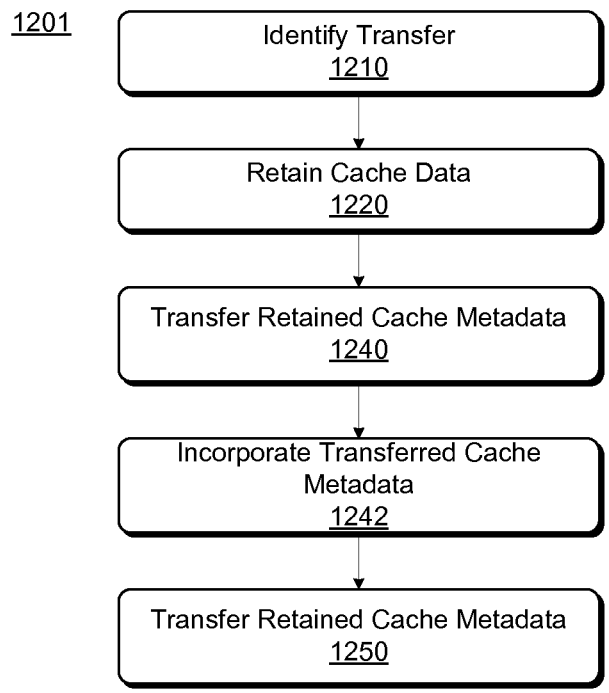
FIG. 12B is a flow diagram of another embodiment of a method for transferring cache state.

FIG. 12B is a flow diagram of another embodiment of a method 1201 for transferring a cache state. Steps 1210 and 1220 may comprise identifying a transfer and retaining cache data, as disclosed above.

Step 1240 may comprise transferring cache metadata. In some embodiments, cache metadata is maintained within the virtual machine 208X (as depicted in FIG. 11A). Accordingly, step 1240 may comprise transferring the virtual machine 208X to the destination host 202B. Step 1240 may further comprise retaining the cache tags 221X[A] within the CMS 220X in response to determining that the virtual machine 208X has been transferred and/or determining that the retained cache tags 221X[B] at host 202B do not correspond to cache resources and/or cache data on the destination host 202B. In some embodiments, and as illustrated in FIG. 11B, step 1240 may comprise transferring cache tags 221X[A] retained at the host 202A to the destination host 202B. Transferring the retained cache tags 221X[A] may comprise requesting the retained cache tags 221X[A] (by the cache transfer module 1130B operating on the host 202B). Alternatively, or in addition, transferring the cache tags 221X may comprise pushing retained cache tags 221X from the host 202A to the host 202B (by the cache transfer module 1130A operating on the host 202A).

Step 1242 may comprise incorporating the transferred cache metadata. Step 1242 may, therefore, comprise incorporating the cache tags 221X[A] transferred from host 202A at the destination host 202B (cache tags 221X[B]). Step 1242 may comprise allocating cache resources 224X[B] to the virtual machine 208X at the destination host 202B, and/or modifying the transferred cache tags 221X[B] in accordance with the cache resource allocation. Modifying the transferred cache tags 221X[B] may comprise adding cache tags 221X[B], removing cache tags 221X[B], or the like. Step 1242 may further comprise incorporating other cache metadata, such as access metrics, and the like. The cache metadata may be used to make cache admission and/or eviction decisions, as disclosed above.

Step 1250 may comprise transferring retained cache data 224X[A] from the host 202A to the destination host 202B, as disclosed above. Transferring the cache data 224X[A] at step 1250 may occur after the transferred cache metadata 1242 has been incorporated at step 1242 (e.g., after cache storage 224X[B] has been allocated to the virtual machine 208X and/or associated with the cache tags 221X[B]). Step 1250 may comprise selectively admitting cache data 224X[A] transferred from the host 202A into the cache storage 216B of host 202B, associating the cache data 224X[B] with the virtual machine 208X (and/or the incorporated cache tags 221X[B]), and so on.

Figure 13:
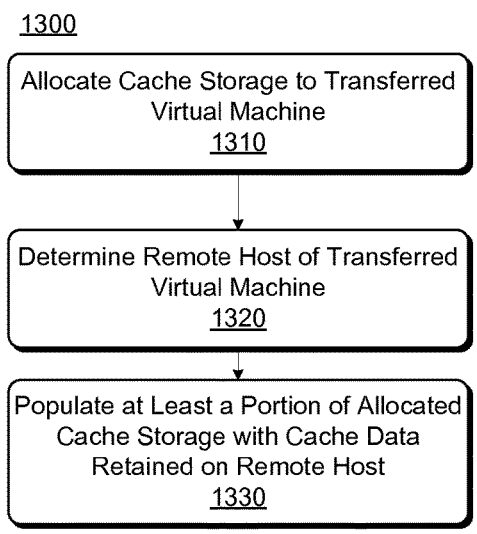
FIG. 13 is a flow diagram of another embodiment of a method for caching data in a virtualized environment.

FIG. 13 is a flow diagram of another embodiment of a method 1300 for caching data in a virtualized environment. Step 1310 may comprise a cache provisioner module 214B allocating cache storage to a virtual machine 208X on a host 208B in response to the virtual machine 208X migrating to the host 202B from a another host 202A. The host 202B may be communicatively coupled to the host 202A by a network 105 or other communication infrastructure. As described above, the cache provisioner module 214B may identify the transferred virtual machine 208X in response to receiving an I/O request from the CMS 220X of the virtual machine 208, or other query (as in FIG. 11A), in response to detecting an I/O request of the virtual machine 208X (as in FIG. 11B), in response to a notification from the host 202A (or other entity), receiving cache data 224X[A] and/or cache tags 221X[A], or the like. Identifying the transferred virtual machine 208X may further comprise accessing and/or deriving a VMID of the virtual machine 208X, as described above. Step 1310 may further comprise distinguishing the transferred virtual machine 208X from an initial power-on and/or restart condition based on the VMID of the virtual machine 208X, a host identifier, or the like.

Step 1310 may comprise dynamically allocating cache storage 224X[B] to the virtual machine 208X. Step 1310 may further comprise representing the dynamically allocated cache storage 224X[B] through a fixed-size VLUN disk 235 (by use of a VLUN driver 215), as disclosed herein.

Step 1320 may comprise the cache transfer module 1130B of the host 202B identifying the previous host 202A of the transferred virtual machine 208X. Step 1320 may comprise accessing a host identifier in the VMID of the virtual machine 208X, querying the transferred virtual machine 208X, receiving a notification from the host 202A (or other entity), receiving pushed cache data from the previous host 202A, or the like. Step 1320 may comprise determining a network address, qualified name, or other identifier configured to allow the host 202B to communicate with the host 202A via the network 105.

Step 1330 may comprise populating at least a portion of the cache storage 224X[B] allocated to the virtual machine 208X with retained cache data 224X[A] acquired from the host 202A, as described above. The cache data 224X[A] may correspond to cache data stored in a write-never cache configuration that is only available at the previous host 202. Step 1330 may comprise requesting the retained cache data 224X[A], verifying that the host 202B is authorized to access the retained cache data 224X[A], receiving the cache data 224X[A] in a push operation, or the like. Cache data may be requested, transferred, and/or pushed according to a cache transfer policy of the cache transfer module 1130B and/or cache transfer module 1130A, as described above. In some embodiments, step 1330 further comprises populating the allocated cache storage 224X[B] with data accessed from primary storage 212 (or another source). Step 1330 may further comprise informing the host 202A of portions of the retained cache data 224X[A] that no longer need to be retained at the host 202A.

In some embodiments step 1330 further comprises requesting cache metadata from the host 202A, including retained cache tags 221X[A]. The cache tags 221X[A] may be requested and/or transferred before requesting and/or transferring other retained cache data 224X[A]. In some embodiments, the retained cache tags 221X[A] are required and/or transferred before allocating cache storage 224X[B] for the virtual machine 208X at step 1320; the size and/or number of retained cache tags 221X[A] may inform the amount of cache storage 224X[B] that needs to be allocated to the virtual machine 208X.

Figure 14:
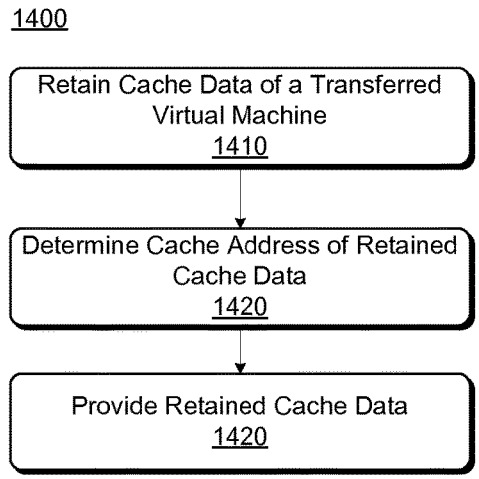
FIG. 14 is a flow diagram of another embodiment of a method for caching data in a virtualized environment.

FIG. 14 is a flow diagram of another embodiment of a method 1400 for caching data in a virtualized environment. Step 1410 may comprise retaining cache data 224X[A] of a virtual machine 208X in cache storage 216A in response to determining that the virtual machine 208X is transferring, migrating, and/or being relocated from the host 202A. The cache data 224X[A] may be retained by a cache retention module 1128A in accordance with a retention policy, as described above. In some embodiments, step 1410 may comprise prioritizing retention of write-never and/or write-back cache data, which may not be available on primary storage 242 (e.g., may only be available within the virtual machine cache 213A of the previous host 202A).

In some embodiments, step 1410 further comprises retaining cache metadata of the virtual machine 208X, such as cache tags 221X[A] of the virtual machine 208X. The retained cache tags 221X[A] may be stored outside of the operating state (e.g., memory space) of the virtual machine 208X. In some embodiments, the retained cache tags 221X[A] are maintained by a CMS 220A operating within the virtualization kernel 210A of the host 202A. Retaining the cache tags 221X[A] may comprise retaining the cache tags 221X[A] in memory of the host 202A, storing the retained cache tags 221X[A] in persistent storage, creating a snapshot of the cache tags 221X[A], or the like.

Step 1420 may comprise determining a cache address of the retained cache data 224X[A] in response to a request for the cache data. The cache address may be based on a VMID of the transferred virtual machine 208X, which may be received in conjunction with a request for the retained cache data 221X[A]. The cache address of the data may be determined by a map module 217, which may be configured to associate cache resources (e.g., cache chunks 302) with the virtual machines 208A-N to which the resources are allocated.

Step 1430 may comprise providing retained cache data 224X[A], as described above. Step 1430 may comprise responding to requests for the retained cache data 224X[A] from a cache transfer module 1130B of the host 202B, pushing the retained cache data 224X[A] to the host 202B, or the like. Step 1430 may further comprise transferring the retained cache tags 221X[A] to the host 202B. The retained cache tags 221X[A] may be pushed to the host 202B and/or may be provided in response to requests for the retained cache tags 221X[A], as disclosed above.

Figure 15:
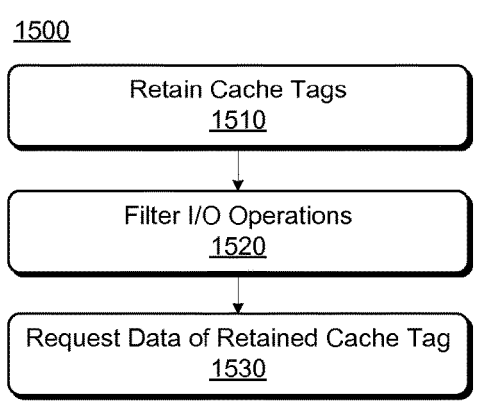
FIG. 15 is a flow diagram of another embodiment of a method for caching data in a virtualized environment.

FIG. 15 is a flow diagram of another embodiment of a method 1500 for caching data in a virtualized environment. Step 1510 may comprise retaining cache tags 221X within the virtual machine 220X response to determining that the virtual machine 208X is to be transferred, migrated, and/or relocated from a host 202A to a host 202B (as depicted in FIG. 11A).

Step 1520 may comprise filtering I/O requests and/or directing selected I/O requests to a CMS 220B in accordance with the retained cache tags 221X. Step 1520 may comprise requesting data of one or more cache tags 221X that have not yet been transferred to cache storage 224X[B] allocated to the virtual machine 208X on the host 202B. In response to such a request, the virtual machine cache 213B may identify the virtual machine 208X as a transferred virtual machine (e.g., as opposed to an initial boot up or power on), allocate cache storage 224X[B] for the virtual machine 208X, determine the previous host 202A of the virtual machine 208X, and/or transfer cache data from the previous host 202A (by use of the cache transfer module 1130B).

Step 1530 may comprise requesting data of a retained cache tag 221X, as described above. Requesting access may comprise performing an on-demand transfer of cache data 224X[A] from the host 202A to the virtual machine cache 213B of the new host 202B, pre-fetching cache data 224X [A], and/or a bulk transfer, as described above.

Figure 16:
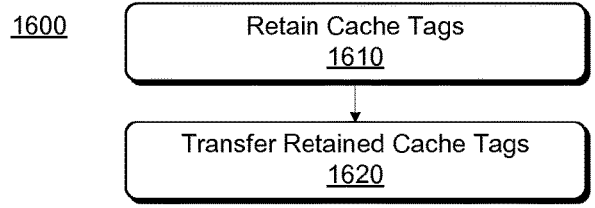
FIG. 16 is a flow diagram of another embodiment of a method for caching data in a virtualized environment.

FIG. 16 is a flow diagram of another embodiment of a method 1600 for caching data in a virtualized environment. Step 1610 may comprise retaining cache tags 221X[A] of a virtual machine 220X response to transferring the virtual machine 208X from a host 202A to a host 202B (as depicted in FIG. 11B). Step 1610 may comprise retaining the cache tags 221X[A] in memory of the host 202A (e.g., within the virtualization kernel 210A), persisting the cache tags 221X [A], creating a snapshot of the cache tags 221X[A], or the like, as described above.

Step 1620 may comprise transferring the retained cache tags to the host 202B. Step 1620 may comprise pushing the retained cache tags 221X[A] to the host 202B independent of a request. Step 1620 may further comprise receiving a request for the cache tags from the host 202B. The request may be generated by the cache transfer module 1130B of the host 202B and comprise an identifier of the virtual machine 208X (the VMID of the virtual machine 208X). Step 1620 may comprise verifying that the host 202B is authorized to access the cache tags of the virtual machine 208X, which may comprise authenticating a credential (e.g., the VMID), requesting and/or validating a signature, or the like.

Reference throughout this specification to features, advantages, or similar language does not imply that all of the features and advantages that may be realized are included any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

The embodiments disclosed herein may involve a number of functions to be performed by a computer processor, such as a microprocessor. The microprocessor may be a specialized or dedicated microprocessor that is configured to perform particular tasks according to the disclosed embodiments, by executing machine-readable software code that defines the particular tasks of the embodiment. The microprocessor may also be configured to operate and communicate with other devices such as direct memory access modules, memory storage devices, Internet-related hardware, and other devices that relate to the transmission of data in accordance with various embodiments. The software code may be configured using software formats such as Java, C++, XML (Extensible Mark-up Language) and other languages that may be used to define functions that relate to operations of devices required to carry out the functional operations related to various embodiments. The code may be written in different forms and styles, many of which are known to those skilled in the art. Different code formats, code configurations, styles and forms of software programs and other means of configuring code to define the operations of a microprocessor in accordance with the disclosed embodiments.

Within the different types of devices, such as laptop or desktop computers, hand held devices with processors or processing logic, and also possibly computer servers or other devices that utilize the embodiments disclosed herein, there exist different types of memory devices for storing and retrieving information while performing functions according to one or more disclosed embodiments. Cache memory devices are often included in such computers for use by the central processing unit as a convenient storage location for information that is frequently stored and retrieved. Similarly, a persistent memory is also frequently used with such computers for maintaining information that is frequently retrieved by the central processing unit, but that is not often altered within the persistent memory, unlike the cache memory. Main memory is also usually included for storing and retrieving larger amounts of information such as data and software applications configured to perform functions according to various embodiments when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured disclosed herein enable the physical transformation of these memory devices. Accordingly, the embodiments disclosed herein are directed to novel and useful systems and methods that, in one or more embodiments, are able to transform the memory device into a different state. The disclosure is not limited to any particular type of memory device, or any commonly used protocol for storing and retrieving information to and from these memory devices, respectively.

Embodiments of the systems and methods described herein facilitate the management of data input/output operations. Additionally, some embodiments may be used in conjunction with one or more conventional data management systems and methods, or conventional virtualized systems. For example, one embodiment may be used as an improvement of existing data management systems.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

We claim:

1. An apparatus, comprising:
a first cache storage device coupled to a first computing device, the first computing device comprising a processor and a memory; and
a virtual machine cache configured for operation on the first computing device, the virtual machine cache further configured to:
transfer a cache tag of a virtual machine to the first computing device from a second computing device, wherein the cache tag is stored outside of a memory space of the virtual machine;
determine that the transferred cache tag corresponds to cache data of the virtual machine retained at the second computing device and unavailable in the first cache storage device, the retained cache data comprising data cached at the second computing device during operation of the virtual machine at the second computing device; and transfer the cache data of the virtual machine referred to by the transferred cache tag from the second computing device into the first cache storage device.

2. The apparatus of claim 1, wherein the virtual machine cache is further configured to determine that the transferred cache tag corresponds to cache data of the virtual machine retained at the second computing device in response to the virtual machine migrating to the first computing device from the second computing device.

3. The apparatus of claim 1, wherein the virtual machine cache is further configured to allocate cache capacity to the virtual machine in the cache storage of the first computing device.

4. The apparatus of claim 1, wherein the virtual machine cache is further configured to admit the cache data transferred from the second computing device into the first cache storage device.

5. The apparatus of claim 1, wherein the virtual machine cache is further configured to request the cache data corresponding to the transferred cache tag from the second computing device, the request comprising an identifier of the virtual machine.

6. The apparatus of claim 1, wherein:
the transferred cache tag comprises a logical identifier; and
the virtual machine cache is further configured to determine that the transferred cache tag corresponds to cache data of the virtual machine retained at the second computing device in response to a cache miss for the logical identifier in the first cache storage device.

7. The apparatus of claim 1, wherein the virtual machine cache is further configured to request the cache tag from the second computing device.

8. The apparatus of claim 1, wherein:
the transferred cache tag is included in a memory image of the virtual machine; and
the memory image is transferred to the first computing device during migration of the virtual machine from the second computing device to the first computing device.

9. The apparatus of claim 1, wherein the second computing device is configured to send cache data corresponding to the virtual machine retained at the second computing device in response to determining that the virtual machine is being transferred to the first computing device.

10. A method, comprising:
determining that cache tags of a virtual machine relocating to a first computing system are retained at a second computing system, wherein the cache tags are stored outside of a memory space of the virtual machine;
transferring the cache tags of the virtual machine to the first computing system from the second computing system;
using the transferred cache tags to identify cache data of the virtual machine stored at the second computing system, the identified cache data unavailable in a cache storage device of the first computing system, the identified cache data stored at the second computing system during operation of the virtual machine at the second computing system;
accessing a first portion of the identified cache data of the virtual machine stored at the second computing system at the first computing system by use of the transferred cache tags; and
transferring the cache data of the virtual machine referred to by the transferred cache tags from the second computing system into local cache storage of the first computing system.

11. The method of claim 10, further comprising:
requesting the first portion of the identified cache data from the second computing system by use of the transferred cache tags.

12. The method of claim 10, further comprising:
maintaining cache metadata at the first computing system, the cache metadata associating virtual machine identifiers with cache addresses of cache data admitted into the local cache storage of the first computing system;
wherein the cache metadata associates an identifier of the virtual machine with the first portion of the identified cache data admitted into the local cache storage.

13. The method of claim 10, further comprising:
admitting a second portion of the identified cache data of the virtual machine into the cache storage device of the first host computing system in response to one or more of:
receiving the second portion of the identified cache data of the virtual machine from the second computing system; and
accessing the second portion of the identified cache data of the virtual machine from one or more of a primary storage system and a backing storage system.

14. The method of claim 10, wherein the transferred cache tags correspond to a previous cache capacity of the virtual machine, the method further comprising:
provisioning cache capacity to the virtual machine at the first computing system, the provisioning further comprising one or more of:
retaining the transferred cache tags of the virtual machine in response to the provisioned cache capacity corresponding to the previous cache capacity of the virtual machine;
removing one or more of the transferred cache tags in response to the provisioned cache capacity being less than the previous cache capacity of the virtual machine; and
adding one or more additional cache tags to the transferred cache tags in response to the provisioned cache capacity being greater than the previous cache capacity of the virtual machine.

15. The method of claim 10, wherein transferring the cache tags of the virtual machine to the first computing system comprises one or more of:
requesting the cache tags from the second computing system in response to the virtual machine being relocated to operate on the first computing system; and
receiving the cache tags from the second computing system during relocation of the virtual machine to the first computing system.

16. An apparatus, comprising:
a cache management system for operation on a first host computing device comprising a processor and memory, wherein the cache management system is implemented outside of a memory space of one or more virtual machines, the cache management system comprising:
means for determining that cache entries pertaining to a virtual machine in the one or more virtual machines configured for operation on the first host computing device are being retained at a second host computing device;

means for transferring the cache entries pertaining to the virtual machine to the first host computing device from the second host computing device, the transferred cache entries comprising a cache entry corresponding to a particular input/output (I/O) address;

means for using the cache entries to determine that the particular I/O address is associated with cache data of the virtual machine stored at the second host computing device; and means for transferring the cache data associated with the particular I/O address from the second host computing device into the local cache storage of the first host computing device; and an input/output (I/O) driver comprising:

means for directing an I/O request pertaining to a particular identifier of the virtual machine to the second host computing device in response to the transferring of the cache entries and the cache data.

17. The apparatus of claim 16, wherein the cache management system further comprises means for sending a request for the cache data associated with the particular I/O address to the second host computing device, the request comprising the particular identifier of the virtual machine.

18. The apparatus of claim 16, wherein the cache management system further comprises means for admitting the cache data associated with the particular I/O address stored at the second host computing device into the local cache storage of the first host computing device by one or more of:

means for requesting the cache data associated with the particular I/O address from the second host computing device in response to an I/O request of the virtual machine at the first host computing device;

means for requesting the cache data associated with the particular I/O address from the second host computing device in response to transferring the cache entries pertaining to the virtual machine from the second host computing device;

means for prefetching the cache data associated with the particular I/O address from the second host computing device in response to determining that the virtual machine was previously deployed on the second host computing device; and means for receiving the cache data associated with the particular I/O address pushed from the second host computing device.

19. The apparatus of claim 16, further comprising means for allocating an amount of cache storage capacity to the virtual machine in the local cache storage of the first host computing device.

20. The apparatus of claim 19, wherein:

the transferred cache tags correspond to a previous amount of cache storage capacity allocated to the virtual machine; and the cache management system further comprises means for configuring a number of cache entries available for caching data of the virtual machine within the local cache storage of the first host computing device based on the amount of cache storage capacity allocated to the virtual machine at the first host computing device by one or more of:

means for configuring the number of cache entries available for caching data of the virtual machine within the local cache storage to be substantially equivalent to a number of the transferred cache entries in response to the amount of cache storage capacity being substantially equivalent to the previous amount of cache storage capacity;

means for reducing the number of cache entries available for caching data of the virtual machine within the local cache storage as compared to the number of the transferred cache entries in response to the amount of cache storage capacity being less than the previous amount of cache storage capacity; and means for increasing the number of cache entries available for caching data of the virtual machine within the local cache storage as compared to the number of the transferred cache entries in response to the amount of cache storage capacity being greater than the previous amount of cache storage capacity.

21. The apparatus of claim 16, wherein the cache management system further comprises means for determining that the cache entries pertaining to the virtual machine are being retained at the second host computing device in response to determining that the virtual machine was relocated from the second host computing device.

22. The apparatus of claim 16, wherein the second cache manager further comprises means for accessing the portion of the cache data of the particular virtual machine retained at the first host computing device in response to a request of the particular virtual machine operating on the second host computing device.

23. A system, comprising:

a first host computing device, comprising:

a first cache manager configured to:

cache data of a particular virtual machine in cache storage of the first host computing device in association with respective cache tags allocated to the particular virtual machine, wherein the respective cache tags are stored outside of a memory space of the particular virtual machine; and retain the cache data of the particular virtual machine within the cache storage of the first host computing device in response to the particular virtual machine being migrated from the first host computing device; and a second host computing device, comprising:

a cache provisioner configured to allocate cache storage capacity within a cache storage device of the second host computing device to the particular virtual machine in response to the particular virtual machine being migrated to operate on the second host computing device; and a second cache manager configured to:

receive the cache tags of the particular virtual machine from the first host computing device;

use the received cache tags to determine that the cache data of the particular virtual machine is being retained at the first host computing device;

access a portion of the cache data of the particular virtual machine retained at the first host computing device by use of the received cache tags; and populate the cache storage capacity allocated to the particular virtual machine at the second host computing device by transferring the portion of the cache data of the particular virtual machine accessed from the first host computing device to the cache storage capacity of the second host computing device.

24. The system of claim 23, wherein the first cache manager is further configured to remove the portion of the cache data of the particular virtual machine from the cache storage of the first host computing device in response to transferring the portion of the cache data of the particular virtual machine to the second host computing device.

25. The system of claim 23, wherein the first cache manager is further configured to provide the portion of the cache data of the particular virtual machine to the second host computing device in response to one or more of:
   a request from the second host computing device; and
   an indication that the particular virtual machine is migrating to the second host computing device.

26. The system of claim 23, wherein the second cache manager is further configured to request the portion of the cache data of the particular virtual machine retained at the first host computing device by use of the received cache tags and an identifier of the particular virtual machine.

27. The system of claim 23, wherein the cache tags of the particular virtual machine are transferred to the second host computing device during migration of the particular virtual machine from the first host computing device to the second host computing device.

28. The system of claim 23, wherein the second cache manager is further configured to request the cache tags of the particular virtual machine from the first host computing device.

29. The system of claim 23, wherein the second cache manager is further configured to notify the first host computing device that identified cache data of the particular virtual machine no longer needs to be retained at the first host computing device in response to one or more of:
   overwriting the identified cache data at the second host computing device;
   modifying the identified cache data at the second host computing device;
   deleting the identified cache data at the second host computing device; and
   acquiring the identified cache data from one or more of a primary storage device and a backing storage device.

30. The system of claim 23, wherein the first cache manager is further configured to push the portion of the cache data of the particular virtual machine to the second host computing device in response to determining that the particular virtual machine is being migrated to the second host computing device.

31. The system of claim 30, wherein the cache provisioner is further configured to modify the received cache tags of the particular virtual machine in accordance with the cache storage capacity allocated to the particular virtual machine at the second host computing device, wherein modifying the received cache tags comprises one of:
   removing one or more of the received cache tags; and
   adding one or more cache tags to the received cache tags.

* * * * *